United States Patent [19]

Brantingham

[11] Patent Number: 4,484,261
[45] Date of Patent: Nov. 20, 1984

[54] DATA PROCESSING SYSTEM HAVING INTERLINKED FAST AND SLOW MEMORY MEANS AND INTERLINKED PROGRAM COUNTERS

[75] Inventor: George L. Brantingham, Tourrettes sur Loup, France

[73] Assignee: Texas Instruments Incorporated, Dallas, Tex.

[21] Appl. No.: 221,417

[22] Filed: Jan. 19, 1981

[51] Int. Cl.³ .............................. G06F 9/22; G06F 9/32
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| Re. 30,671 | 7/1981 | Poland | 364/706 |
| 4,251,862 | 2/1981 | Murayama | 364/200 |
| 4,307,445 | 12/1981 | Tredennick et al. | 364/200 |
| 4,323,963 | 4/1982 | Wu | 364/200 |
| 4,325,121 | 4/1982 | Gunter et al. | 364/200 |
| 4,337,510 | 6/1982 | Maezumi | 364/200 |
| 4,366,540 | 12/1982 | Berglund et al. | 364/200 |
| 4,424,563 | 1/1984 | Lynch | 364/200 |

Primary Examiner—James D. Thomas
Assistant Examiner—A. E. Williams, Jr.
Attorney, Agent, or Firm—Rene' E. Grossman; Leo N. Heiting; Melvin Sharp

[57] ABSTRACT

A data processing system has two independent read only memories. Each read only memory (ROM) has an individual associated program counter. Table lookup is accomplished by having an instruction signal pattern output from one ROM conditionally advance the program counter of the other ROM. Upon completion of the output from the first ROM, control is transferred to the second ROM, with the second ROM's program counter containing a predetermined value equivalent to the table lookup value desired, or to a branch word pointing to a value or routine in the second ROM. In the preferred embodiment, the execution of a particular data signal pattern (CALL) in a fast read only memory (said first ROM) causes the program counter for the second ROM (main program counter) to advance one step forward in the program count sequence. Thus, for example, if a number represents the table entry value and is decremented in the fast ROM, decrementing once during each execution of a CALL instruction signal pattern in said fast ROM, then upon return to the main ROM, the main program counter will point to the desired entry point in the main ROM. Thus, the data signal stored pattern (routine) stored in the fast ROM may be any routine which executes a variable number of CALLs and the main ROM entry point may contain values to be directly used or may contain data signal patterns representing the beginning of new program routines in the main ROM.

4 Claims, 59 Drawing Figures

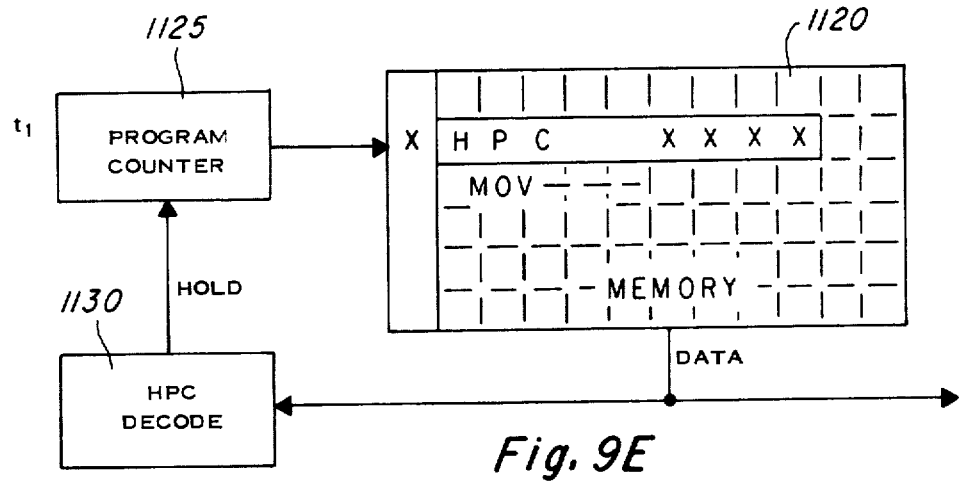
Fig. 9E
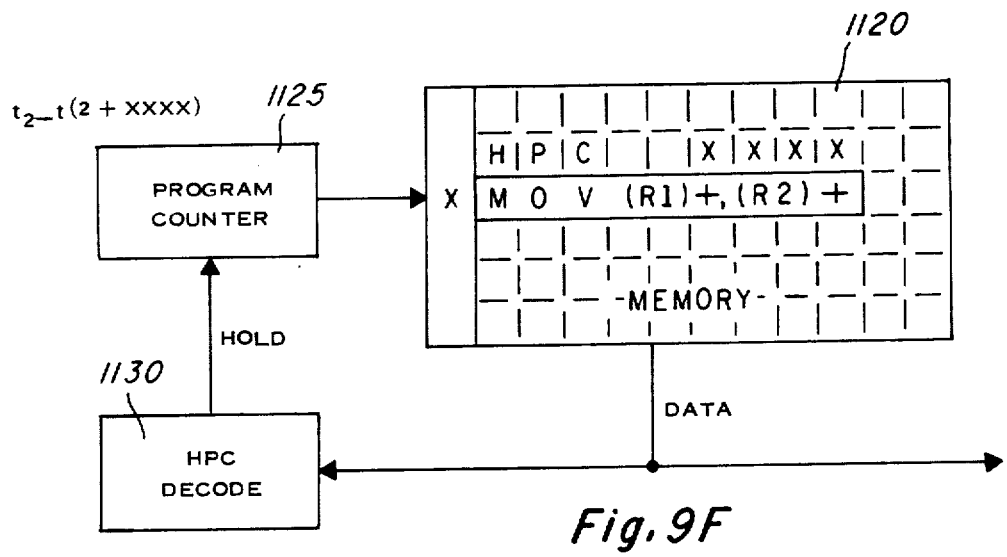
Fig. 9F
Fig. 9G
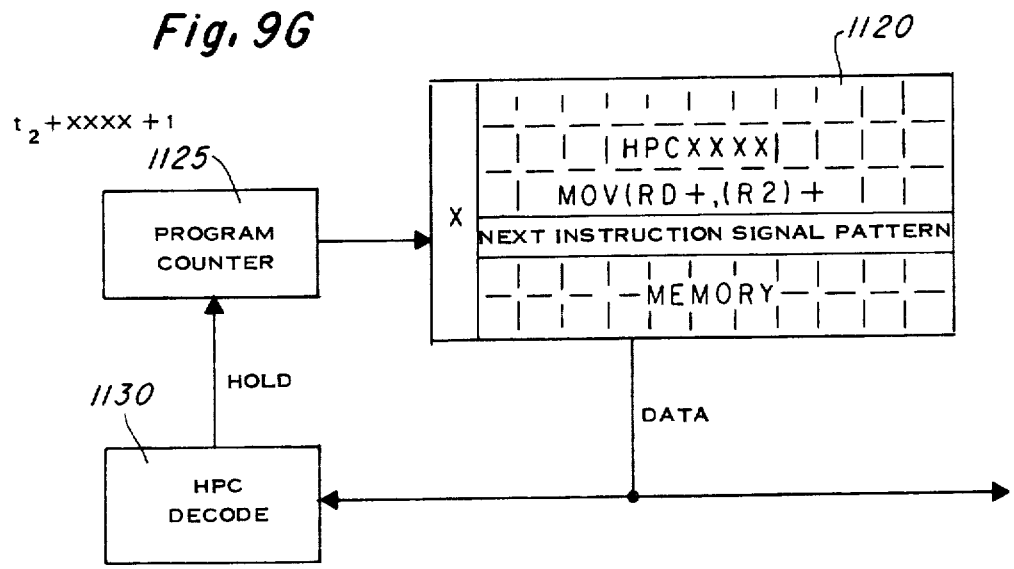

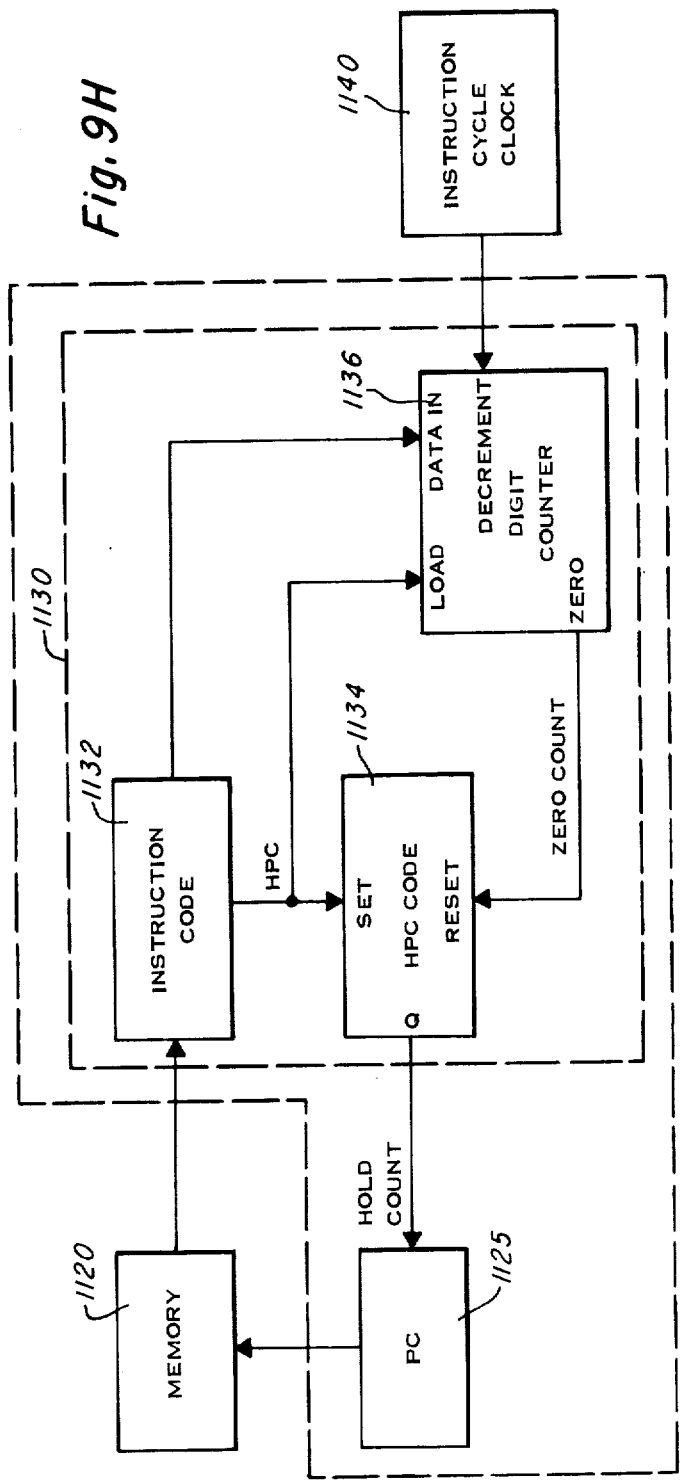

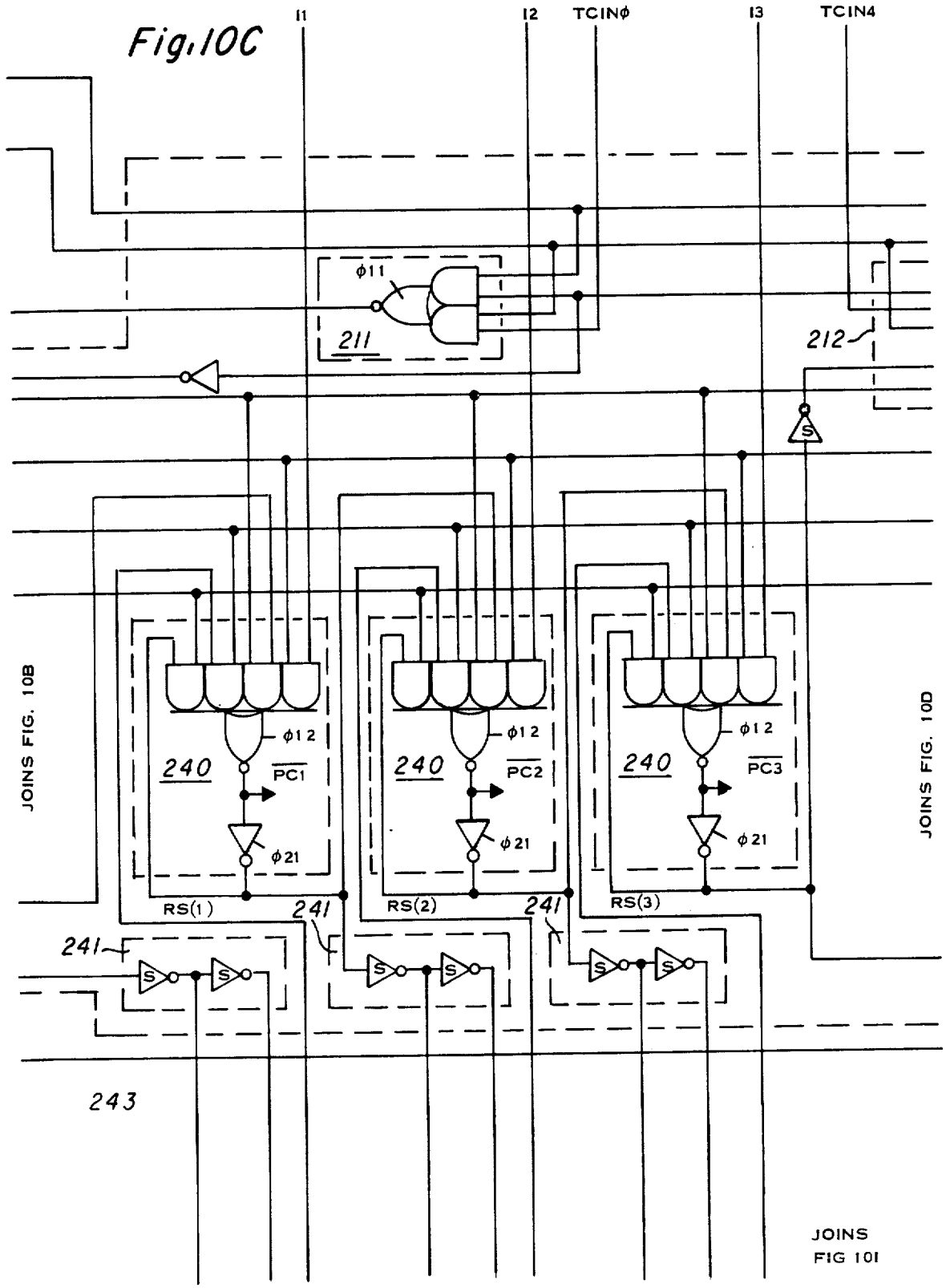

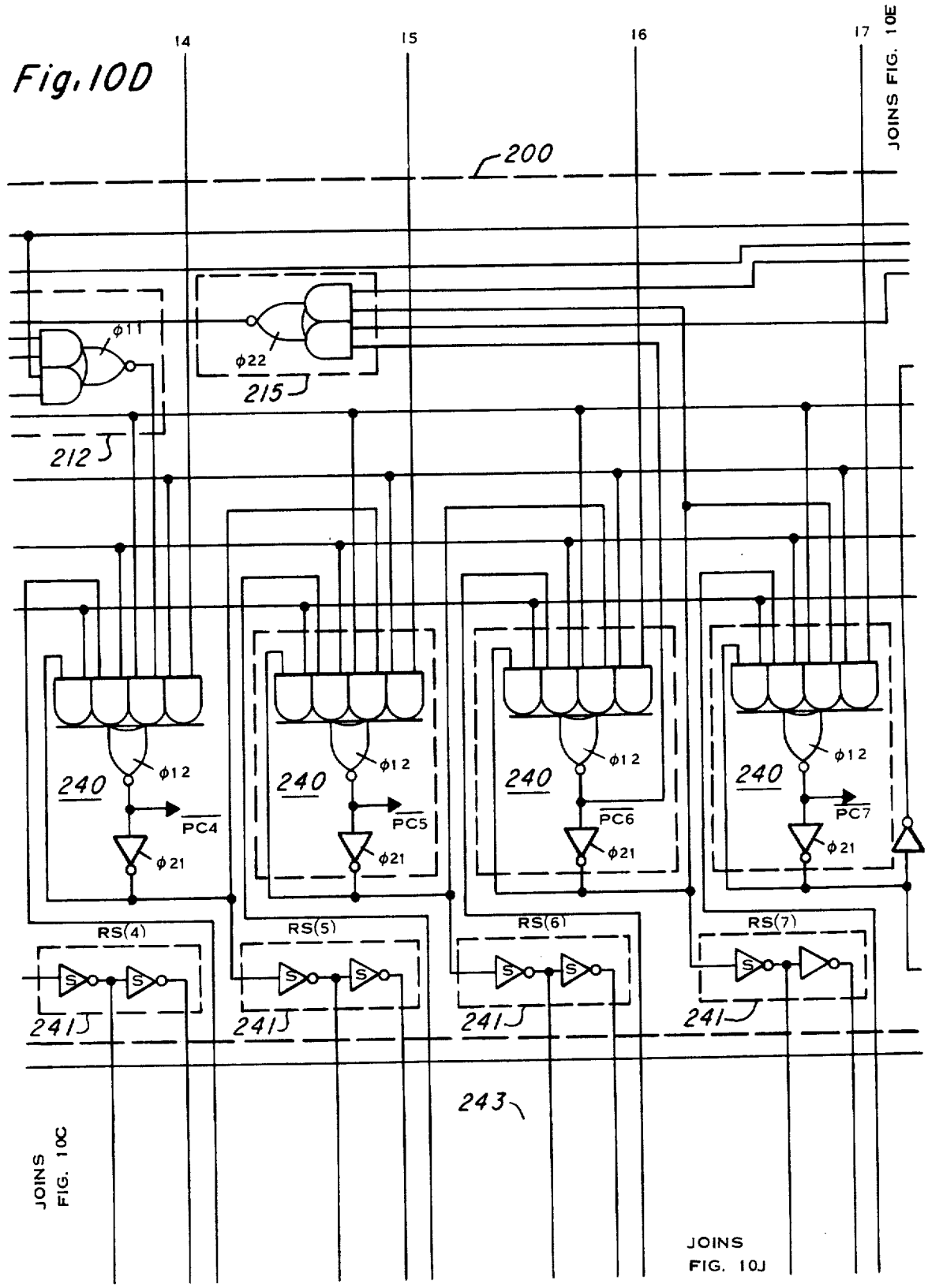

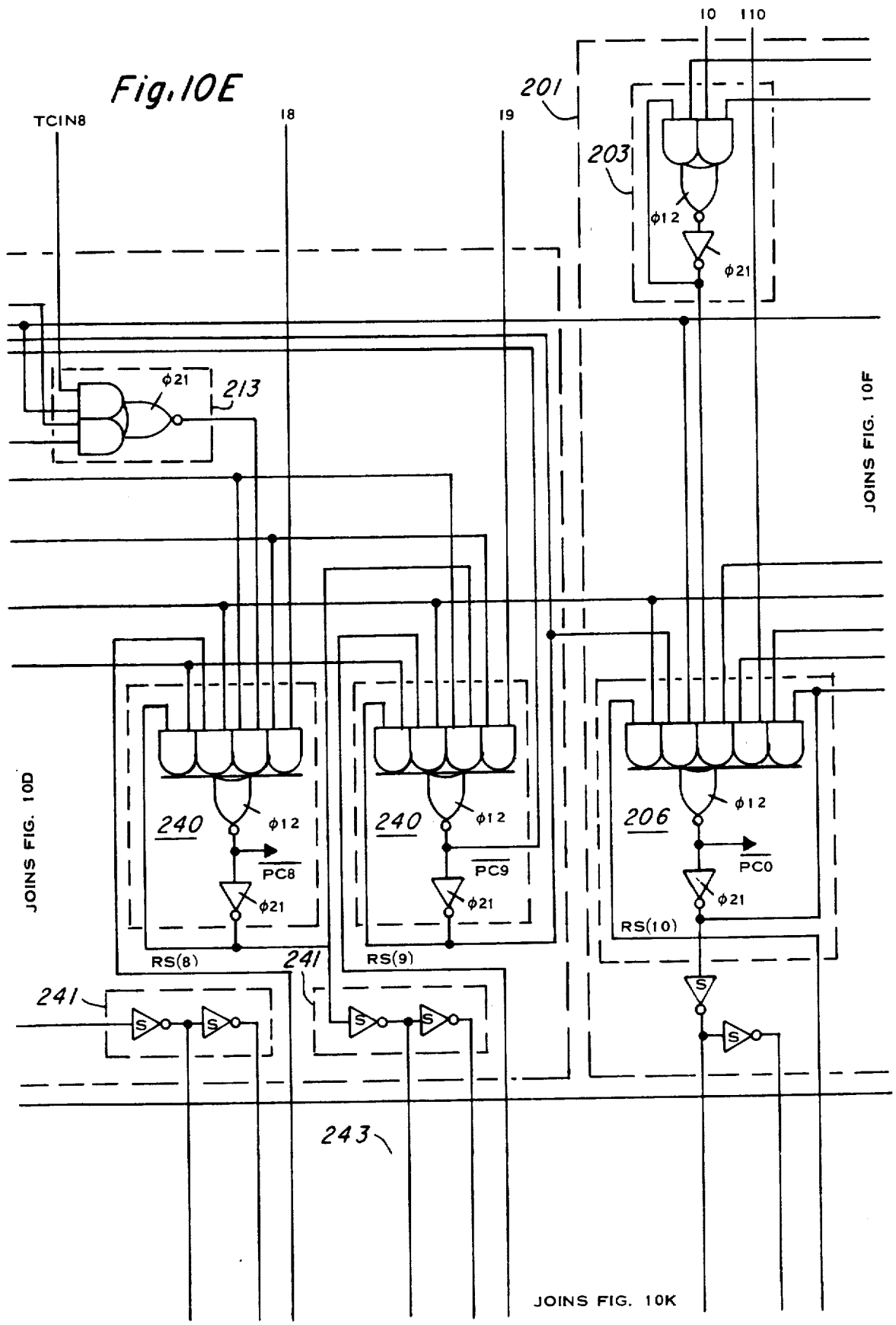

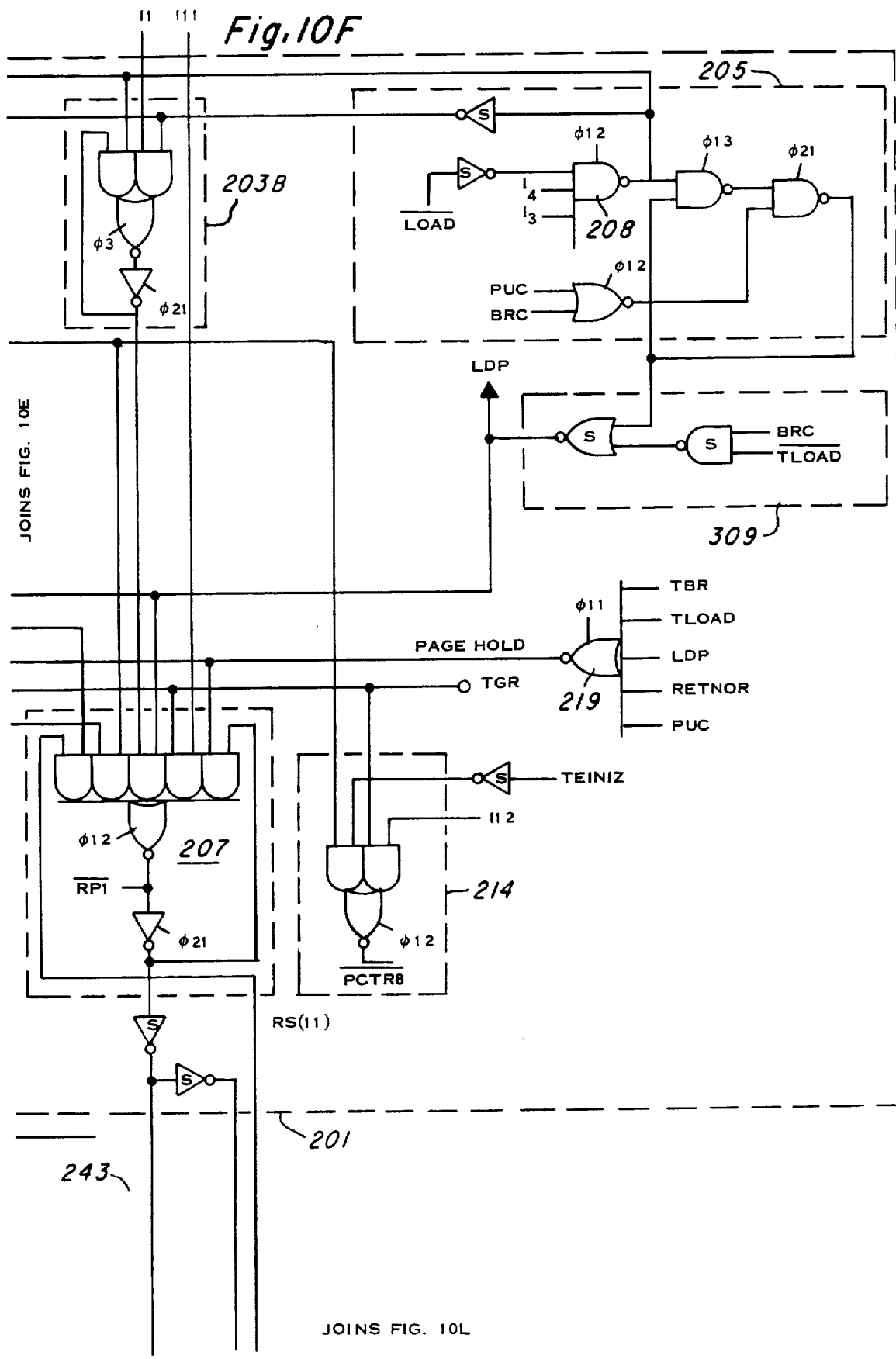

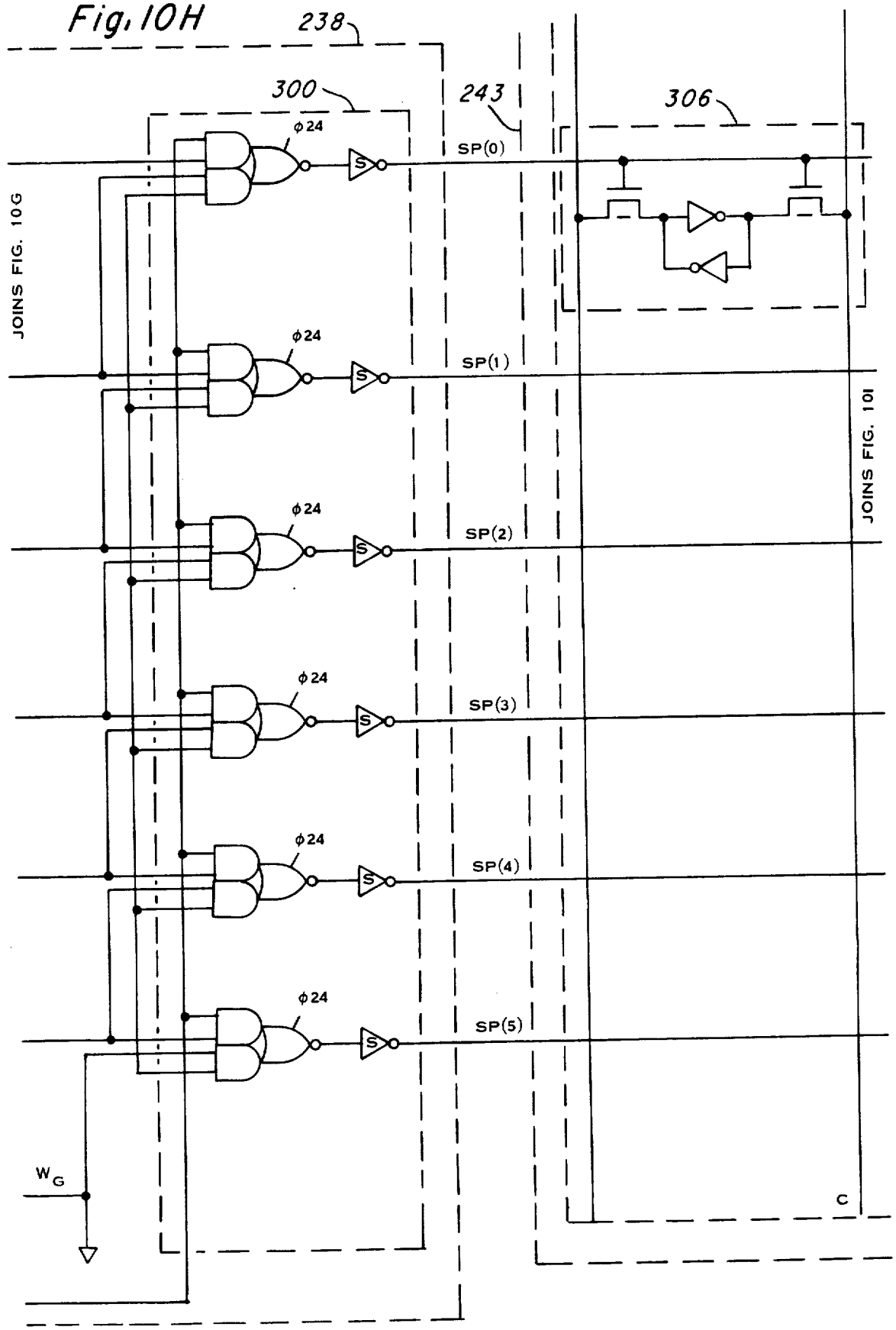

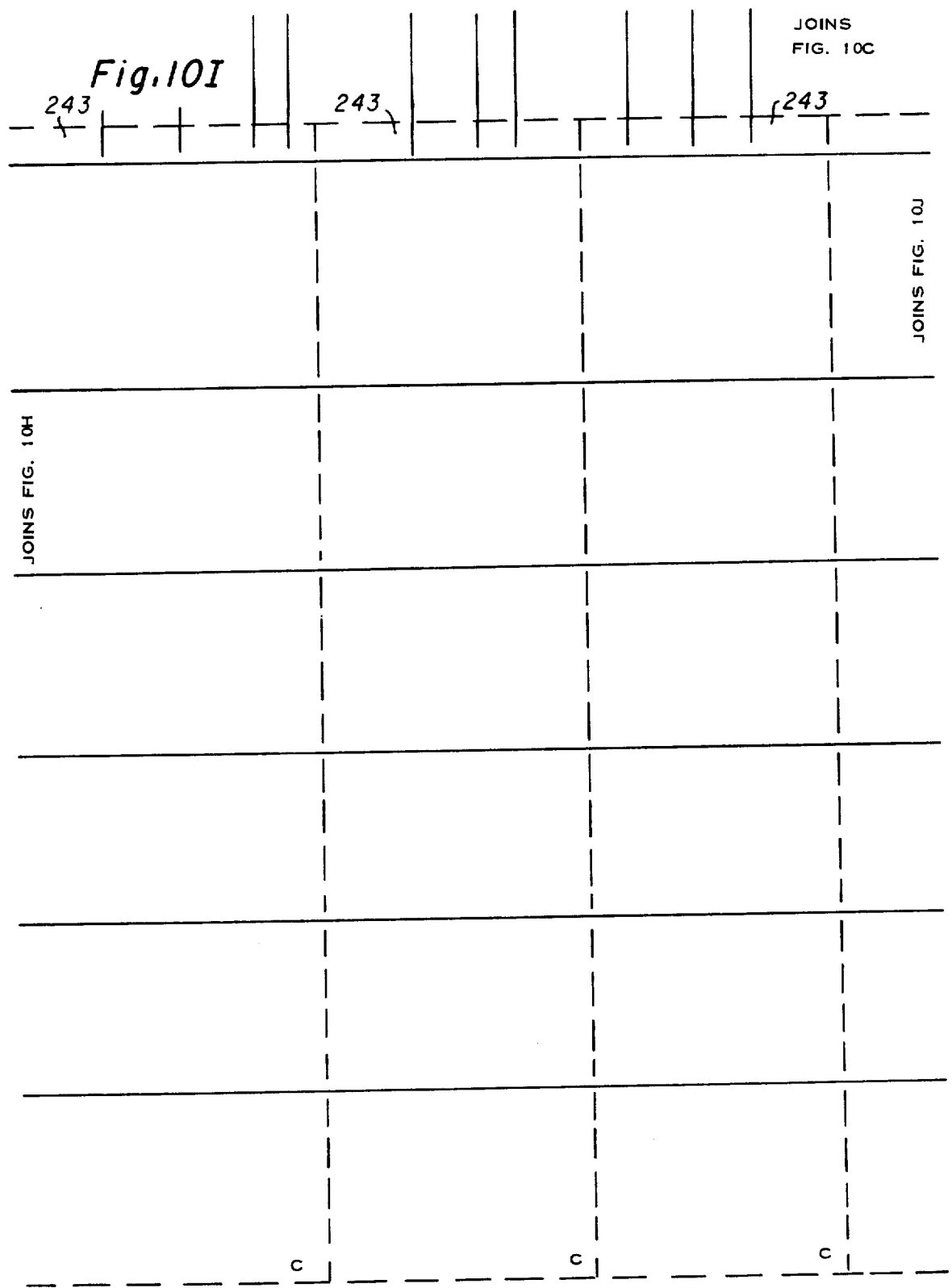

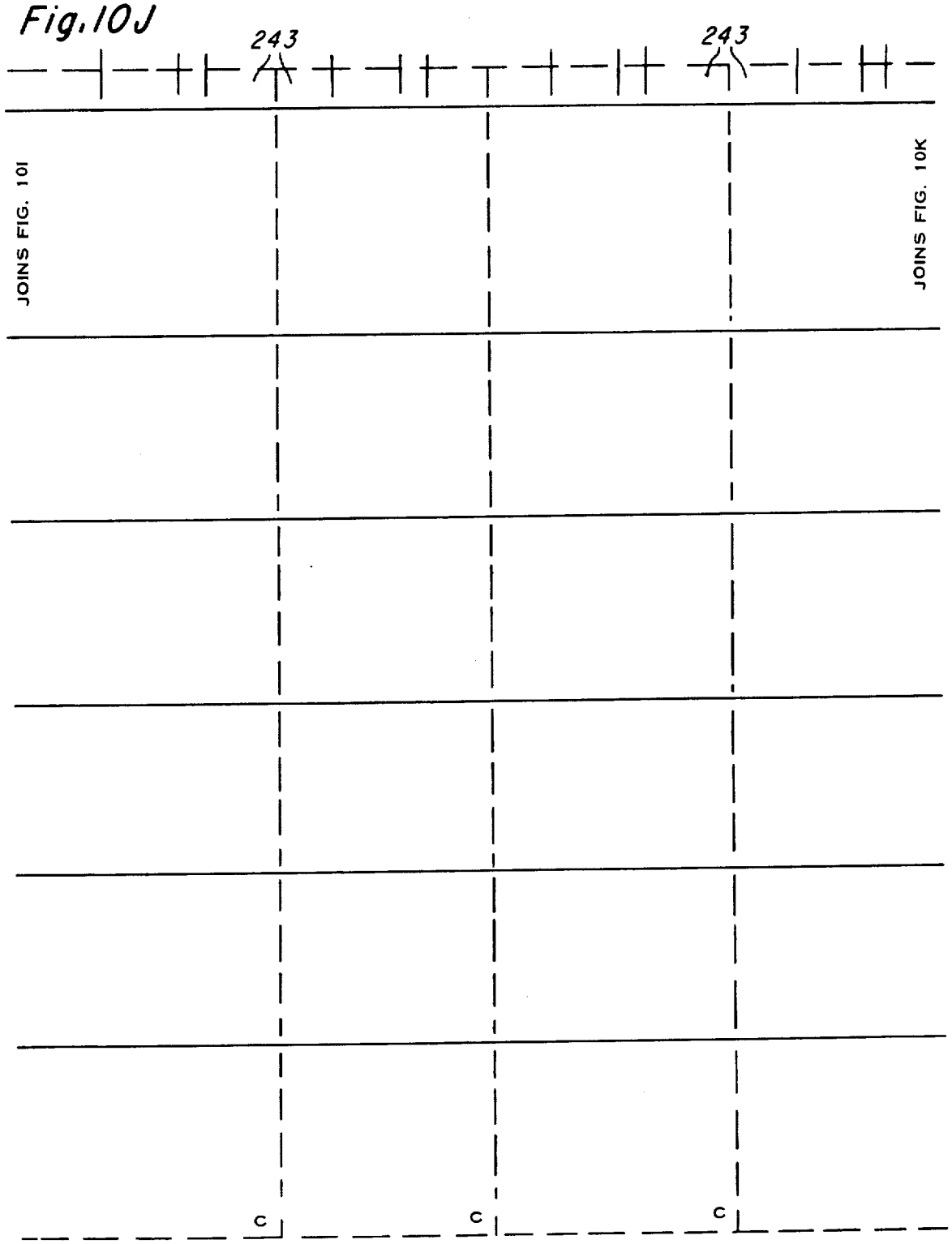

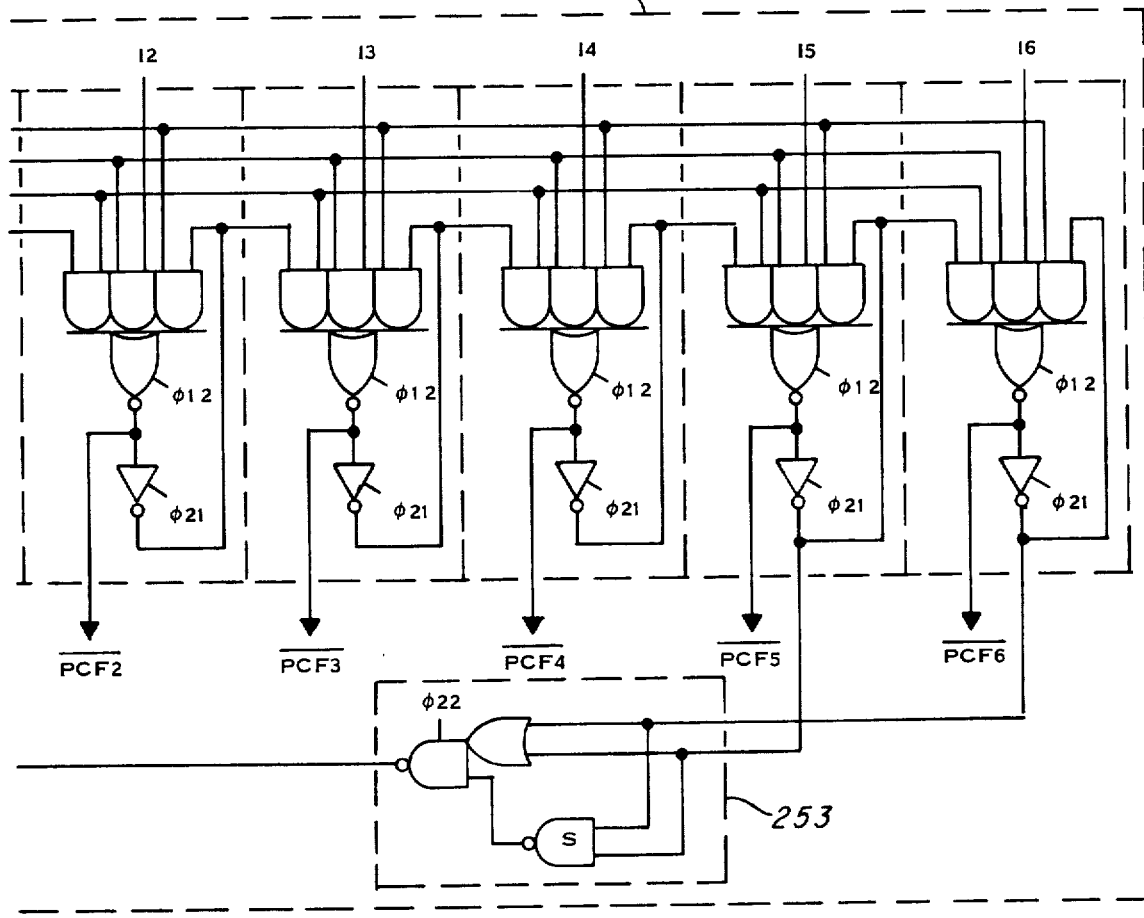
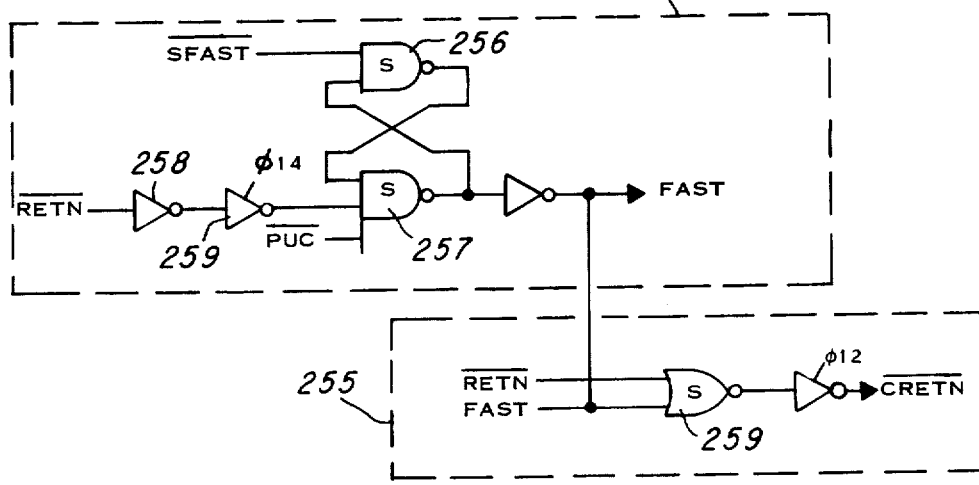
Fig. 10M

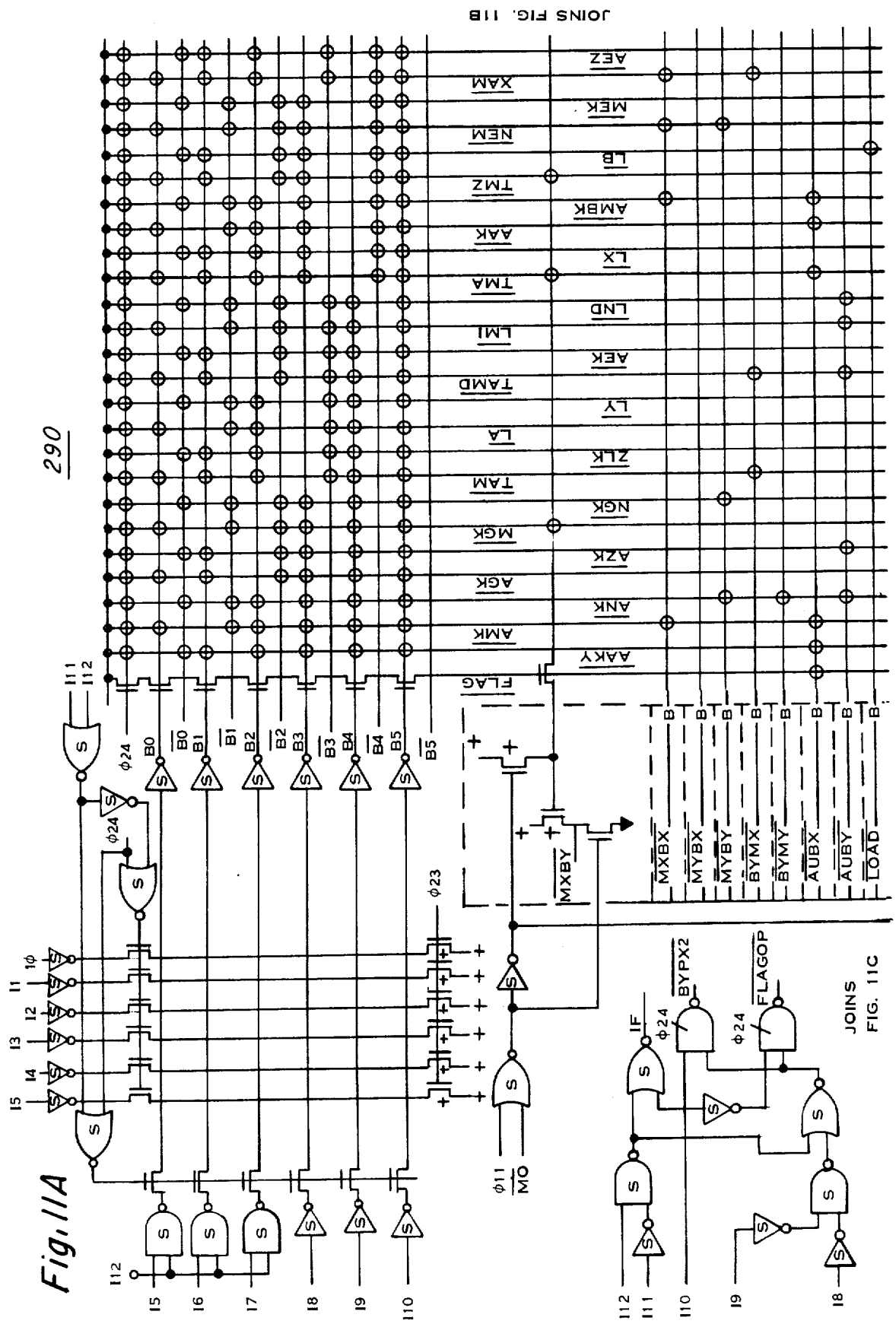

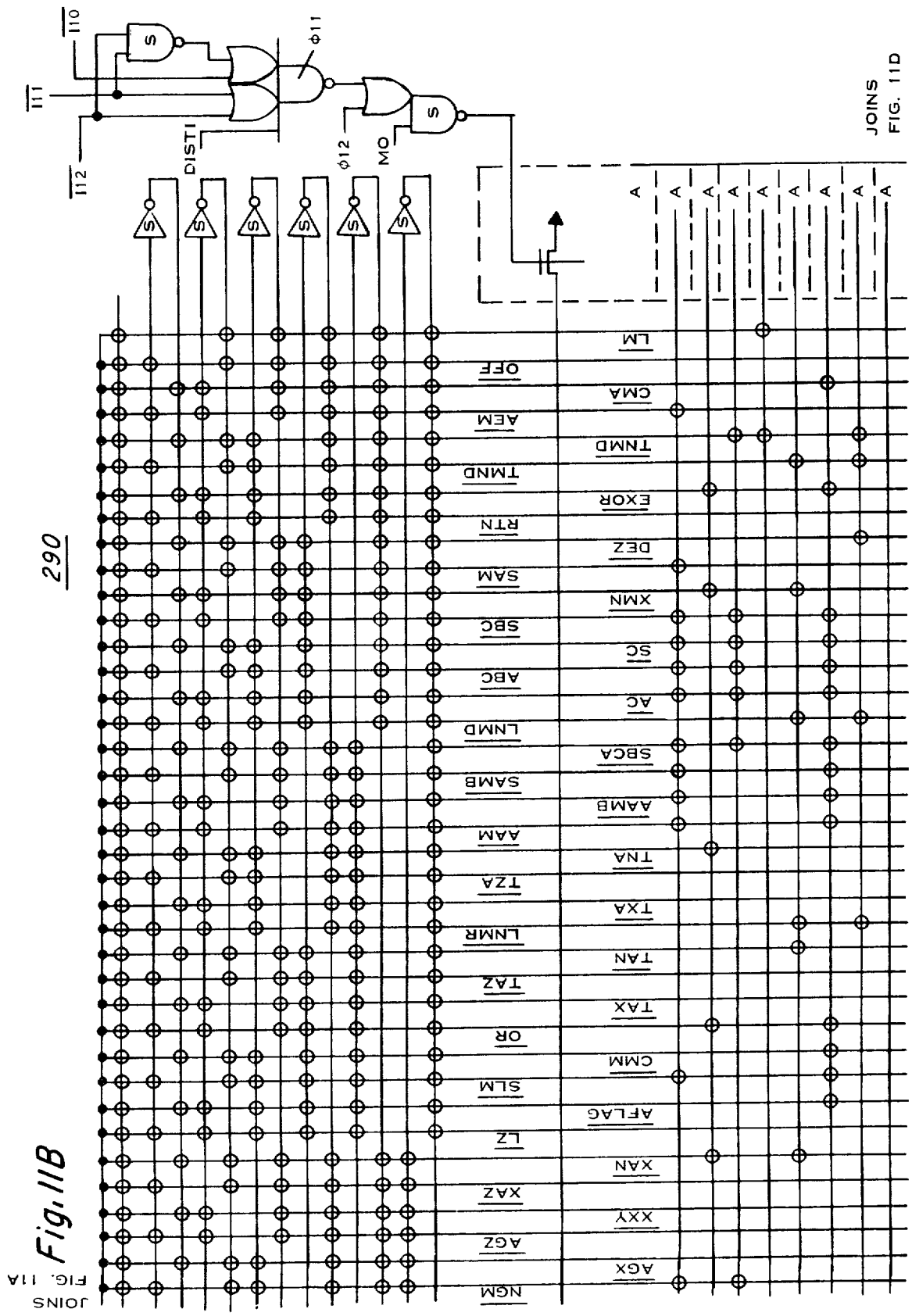

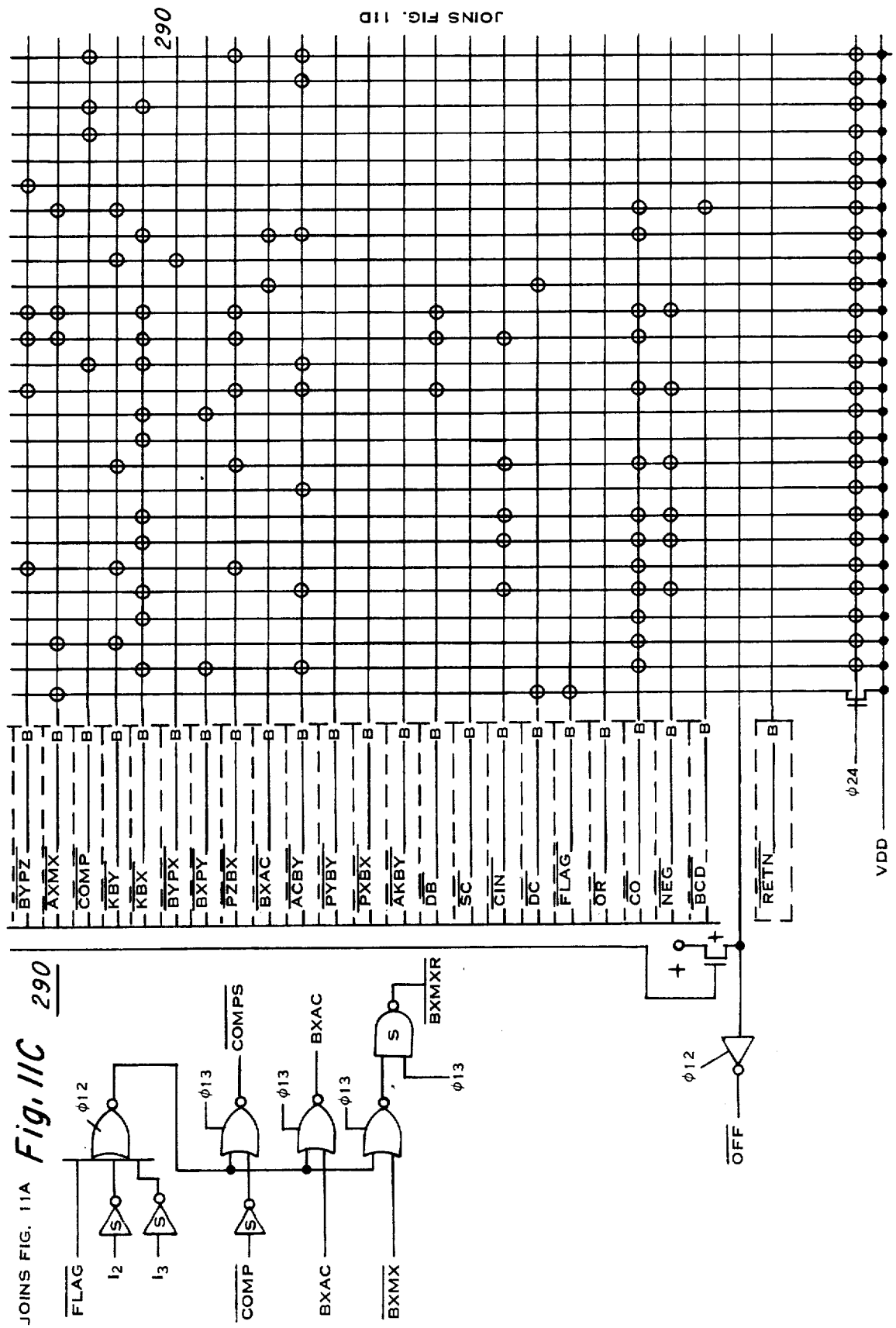

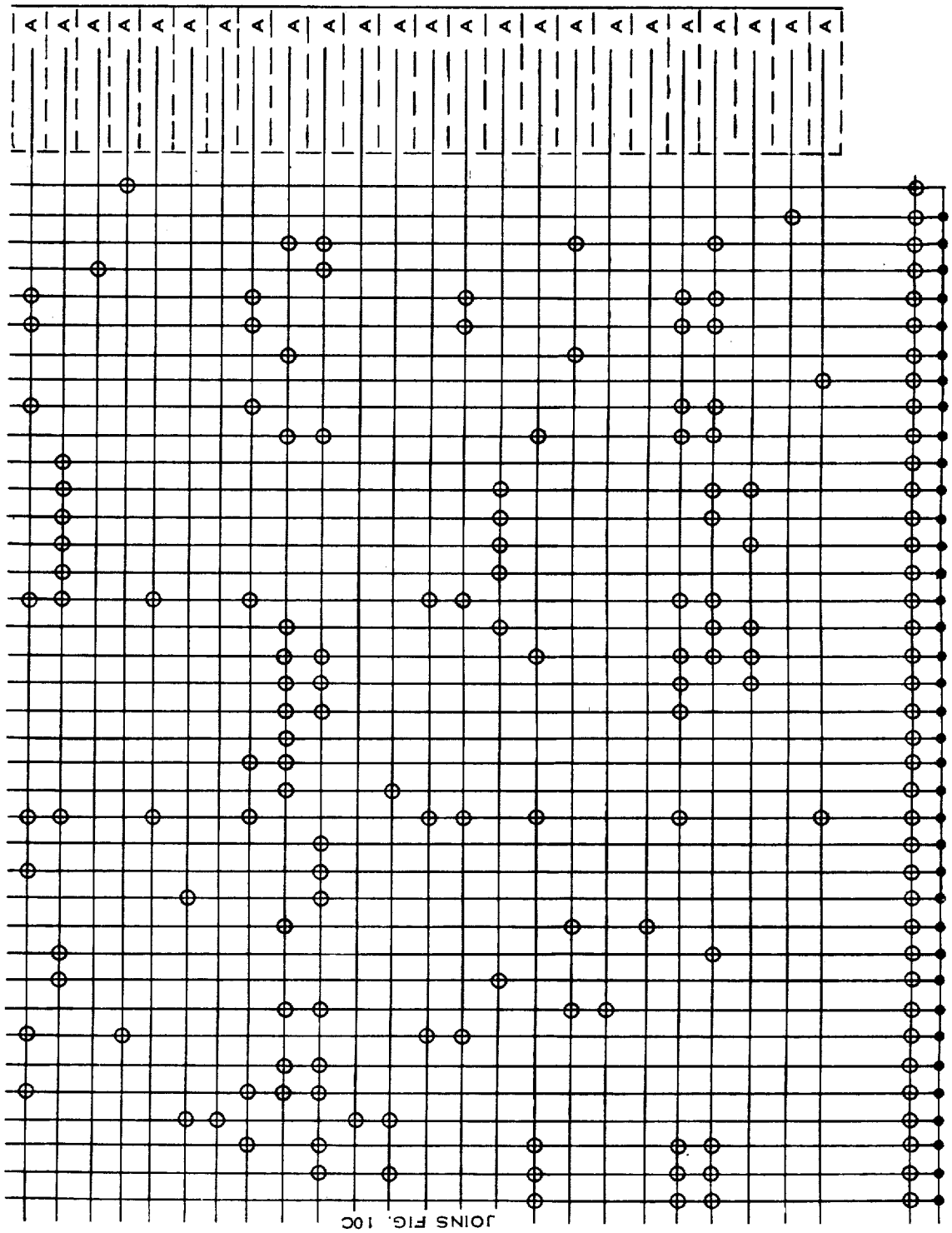

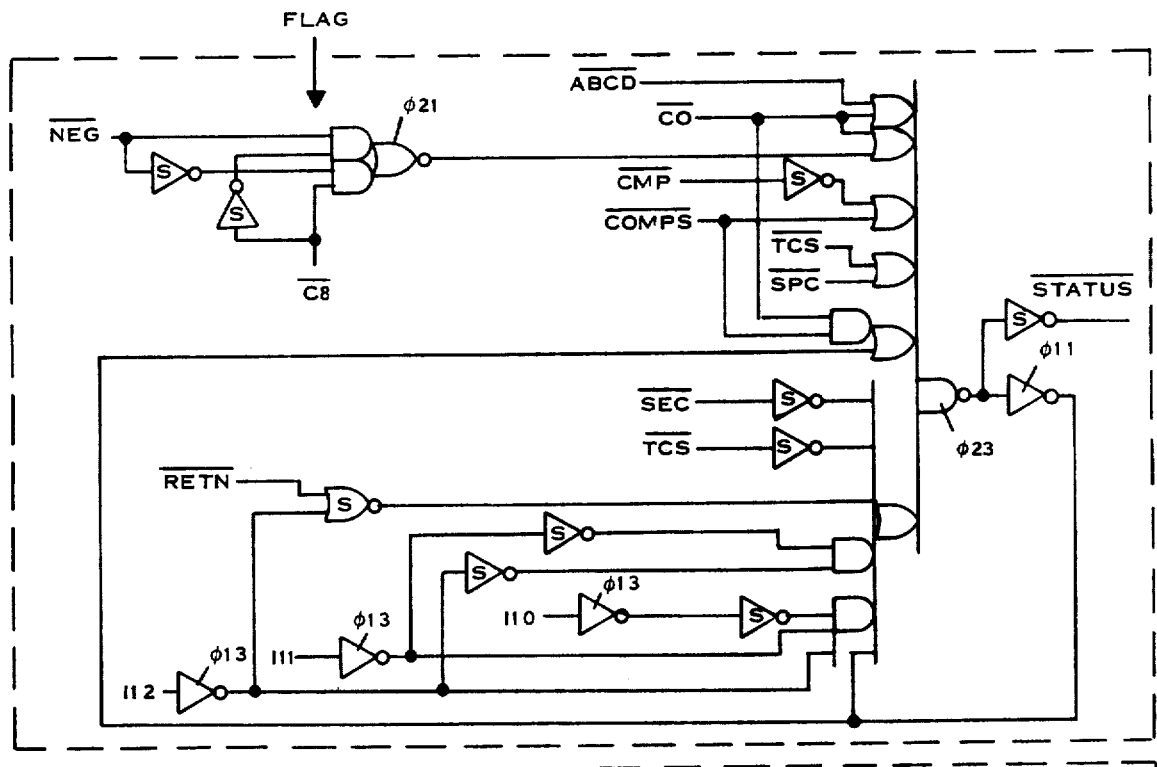
Fig. 12D
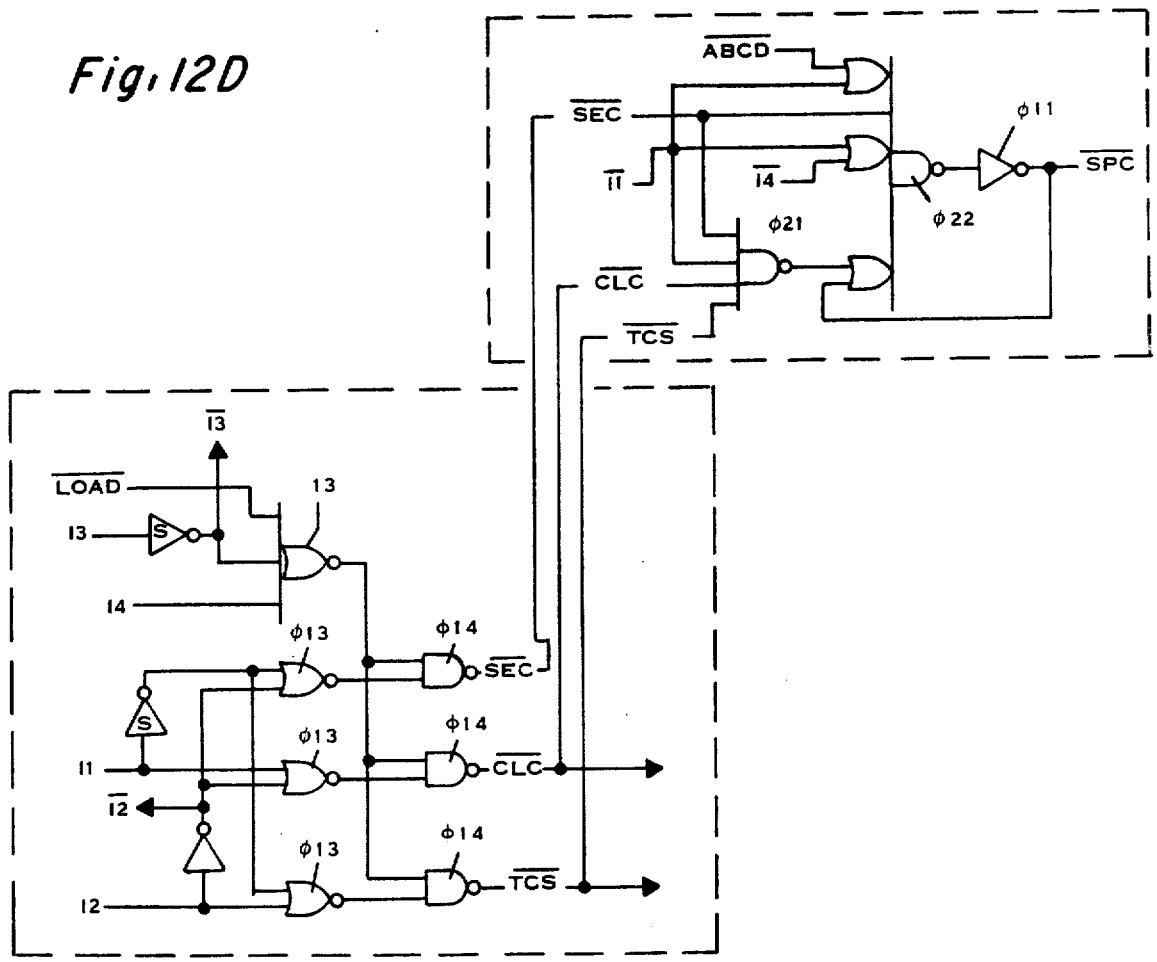

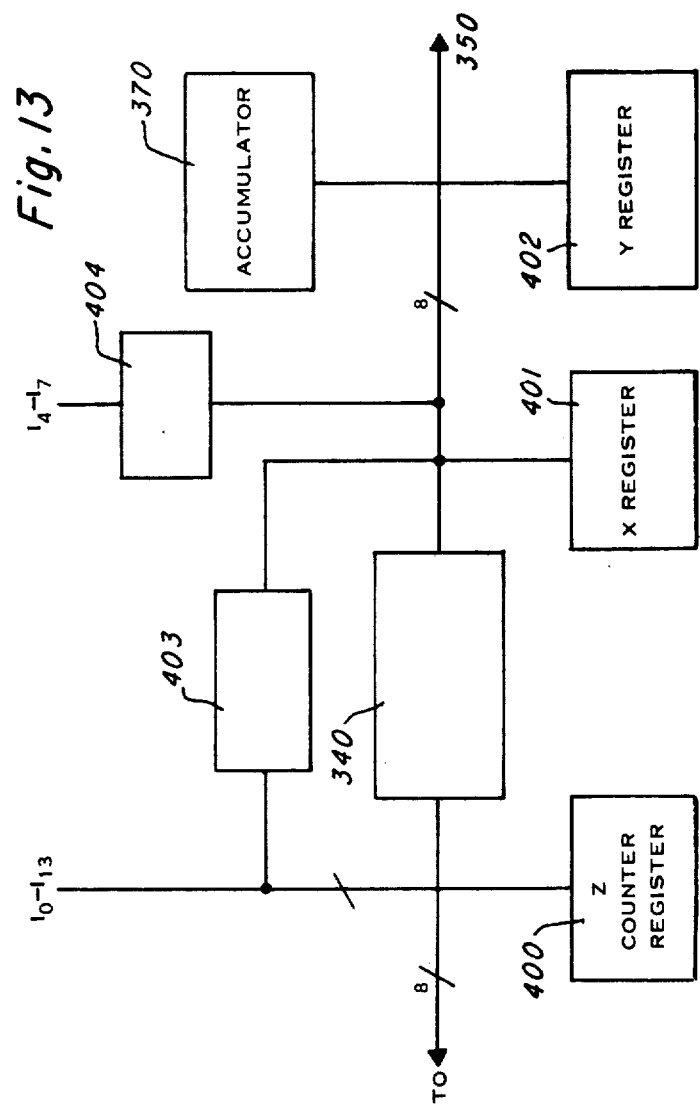

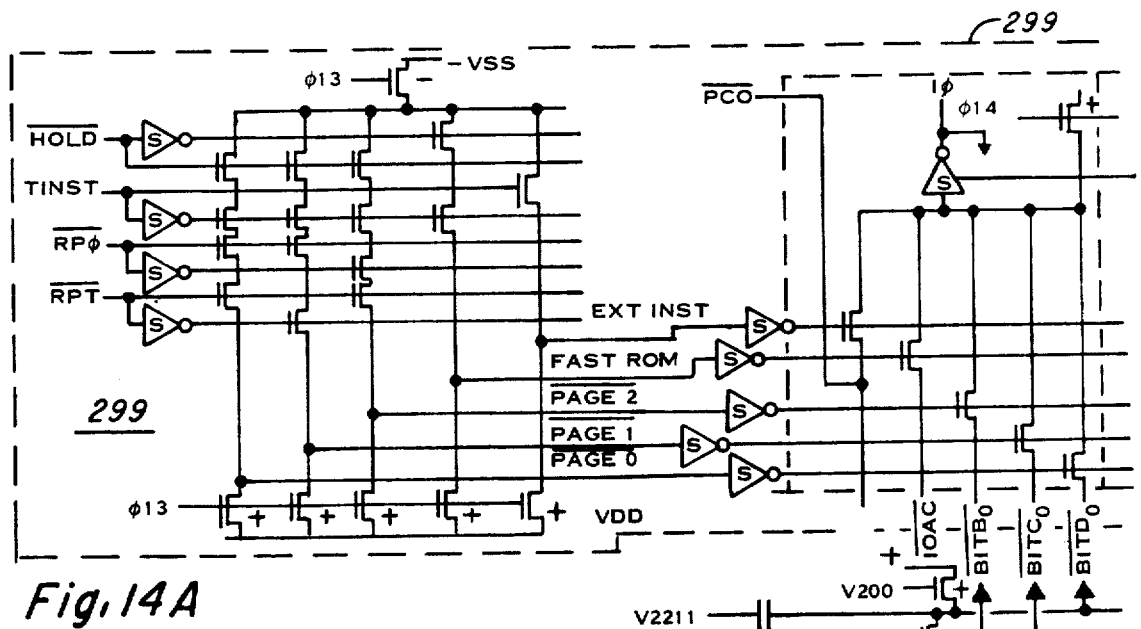
Fig. 14A
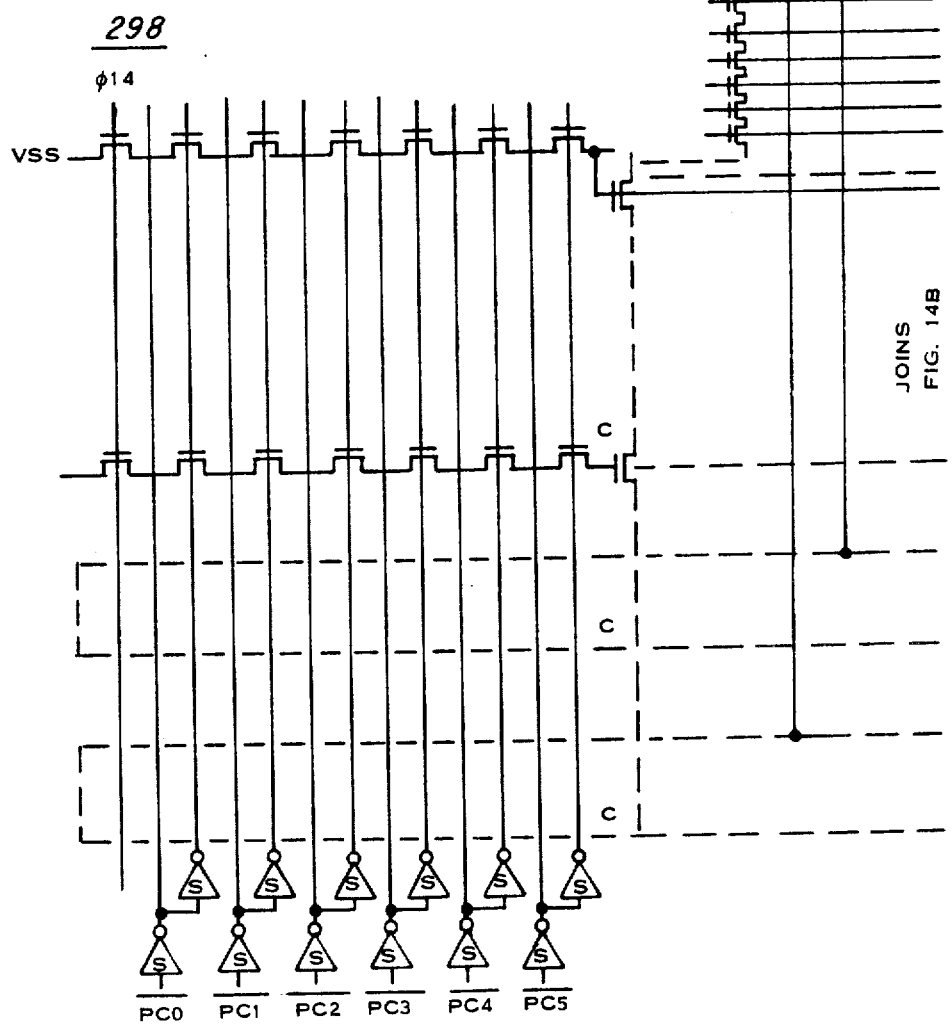

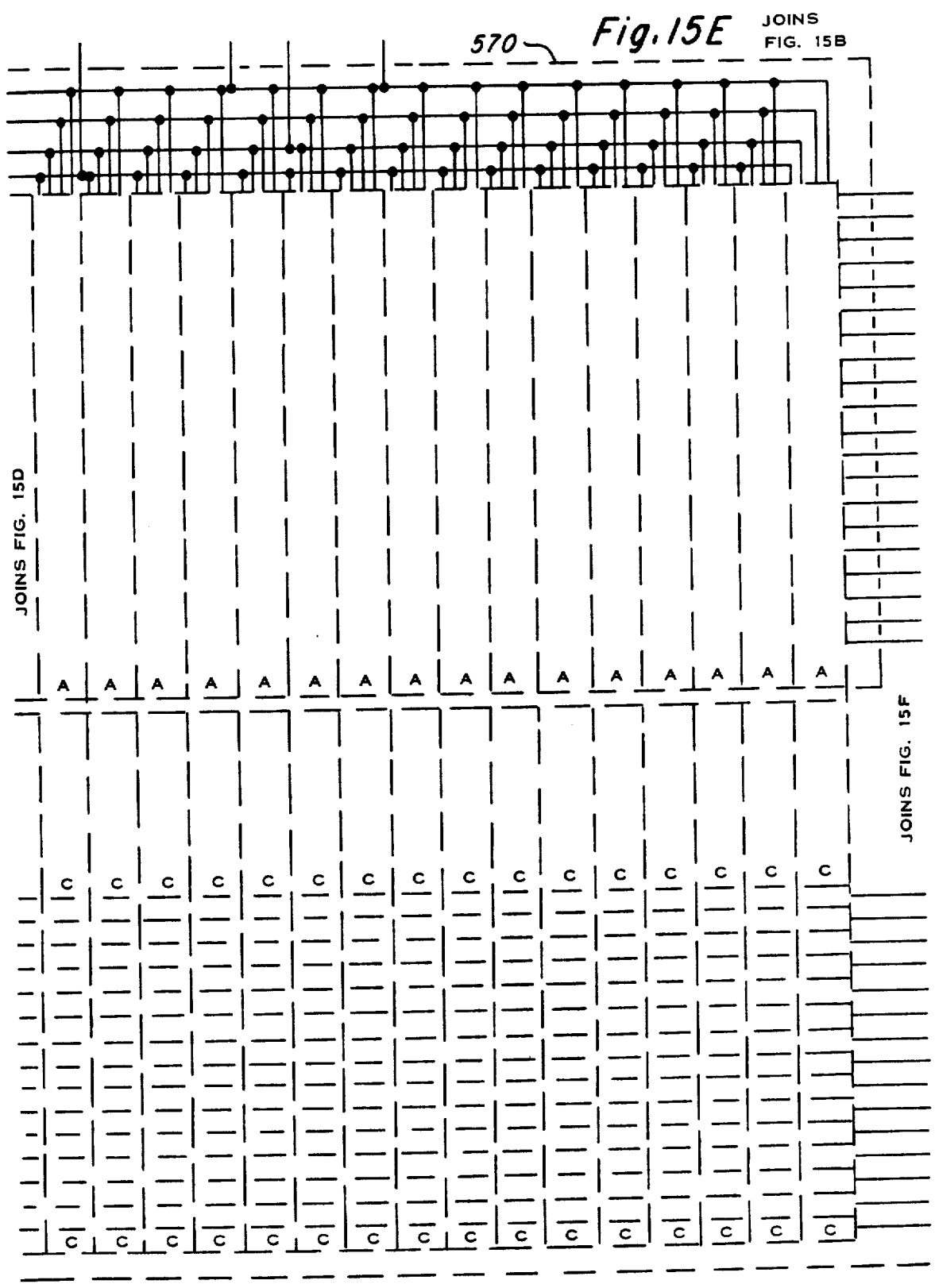

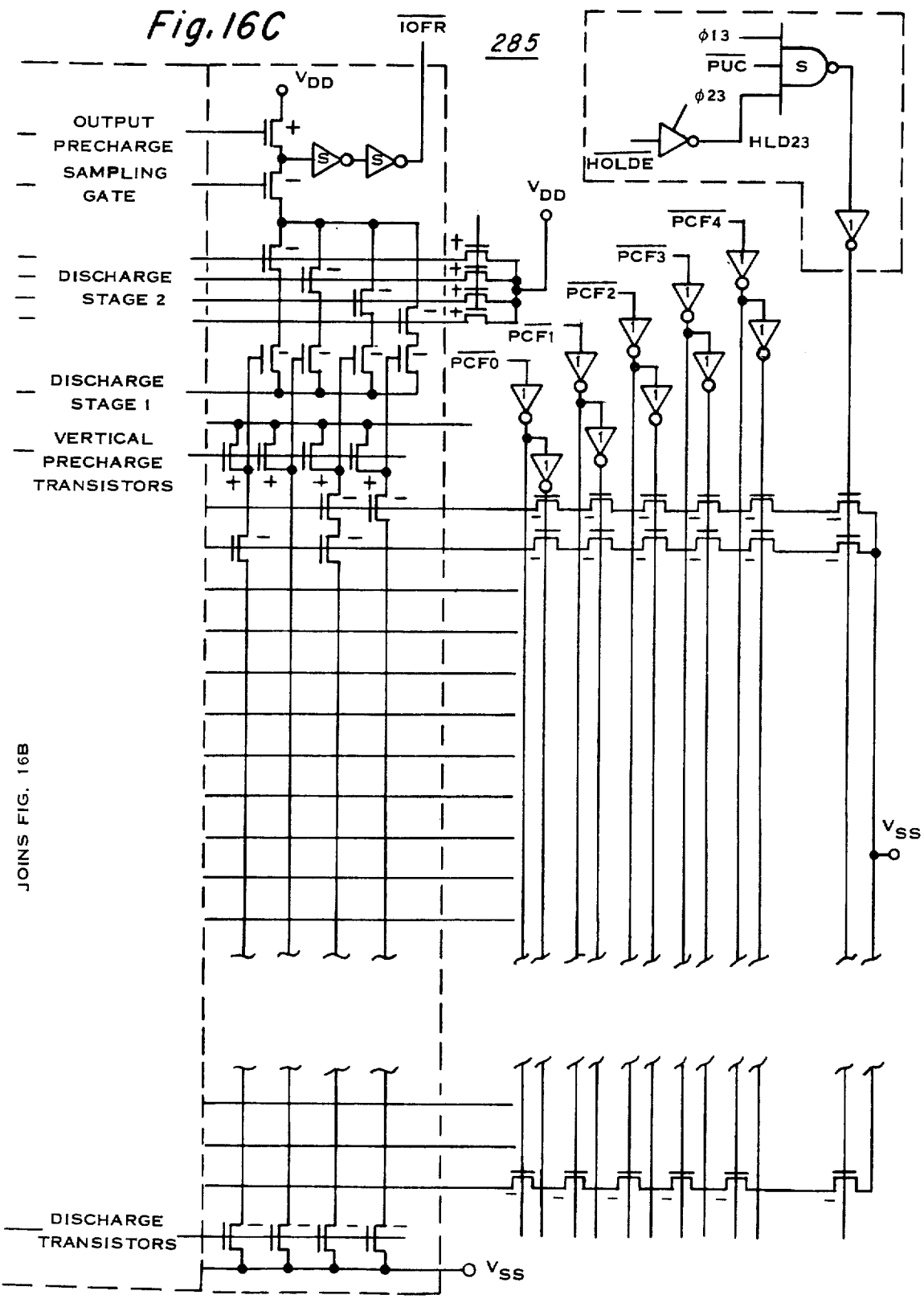

DATA PROCESSING SYSTEM HAVING INTERLINKED FAST AND SLOW MEMORY MEANS AND INTERLINKED PROGRAM COUNTERS

CROSS-REFERENCE TO RELATED APPLICATIONS

1. "Multiple Memory Pointer System", Ser. No. 196,808, filed Oct. 14, 1980.
2. "A Data Processing System Having Dual Output Modes", Ser. No. 168,853, filed July 14, 1980 now U.S. Pat. No. 4,388,696 issued June 14, 1983.
3. "CMOS Integrated Circuit Device and Method of Manufacture", Ser. No. 081,513, filed Oct. 3, 1979, now U.S. Pat. No. 4,295,897, issued Oct. 20, 1981.
4. "Four Mode Power Controller", Ser. No. 106,809 filed Dec. 26, 1979, now U.S. Pat. No. 4,317,181, issued Feb. 23, 1982.

BACKGROUND OF THE INVENTION

1. Field of the Invention

This invention relates to a data processing system operable to perform a table lookup function and more particularly to a parallel processing system having multiple independent read only memory program storage areas which allow performing table lookup functions.

2. Prior Art

Conventional data processing systems perform the table lookup function utilizing, most frequently, a software tree. Beginning with a code value which specifies the table entry point address, a BIT of the code is tested to determine whether a conditional branch is to be taken. At the new location, whether it be the branch location or a fall-through location, the process is repeated, and so on, until the last bit is tested and the table value is located. Although the operation at each step in the iterative process is similar, dedicated instructions are normally required since branch instructions are generally fixed instructions. While it is possible to make the branch instruction modifiable, this requires the use of either a binary program counter or a binary to shift code conversion circuit to implement the table lookup function, either of these circuits requiring a large area of semiconductor wafer.

SUMMARY OF THE INVENTION

It is an object of the present invention to implement a table lookup technique which is much faster and less costly in number of instruction words than present techniques, without requiring a large area of semiconductor surface.

In accordance with the present invention, there is provided a data processing system comprised of two independent read only memories, each read only memory having an individual associated program counter, wherein table lookup is accomplshed by having an instruction signal pattern output from one read only memory conditionally advance the program counter of the other read only memory so that upon completion of the output from the one read only memory, control is transferred to the other read only memory, with said other read only memory's program counter containing a predetermined value equivalent to the table lookup value desired, or to a branch word pointing to a value or routine in said other read only memory. In the preferred embodiment, the execution of a particular data signal pattern (CALL) in a fast read only memory (said one ROM) causes the program counter for said other ROM (main program counter) to advance one step forward in the program count sequence. Thus, for example, if a number represents the table entry value and is decremented in the fast ROM, decrementing once during each execution of a CALL instruction signal pattern in said fast ROM, then upon return to the main ROM, the main program counter will point to the desired entry point in the main ROM. Thus, the data signal stored pattern (routine) stored in the fast ROM may be any routine which executes a variable number of CALLs and the main ROM entry point may contain values to be directly used or may contain data signal patterns representing the beginning of new program routines in the main ROM.

The embodiments of the present invention may be better understood with reference to FIGS. 9J–K, and the accompanying description.

In one embodiment, a data processing system is comprised of a first memory means (1180) for selectively outputting a data signal responsive to an address signal. The first memory means (1180) may be a read only memory or a read write memory, and in the preferred embodiment is a read only memory comprising the main memory of the data processing system. The data processing system is further comprised of a counter means (1182) for selectively outputting an output signal responsive to an enable signal. The counter means (1182) is associated with the first memory means (1180), and in the preferred embodiment is the main program counter. The data processing system is further comprised of a fast memory means (1185) for outputting data signals. The fast memory means (1185) may be read only memory, or read write memory, and in the preferred embodiment is a read only memory which has an access time much faster than that of the first memory means (1180). The data processing system is further comprised of a means (1190) for selectively incrementing the counter means (1182) responsive to a particular one of the data signals as output from the fast memory means (1185). The means (1190) may comprise random digital logic, programmable logic array, or other decode structure. Finally, one embodiment of the data processing system is comprised of a means (1190) for selectively outputting the enable signal responsive to a certain one of the data signals as output from the fast memory means. The means for selectively outputting the enable signal may be combined with the means for selectively incrementing the counter means, or may be comprised of a separate circuit structure performing the data decode function.

In an alternate embodiment of the data processing system, the system is further includes means for selectively enabling and disabling the fast memory means responsive to a particular one of the data signals as output by the first memory means. The means (1186) for selectively enabling and disabling the fast memory means may be comprised of decode logic circuitry, such as random logic, programmable logic, or other decode circuitry.

In another alternate embodiment, the data processing system is further comprised of a fast counter means (1187) for providing fast memory address signal outputs, wherein the fast memory means outputs data signals from selected locations responsive to the fast memory address signal outputs.

In yet another alternate embodiment, the data processing system is further comprised of an input means (1191) for selectively providing an output signal responsive to an input stimulus, such as a keyboard, magnetic tape or disc, or other input stimulus. The system is further comprised of a processing means (1195) for selectively performing operations (such as data processing, logic, boolean) and for selectively outputting a representation signal responsive to the data signals and the input signal. The system is further comprised of an output means (1192) for selectively providing an output representation (such as a visual display, audible display, or other output representation) responsive to the representation signal.

The data processing system is further comprised of a means (1196) for selectively activating the first memory means (1180), including means for selectively deactivating the second memory means (1185), responsive to particular ones of the second data signals. The means (1196) may be comprised of decode circuitry, or may be a separate circuit function or may be a subpart of a larger circuit function, such as the means (1190).

In a preferred embodiment, as shown with reference to FIG. 9K, a data processing system is comprised of a first memory means (1200) for generating a first data signal responsive to a first select signal. The first memory means (1200) is the fast ROM in the preferred embodiment. The system is further comprised of a means (1228) for generating an increment signal responsive to particular ones of the first data signal. The means (1228) may be an independent logic circuit block, or may form a subpart of the second program counter (1220) associated with the second memory means (1215). The system is further comprised of a second memory means (1215) for selectively generating a second data signal responsive to a second select signal. In the preferred embodiment, the second memory means is the slow or main ROM. The system is further comprised of a first counter means (1205) for generating the first select signal corresponding to a stored count value responsive to a first control signal. In the preferred embodiment, the first counter means (1205) is of a storage/counter/shift register configuration, but may be comprised of any counter and storage mechanism. The system is further comprised of a second counter means (1224) for selectively generating the second select signal corresponding to a stored count value responsive to a second control signal. The second counter means may be of the same structure type as the first counter means, and may additionally include as a subpart the means (1228) for selectively generating an increment signal. The system is further comprised of a means (1228) of FIG. 9K for selectively incrementing the stored count value in the second counter means (1224) responsive to the increment signal. The means for incrementing the stored count value may form an independent logic block or may be combined with the increment logic block 1228 forming the means for generating the increment signal. The system is further comprised of a controller means (1210) for selectively generating the first and second control signals responsive to the first and second data signals. The controller means (1210) may be comprised of digital random logic, a central processing unit, or simple decode circuitry.

In an alternate embodiment of the preferred embodiment, the data processing system is further comprised of a means for locating a particular one of the second data signal stored in a predefined format in the second memory means responsive to the first data signals and the increment signal. The means for locating a particular one of said second data signal allows for a multiple memory into linked table lookup as between a routine of data signal patterns stored in the second memory means and a routine of data signals as stored in the first memory means.

In the preferred embodiment, the first memory means provides a faster select signal to data signal output response time than does the second memory means, thus allowing a high speed table lookup function to be performed responsive to a routine of data signals stored in the second memory means, and then switches control back to the first memory means, allowing for execution or table lookup from data signals stored in the first memory means.

BRIEF DESCRIPTION OF THE DRAWINGS

The novel features believed characteristic of the invention are set forth in the appended claims. The invention itself, however, as well as a preferred mode of use, further objects, and advantages thereof, will be best understood by reference to the following detailed description of illustrative embodiments when read in conjunction with the accompanying drawings, wherein:

FIGS. 9E-G are time sequence block diagrams showing the interaction of the program counter 1125, decode 1130, and memory 1120 through one complete instruction signal pattern decode of an HPC code;

FIG. 9H is a block diagram as in FIG. 9D showing a more detailed block diagram of the HPC decode 1130;

FIGS. 11A-D are detailed schematic drawings of a preferred embodiment of the instruction decode logic 290;

FIGS. 12A-D are detailed schematic diagrams of a preferred embodiment of the arithmetic logic unit 128;

FIG. 13 is a block diagram of a data processing system in a preferred embodiment having multiple memory pointer registers X, Y and Z, and a bus splitting means, as described in copending application Ser. No. 196,808, "Multiple Memory Pointer System", filed Oct. 14, 1980.

FIGS. 14A-B are detailed circuit schematic drawings of a preferred embodiment of the page decode 299 and main (slow ROM) array and program counter address decode circuitry 298;

FIGS. 16A-C are detailed circuit schematic drawings of a preferred embodiment of the fast read only memory (ROM) 285 with associated address decode and precharge, discharge, sensing and synchronization logic shown.

DESCRIPTION OF THE PREFERRED EMBODIMENTS

Figure 1:
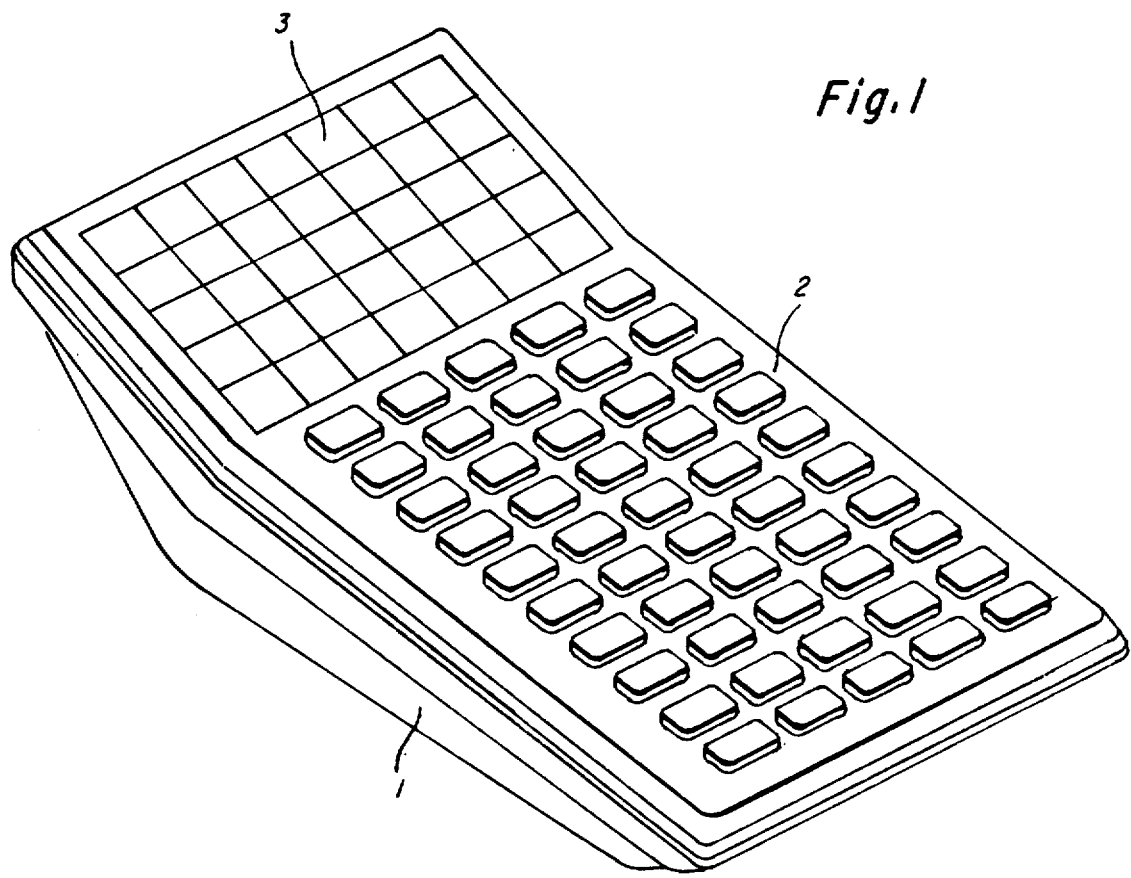
FIG. 1 is a pictoral view of a portable, electronic, handheld calculator of the type which embodies the present invention.

Referring to FIG. 1, an electronic portable calculator of the type which may employ features of this invention is shown in pictoral form. The calculator 1 includes the keyboard 2, and the display 3. Display 3, in the preferred embodiment, consists of 16 alpha-numeric characters, each provided by liquid crystal display devices, or an array of light emitting diodes, a vacuum florescent tube display, or other display device. The display is preferably implemented having complete alpha-numeric display capability so as to be capable of displaying English language messages as well as permitting the display of data in scientific notation, or other output formats. Of course, the type of display and the number of digits displayed in a design choice. The display may be of the 7 segment, 8 segment, 9 segment, 13 segment, or 5×7 dot matric display character, depending on the character display flexibility desired. In a preferred embodiment, a 5×7 dot matrix per character position is utilized to allow for complete alpha-numeric and special character display. A keyboard, 2, or other input means, preferably includes a set of number keys (0-9), a decimal point key, a plurality of function command keys including, for example, exponential, logarithmic, trigonometric and hierarcy functions. The expotential and logarithmic function command keys include, for example, $X^2$, $\sqrt{\ }$, $1/X$, $\log X$, $\ln X$, $y^x$, and $\sqrt[x]{\ }$. The trigonometric functions include, for instance, the sine, cosine, tangent, and their inverses, the hyperbolic sine, hyperbolic cosine, and hyperbolic tangent, and inverse hyperbolic functions. Other function command keys include store (STO), and recall (RCL) keys for respectively storing and recalling a number stored in one of the memory registers. The enter exponent key (EE) allows exponent entry of the number displayed in scientific notation. A $+/-$ key is provided for changing the sign of the display number. An exchange key (X:Y) is provided for exchanging the operator and the operand of an arithmetic function. More conventional function command keys are supplied, including the clear key (C), the clear entry key (CE) and the plus (+), minus (−), multiply (×), divide (÷), and equal (=) keys. Other function keys, in a preferred embodiment, may include alpha-numeric variable keys (A-Z), parenthesis keys, hierarchy control keys, label key (LBL), and programmable feature function keys. The calculator is further provided with OP code keys for performing special functions such as slope, intercept, plotting operations, alpha-numeric operations, operating system hierarchy interface and control and the like.

Figure 2:
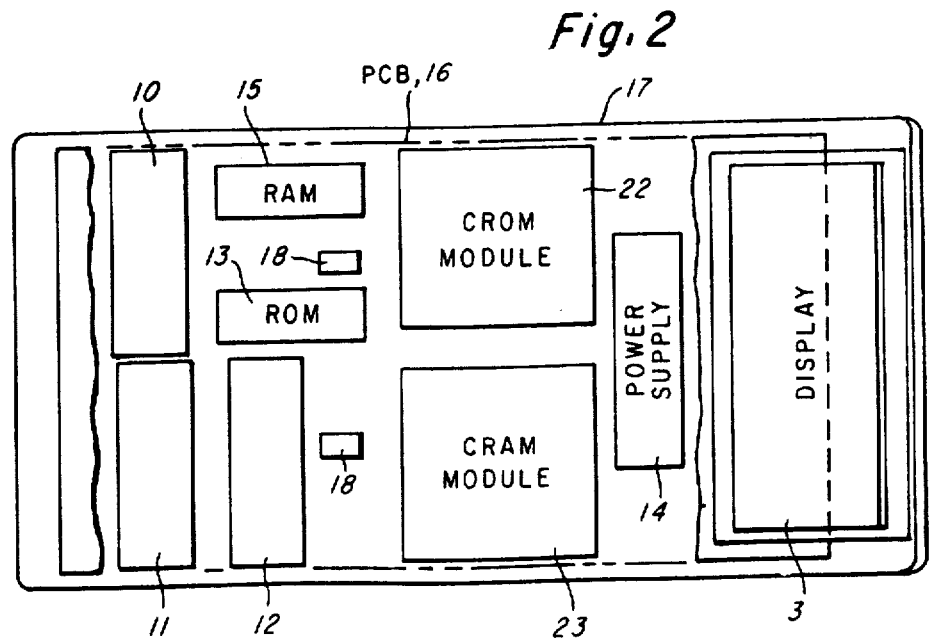
FIG. 2 is a bottom view of the calculator of FIG. 1 showing the placement of major components in the preferred embodiment of the invention of FIG. 1.

Referring to FIG. 2, a bottom view of the calculator 1 of FIG. 1 is shown. The placement of major components in a preferred embodiment of the calculator of FIG. 1 is shown. Controller integrated circuit chips 10, 11, and 12 provide the intelligence and control capabilities of the calculator system. Read/write memory 15, and read only memory 13, provide additional base system data storage beyond that provided on the controller chips 10, 11, and 12. A power supply 14 provides all necessary working voltages to the remainder of the calculator system's electronic components. The controller devices 10, 11 and 12, the read/write memory 15, the read only memory 13, and the power supply 14 are mounted to a main printed circuit board 16 within a calculator case 17. Additionally, compartments within the calculator case 17 are coupled to the main printed circuit board 16 to allow for interconnection of plug-in memory modules 22 and 23 for interconnection to the controller chips 10, 11 and 12.

Figure 3:
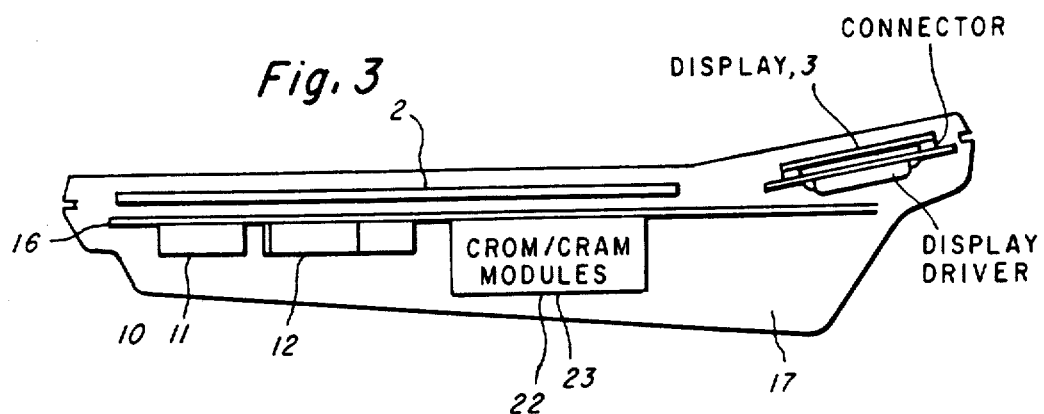
FIG. 3 is a side view of the calculator system of FIG. 1 and 2 detailing the relative placement of components within the calculator housing.

Referring to FIG. 3, a side view of the calculator system of FIGS. 1 and 2 is shown, detailing the relative placement of the controller chips 10, 11, and 12, the display 3, the keyboard 2, printed circuit board 16, and the memory modules 22 and 23, within the calculator case housing 17.

Figure 4A:
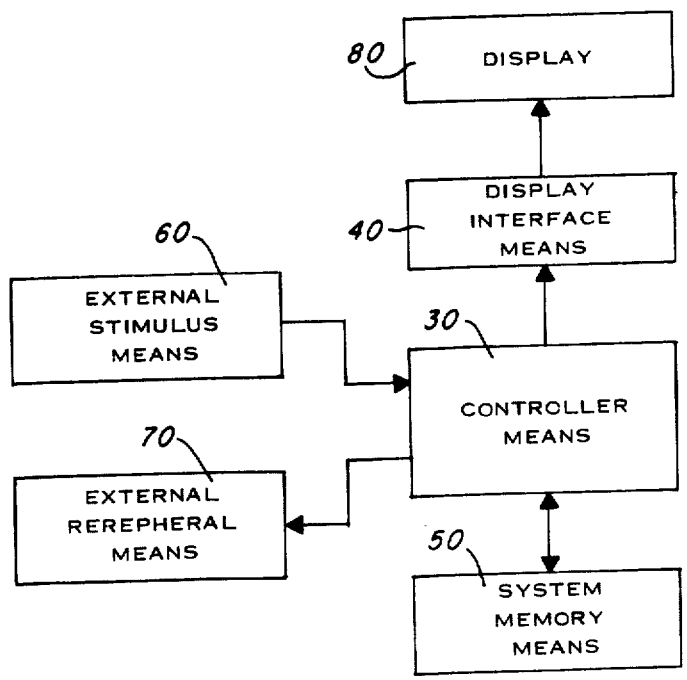
FIGS. 4A-D are functional block diagrams of alternate embodiments of a modular system design utilizing the present invention.
Figure 4B:
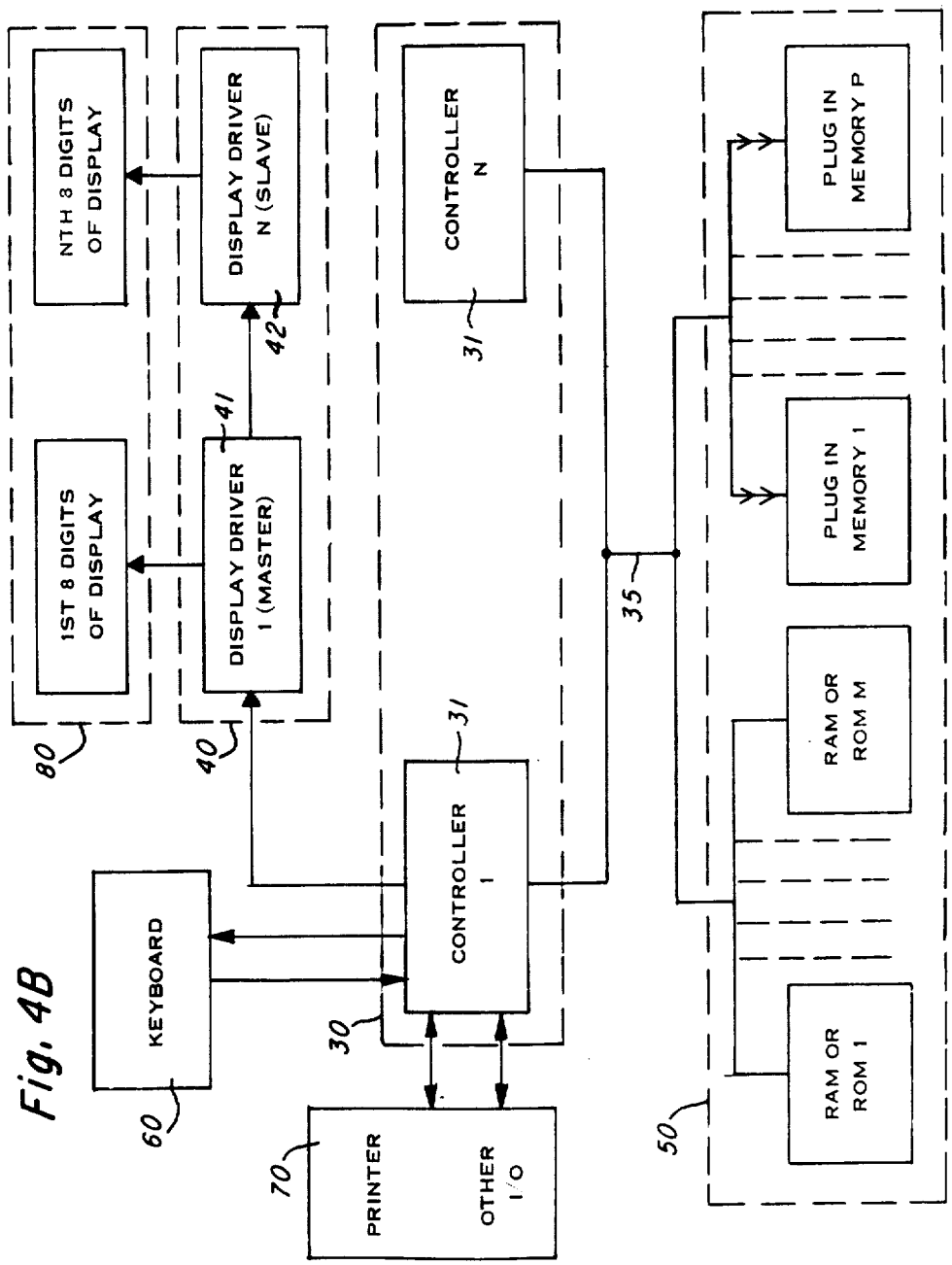

Referring to FIGS. 4A-D, block diagrams of alternate embodiments a modular system design of the present invention are shown. Referring to FIGS. 4A-B, modular controller means 30 is comprised of at least one controller integrated circuit 31 having modular bar size, modular bar I/O, and on bar functional modularity interchangeability within the integrated circuit 31. The controller means 30 provides the central processing capability of the modular system. The controller means 30 may comprise a single modular integrated circuit controller 31, or a plurality of modular integrated circuit controllers 31 interactively forming the controller means 30. In a preferred embodiment, each modular integrated circuit controller 31 is comprised of fixed logic including data processing logic, instruction decode, and other processing and decoding logic functions; modular input and modular output interface means; and partitionable blocks of modular memory including read/write memory means and read only memory means. The controller means 30 is coupled to display interface means 40, to system memory means 50, to external input stimulus means 60, and to external peripheral means 70. The display interface means 40 may be comprised of cascadeable display drivers including a master driver and at least one slave driver, as described in greater detail in co-pending application Ser. No. 168,853, A Data Processing System Having Dual Output Modes, filed July 14, 1980, now U.S. Pat. No. 4,388,696 issued June 14, 1983. Each display driver, master and slave, individually controls sectional blocks of characters of the display 80. Alternatively, the display interface means 40 may be included within the controller means 30. The display interface means 40 is coupled to the display 80 for providing communications to and power for the display 80. The controller means 30, in a preferred embodiment, communicates only with the master display driver 41, with the master display driver 41 cascading an output to provide communication to the slave display drivers 42, thereby providing for uniform and simplified controller means 30 to display 80 interface, irrespective of the number of characters in the display 80. The system memory means 50 provides additional data storage capability for the controller means 30. In a preferred embodiment, the system memory means 50 is comprised of individual modules of read/write and read only memory means, such as the read/write memory 15, read only memory 13, and the plug-in memory means 22 and 23 as described with reference to FIG. 2. A common communication bus 35 couples the controller means 30 to the read/write and read only memory means of the system memory means 50, as described in greater detail with reference to FIGS. 14-16, and FIG. 26, infra. The external stimulus means 60 may be comprised of keyboard input means, external digital data storage means such as magnetic tape, card, or disk, or digital communication means such as a modem. The external peripheral means 70 provides for communication from the controller means 30 to the ultimate user. The external peripheral means 70 may be comprised of hard copy printer, video display, or may alternatively provide for non-volatile data storage.

Figure 4C:
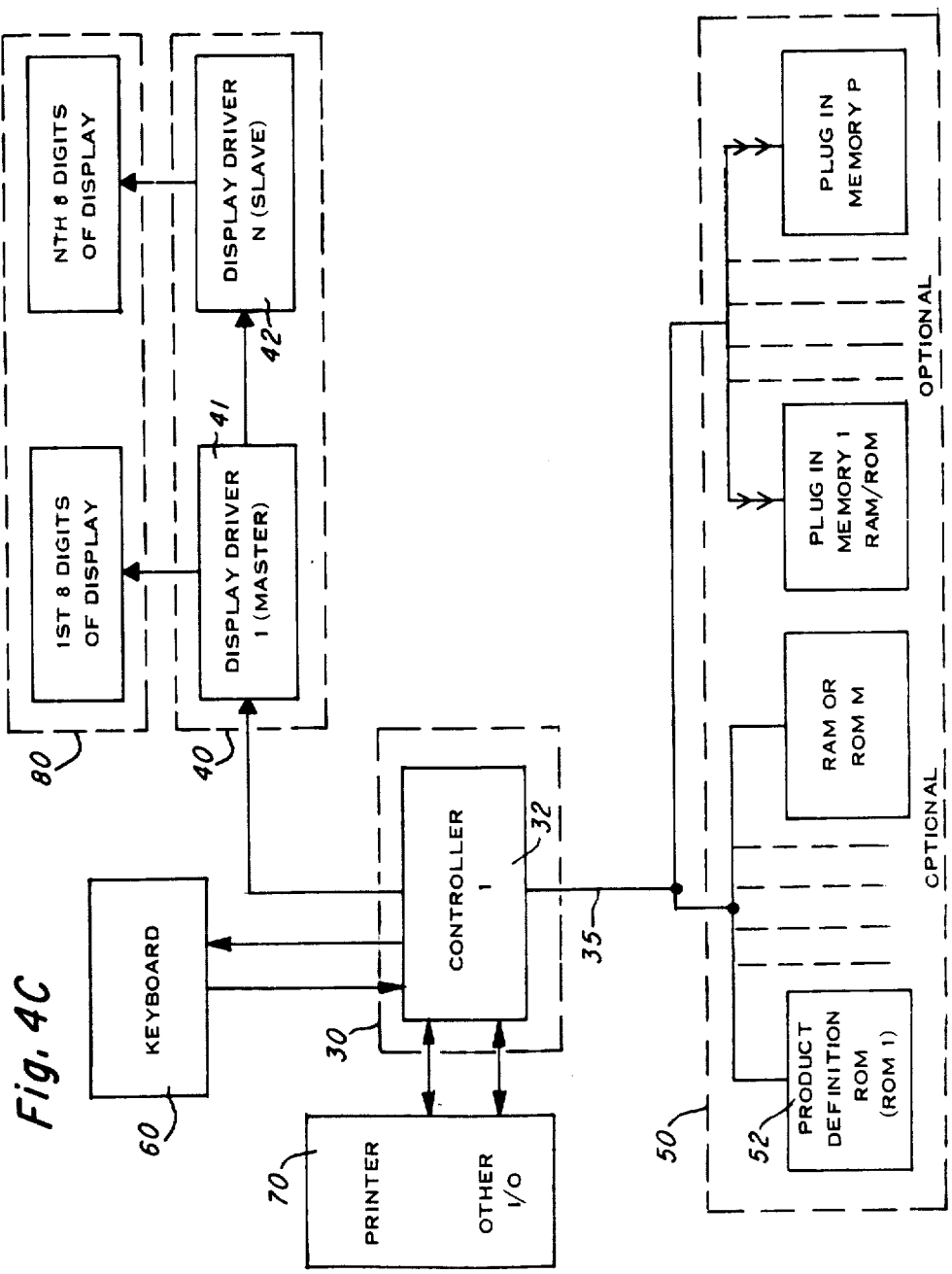

Referring to FIG. 4C, a block diagram of an alternative embodiment of the modular system of the present invention is shown. The block diagram of FIG. 4C is similar to that of FIG. 4B except that in the alternative embodiment the controller means 30 and memory means 50 are different than those shown in FIG. 4B. The controller means 30 is comprised of a universal algorithm controller 32 coupled to the keyboard input means 60, the printer means 70, and the display driver means 40. The display driver means 40 couples to the display 80. Alternatively, the display driver means 40 may be included within the universal algorithm controller integrated circuit 32. Furthermore, the universal algorithm controller 32 is coupled to a product definition ROM 52 in the memory means 50. Additionally, the universal algorithm controller 32 may be coupled to additional RAM or ROM memories within the memory means 50, either as a fixed part of the calculator system, or as plug in memories, as described with reference to FIGS. 2-3.

Figure 4D:
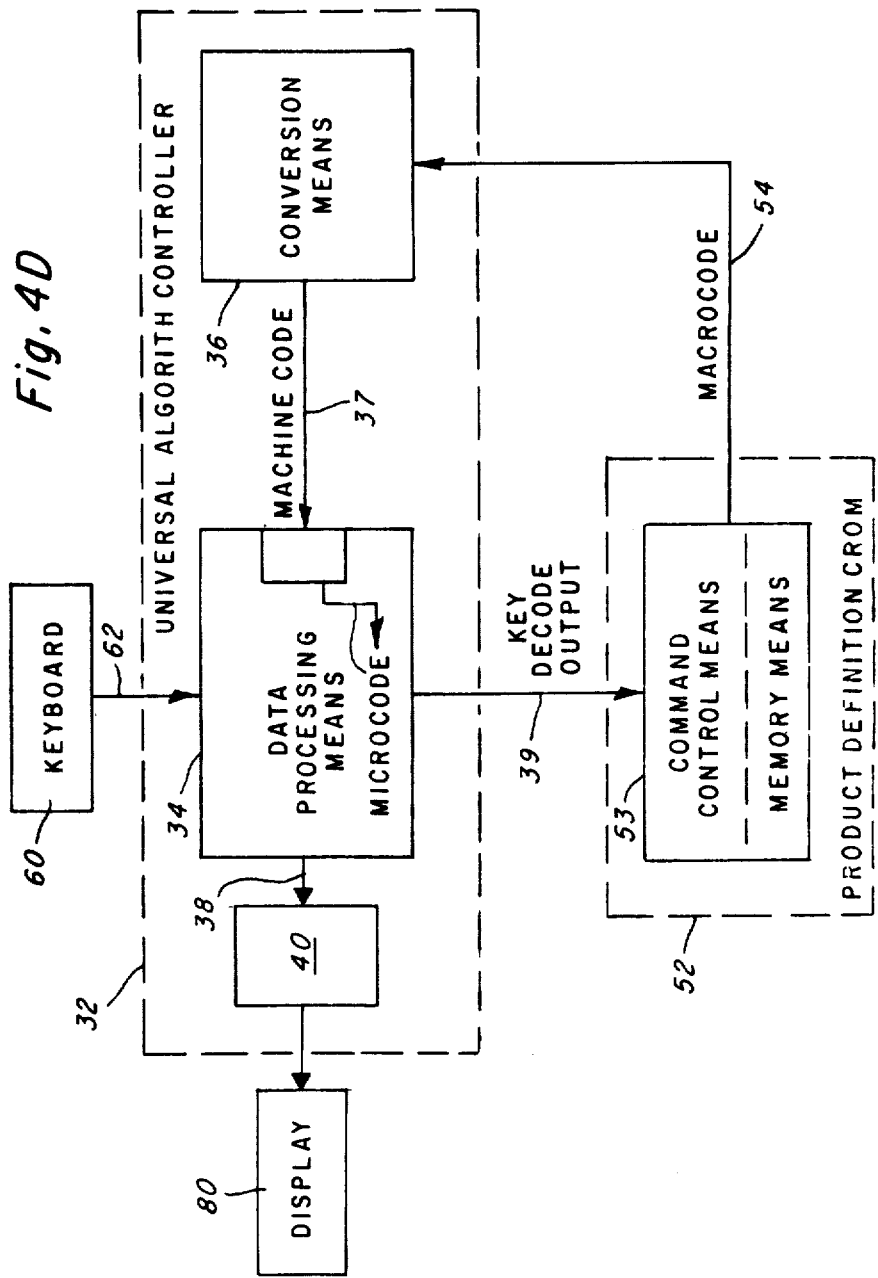

Referring to FIG. 4D, a detailed block diagram of the universal algorithm controller embodiment of the present invention is shown. The keyboard 60 selectively provides input signals 62 responsive to user provided key activations. The universal algorithm controller integrated circuit 32 is coupled to the keyboard input means 60, and to a command control means 52 comprising the product definition ROM. Additionally, the universl algorithm controller 32 provides an output 38 to drive the display 80. The universal algorithm controller 32 is comprised of a data processing means 34, coupled to the keyboard input means 60, for providing an operation signal, such as a key decode output 39, indicative of the received input signal 62 from the keyboard means, and for providing a display signal 38 in response to receiving an instruction signal 37. A code conversion means 36 is coupled to the data processing means 34 for providing a selected machine code instruction signal 37 in response to receiving a macrocode command signal 54 from the product definition ROM 52. The command control means 53 of the product definition ROM 52 is coupled to the data processing means 34 and to the code conversion means 36 for providing the command signal output 54 in response to receiving the key decode operation signal 39. The unique calculator functions to be performed are stored in macrocode in the memory means 50, including the product definition ROM 52, and may be supplemented by the plug in memories for a new calculator design.

Figure 5A:
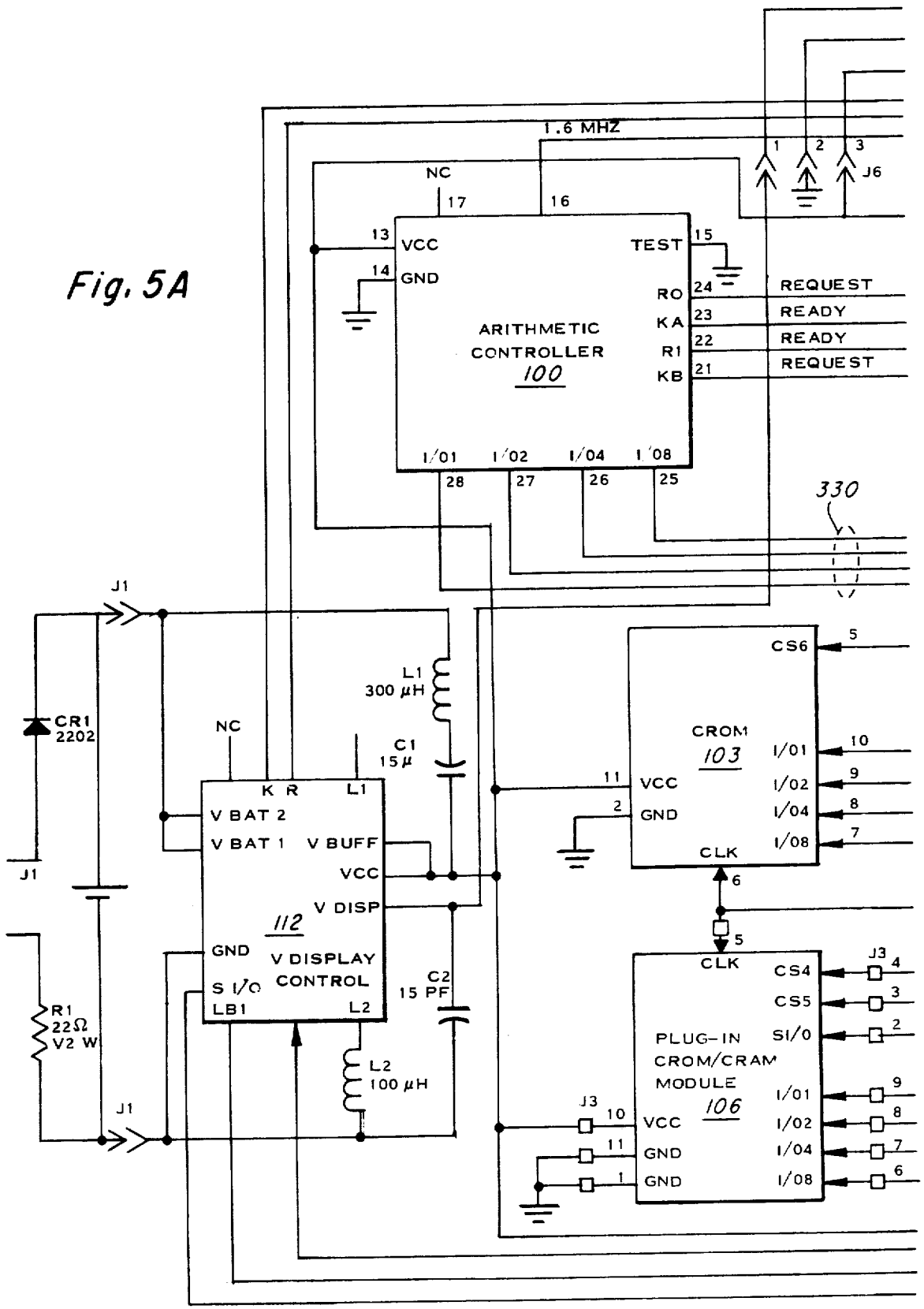
FIGS. 5A-C form a detailed schematic logic diagram of a preferred embodiment of the modular calculator system of FIGS. 4A-B implemented in the calculator of FIG. 2.
Figure 5B:
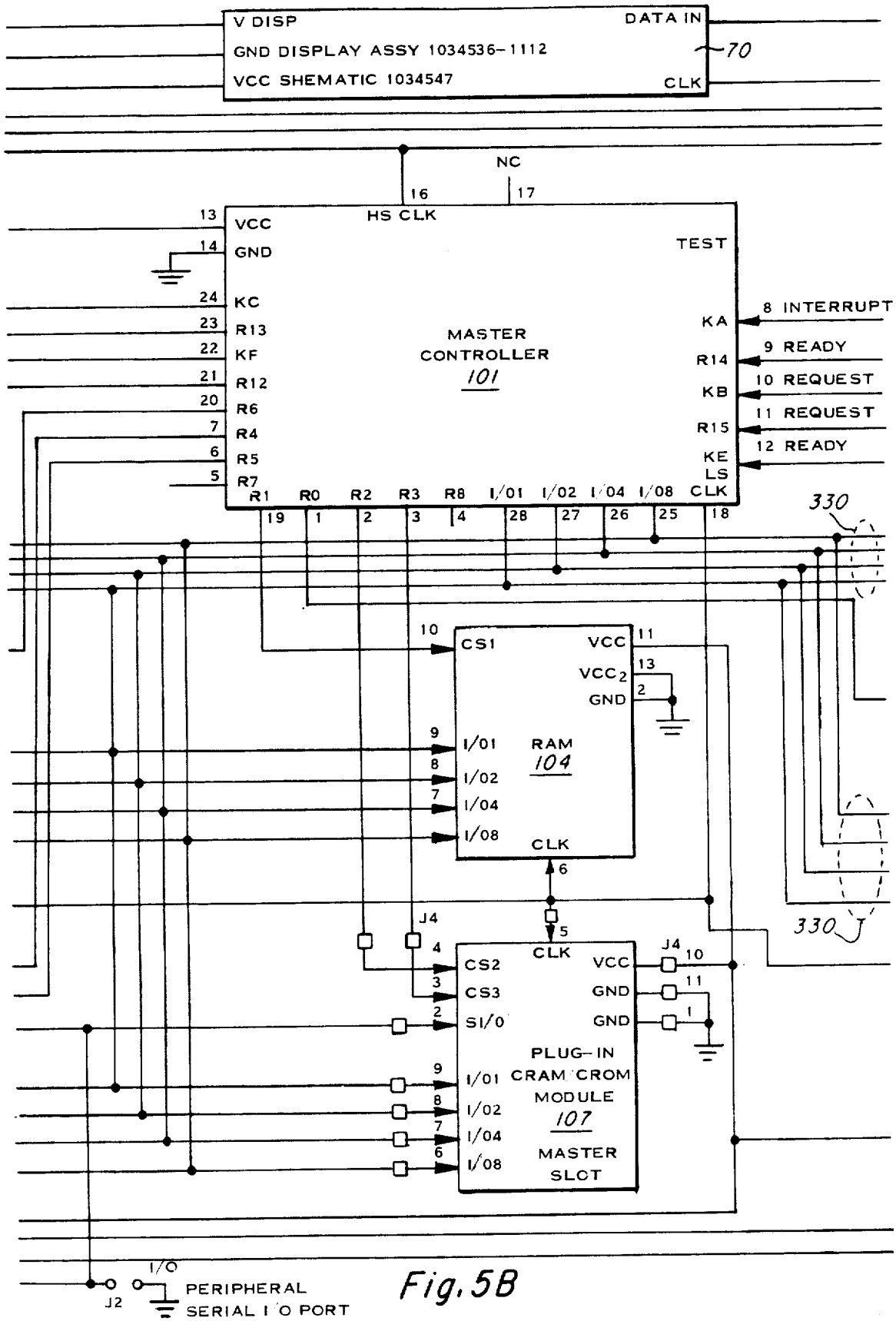
Figure 5C:
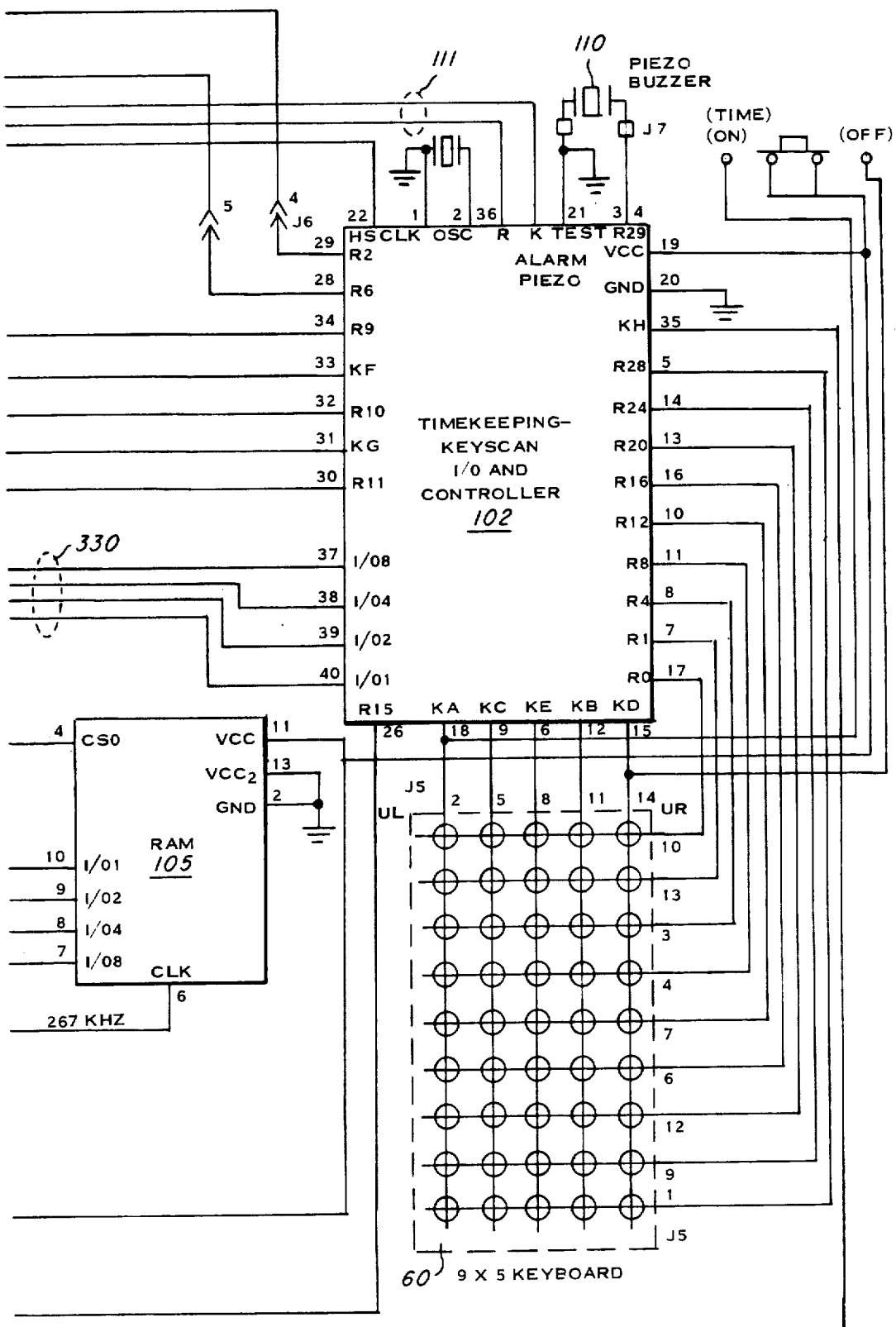

Referring to FIGS. 5A-C, a detailed schematic of an embodiment of the calculator system of FIGS. 4A-B as implemented in the calculator 1 of FIG. 2 is shown.

The calculator system of FIGS. 5A-C may be comprised of the controller means 30, as shown in FIGS. 4A-B, expandable in functional blocks, for providing arithmetic processing and data manipulation and processing such as the arithmetic controller 100, master controller 101 and timekeeping key scan and I/O controller 102; an input means, such as the keyboard 60, coupled to the controller means 30, for providing outputs to the controller means in response to an externally supplied stimulus; a memory means 50 such as the memory 103, 104, 105, 106, and 107, expandable in partitioned blocks, coupled to the controller means 30, for storing data and providing data outputs to the controller means 30 in response to receiving select inputs; a display interface means, such as the cascadable display drivers 70 and display interface chip 112, expandable in partitioned blocks, coupled to the controller means 30, for receiving outputs from the controller means 30 representative of a desired character display, and providing display drive outputs corresponding to the desired character display compatable in voltage and timing with a selected display technology such as a liquid crystal display; and a display device such as a liquid crystal display, expandable in partitioned blocks corresponding to the partitioned blocks of the display interface means and connected thereto, the display device being of the particular display technology compatable with the display interface means and timing such as that output from that controller 112, for receiving the outputs from the display interface means and for providing a visable representation of the desired character display in response thereto. As is described in greater detail in co-pending application Ser. No. 168,853, A Data Processing System Having Dual Output Modes, filed July 14, 1980, the cascadable display driver 70 is comprised of a master display driver and at least one slave display driver, each display driver forming a partitioned block of the display interface. The master display driver being coupled to the controller means and coupled to one of the slave display drivers, the master display driver converting a received output from the controller means into a slave communication output for connection to the first slave display driver, all other slave display drivers being connected in daisy chain with the first slave display driver. Each slave display driver couples the slave communication output from the proceeding slave display driver to the next slave display driver.

In the preferred embodiment, the calculator system of FIGS. 5A-C includes a controller means 30 expandable in functional blocks, for providing arithmetic processing and data manipulation and processing in the master controller 101, and timekeeping I/O functions in controller 102. In the preferred embodiment, the controller 100 of FIG. 5A is combined to be contained with the controller 101. The master controller 101 is coupled to the I/O controller 102 to allow for communication between the individual controllers. The memory means 50 of FIGS. 4A-B is shown in FIGS. 5A-C as comprised of on board read only memory 103 and on-board read/write memories 104 and 105, as well as plug-in memories 106 and 107 which may be either read only, read/write or a combination thereof. The external stimulus means 60 is shown in part as a 9×5 keyboard coupled to the I/O controller 102 of the controller means 30. Additionally, the I/O controller 102 is coupled to an external peripheral piezoelectric buzzer 110, and has provisions for connection to an additional external peripheral, such as printer connection 111. The display interface 40 is comprised of the cascadable display drivers 70 and the display interface voltage controller chip 112. The display voltage controller chip provides regulated multi-voltage power source supplies for the liquid crystal display, as well as for providing regulated power supply voltages to the integrated circuit chips of the calculator system of FIGS. 5A-C.

Figure 6:
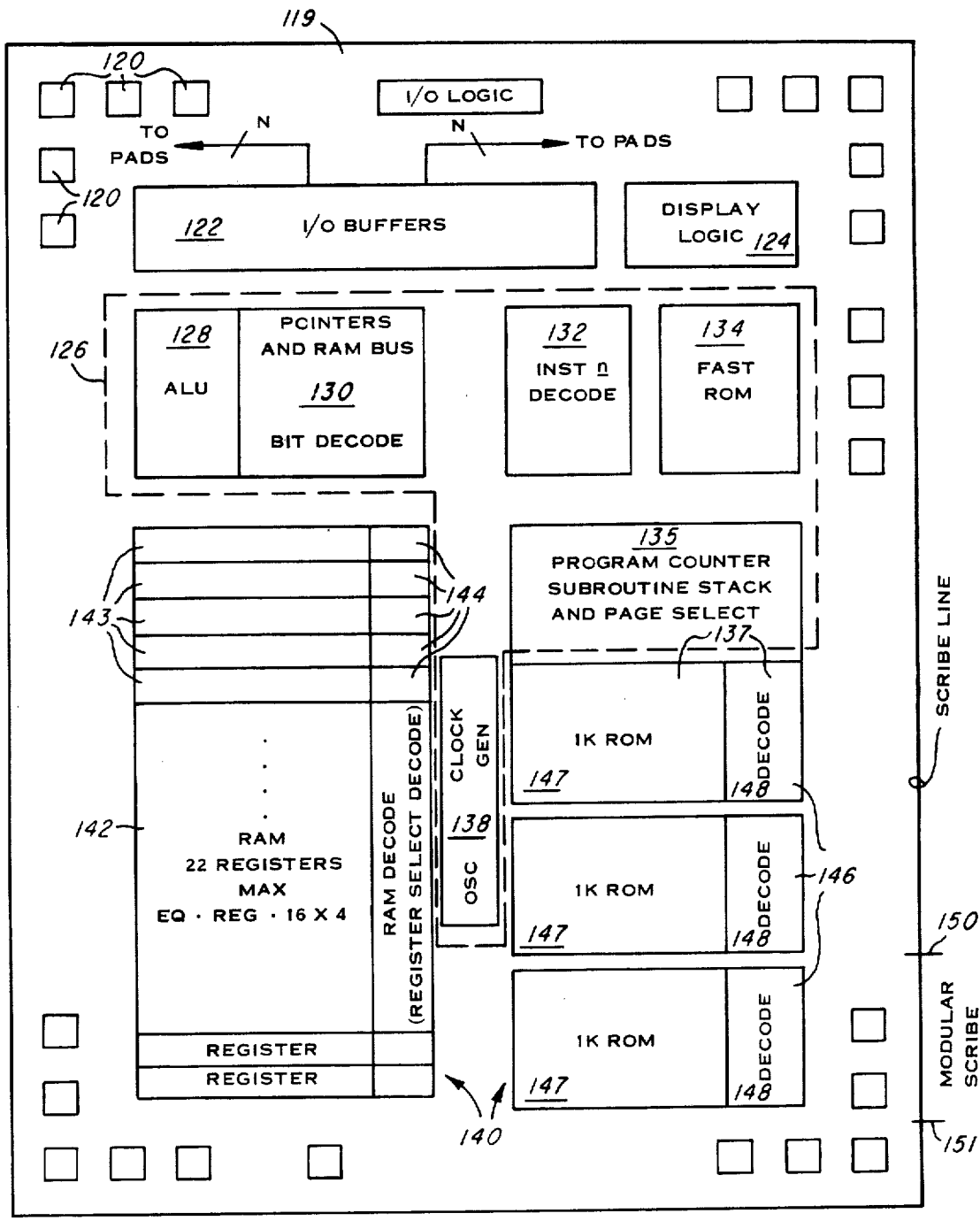
FIG. 6 is bar layout block diagrams of a preferred embodiment of a modular controller integrated circuit of the controller means 30 of FIGS. 4A-D, showing three levels of modular layout reduction.

Referring to FIG. 6, a layout block diagram of a preferred embodiment of a modular controller chip of the controller means 30 of FIGS. 4A-D is shown. Bonding pads 120 are distributed along the external periphery of integrated circuit chip 119. A modular input/output buffer and interconnect (I/O) means 122 is laid adjacent a first edge of the integrated circuit chip 119, and is selectively coupled to the bonding pads 120. Display logic 124 provides an additional level of functional modularity to the integrated circuit chip 119 and may be deleted from the layout or left in the design as required by the end application. The display logic 124 provides voltage buffering and timing interface for interconnection of the integrated circuit chip 119 to an external liquid crystal display or other type of alphanumeric or graphic display. A common block of logic forming non-modular circuit group 126 is comprised of fixed circuit function groups for providing data processing and manipulation in accordance with a stored instruction set. The circuit group 126 is comprised of an arithmetic logic unit 128, address pointers, and RAM bus and bit decode circuit means 130, instruction decode circuit means 132, high speed (fast) read only memory (ROM) 134, and program counter, subroutine stack, and page select circuit means 136. A clock generator means 138, although forming a function block of the circuit group 126, may be physically relocated on the integrated circuit chip 119 closer towards the first edge as necessary to accommodate a smaller bar size. In the preferred embodiment, the circuit group 126 is located physically adjacent to the I/O means 122. A partitionable modular memory circuit 140 is physically located adjacent to the circuit group 126 and coupled thereto. Additionally, the memory circuit 140 is physically located adjacent to a second edge of the integrated circuit chip 119 parallel to and opposite from the fread/write memory circuit 142 is comprised of read/write memory cells grouped into partitionable registers 143 and register select decode grouped into partitionable decode circuits 144, with each partitionable decode circuit 144 being associated with and adjacent to a partitionable register 143, so as to provide for modular partitionable registers 143 each with its own associated decode 144. The read only memory circuit 146 is comprised of a plurality of memory cells grouped into pages 147 (in the preferred embodiment each page comprising 1024 words), each page being partitionable and independent of each other page, and address decode means partitioned into modular decode circuits 148, each decode circuit 148 being adjacent to and associated with a partitionable page 147 so as to allow addressing of particular locations within the associated page. The invention may be more easily understood by comparing FIGS. 6, 7 and 8.

Figure 7:
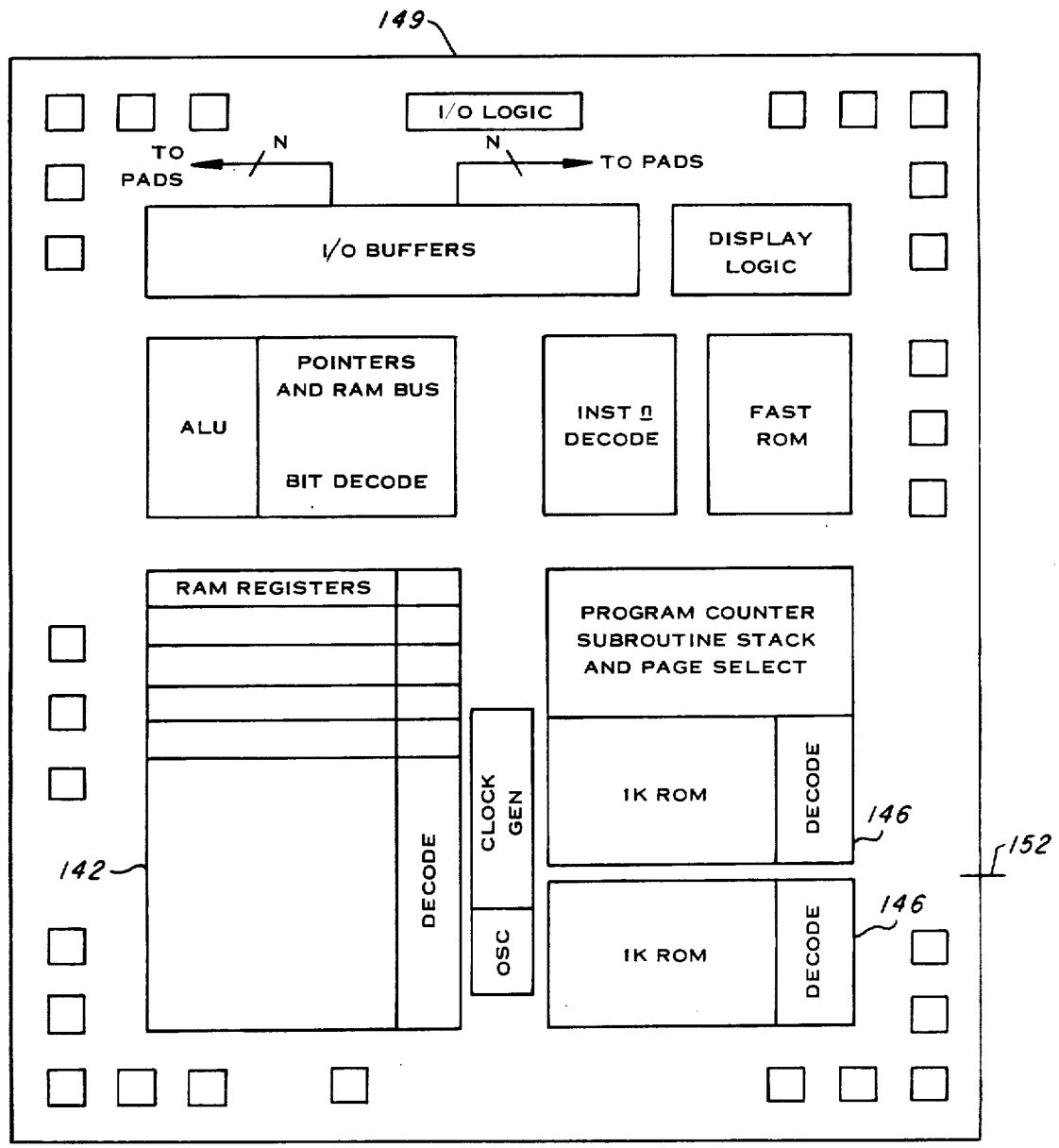
FIG. 7 is an alternative bar layout diagram similar to FIG. 6.

Due to the modular layout and circuit design of the integrated circuit 119 of FIG. 6, partitioned segments of the modular memory means 142 and 146 may be removed from the integrated circuit design bar, substantially without relayout and without circuit redesign of the integrated circuit 119, along the modular scribe lines 150 and 151, and the bar layout compressed so as to result in integrated circuit chip 149 bar layout and design as shown in FIG. 7. As shown in FIG. 7, one page of ROM 147 and associated decode 148, of the read only memory means 146 is removed, and a plurality of registers 143 and associated decode 144, of the read/write memory means 142 are removed in partitioned groups along the modular scribe lines 150 and 151 as shown in FIG. 6, so as to provide an integrated circuit chip 149, as shown in FIG. 7, identical to the integrated circuit chip 119 of FIG. 6, except for the reduced memory capacity and reduced bar size of the chip 149. Thus, a functionally identical circuit of reduced bar size and reduced memory capacity is provided without necessitating redesign or relayout of the integrated circuit. Thus, the read only memory means 146 may be partitioned to include a minimum number of blocks of read only memory cells required to store the desired instruction set codes with the associated address decode circuit including only a sufficient modular portion to address the minimum number of blocks of read only memory. Furthermore, the read/write memory means 142 may be partitioned to include a minimum number of blocks of memory cells required to store data and the associated address decode circuitry partitioned to include only a sufficient modular portion of address circuitry required to address the minimum number of blocks of read/write memory cells.

Figure 8:
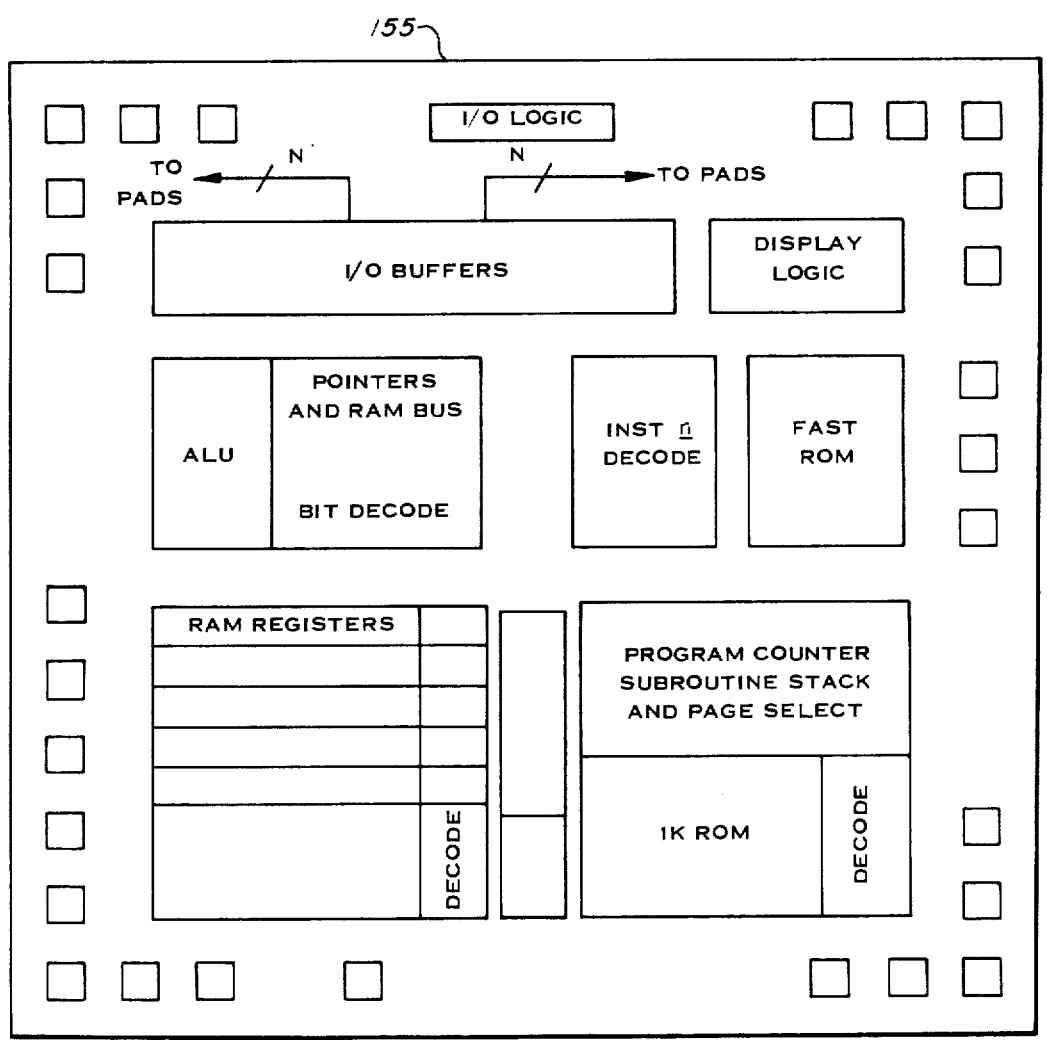
FIG. 8 is an alternative bar layout diagram similar to FIGS. 6 and 7.

Referring to FIG. 8, a further reduction in bar size and memory capacity of the integrated circuit chip 149 of FIG. 7 is shown in the resultant integrated circuit chip 155. By removing selected modules of the partitioned memory circuit groups of the read only memory means 146 and the read/write memory means 142, in the manner as described above with reference to FIG. 7, but with removal being made along the modular scribe line 152 of the integrated circuit chip 149, the resultant integrated circuit chip 155 is created without circuitry redesign and essentially without chip relayout (possibly moving bonding pads if so desired) from the integrated circuit chip 149, of FIG. 7. It is also possible to derive the integrated circuit chip 155 of FIG. 8 directly from the integrated circuit chip 119 of FIG. 6. The modular features of the I/O means 122 and display logic means 124 are available and unchanged in the integrated circuit chips 119, 149 and 155, and will be described in greater detail, infra.

Referring again to FIGS. 5A-5C, a preferred embodiment of the controller 30 of FIG. 4A is shown as comprised of a four bit parallel processor family comprising controllers 100, 101, and 102. The members of the controller family may differ in the sizes of the control and data storage areas and in the input/output logic circuitry, as described with reference to FIGS. 6-8. Optional logic blocks which may be implemented in the controller chips 119 of FIG. 6, 149 of FIG. 7, or 155 of FIG. 8 may provide high speed subroutine execution, display interface logic, and timekeeping functions. A common instruction set may be implemented in all versions of the controller, and may be structured to provide adequate power in the complex version (e.g. 119) without burdening the less complex versions (e.g., 155) with unused instructions and circuitry.

Referring to FIG. 6, it may be seen that the controller is physically, as well as logically modular. A central module 126 is common to all versions of the controller, and is comprised of a block of logic containing program counters/subroutine stack/and page select logic 135, as discussed in greater detail with reference to FIGS. 10A,10G; instruction decode circuitry 132, as described in greater detail with reference to FIGS. 11A-B, the arithmetic logic unit (ALU) 128, as described in greater detail with reference to FIGS. 12A-D, the memory pointers and accumulator 130, as described in greater detail with reference to FIG. 13; one page of read-only memory and associated decode 137 for instruction word storage as described in greater detail with reference to FIGS. 14A-B; four sets of registers 143 and associated decode 144 (64 read/write RAM words), as described in greater detail with reference to FIGS. 15A-D; and oscillator and clock generator logic 138, as described in greater detail with reference to FIGS. 14A-D.

In a preferred embodiment, the controller circuit 119 of FIG. 6, 149 of FIG. 7, and 155 of FIG. 8, are manufactured with a reverse silicon gate CMOS process (NCMOS) which allows for operation of the circuitry with as little as 1.5 volts applied potential, as disclosed in copending application Ser. No. 081,513 for CMOS Intgegrated Circuit Device and Method of Manufacture, by Graham Tubbs, now U.S. Pat. No. 4,295,897.

In the preferred embodiment, the cntroller circuits 119, 149, and 155 are each a four bit microcomputer. Instruction and control word storage is provided in the read-only memory (ROM) 146, and data storage is provided in the read/write RAM 142. Although the ROM 146 and the RAM 142 are separate from each other, both are integral sections of the integrated circuit forming the controller.

Input/output functions as provided by I/O buffers and logic 122 are memory mapped, in the preferred embodiment, such that all I/O pads and logic blocks are treated as addressable memory locations. In the preferred embodiment, the controller's (30) architecture is a two bus two pointer system, as described in greater detail with reference to FIG. 13, and FIGS. 15A-D. Internal data transfer is handled by two latched four bit data buses while memory operations are effected through two eight bit memory pointers which share the low order four bits, as described with reference to FIG. 13. The low order four bit pointer 400 of FIG. 13, is also a counter. The independent high order four bit pointers and latch buffers are the X register 401 and the Y register 402. The major remaining logic blocks within the architecture of the controller as shown in FIGS. 6, 7 and 8, are comprised of the fixed instruction decoder 132 as shown with reference to 290 of FIGS. 11A-B, and a four bit hex/BCD add/subtract ALU 128, as shown with reference to FIGS. 12A-C and associated status logic of FIG. 12D.

Referring to FIG. 6, the ROM 146 is comprised of page modules 147 and associated decode 148, each module 147 containing 1023 twelve bit words addressed by the program counter and page select logic 135.

Figure 9A:
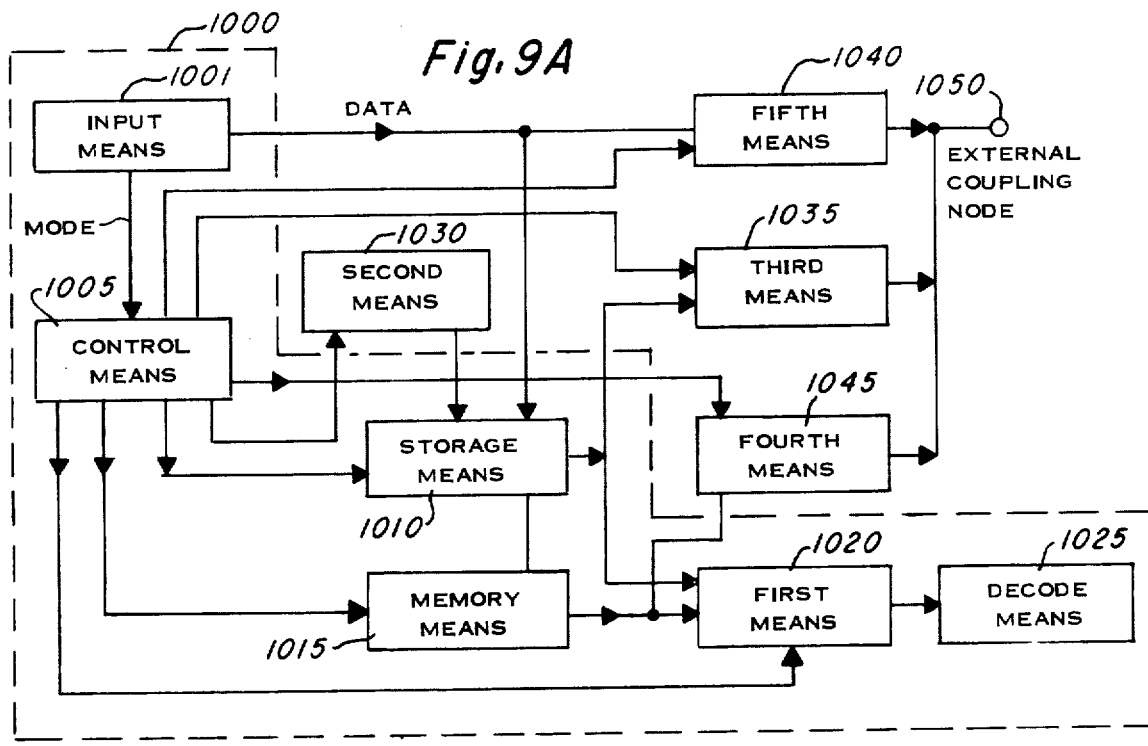
FIGS. 9A-C are block diagrams depicting alternate embodiments of a data processing system operable in a normal or test mode.
Figure 9B:
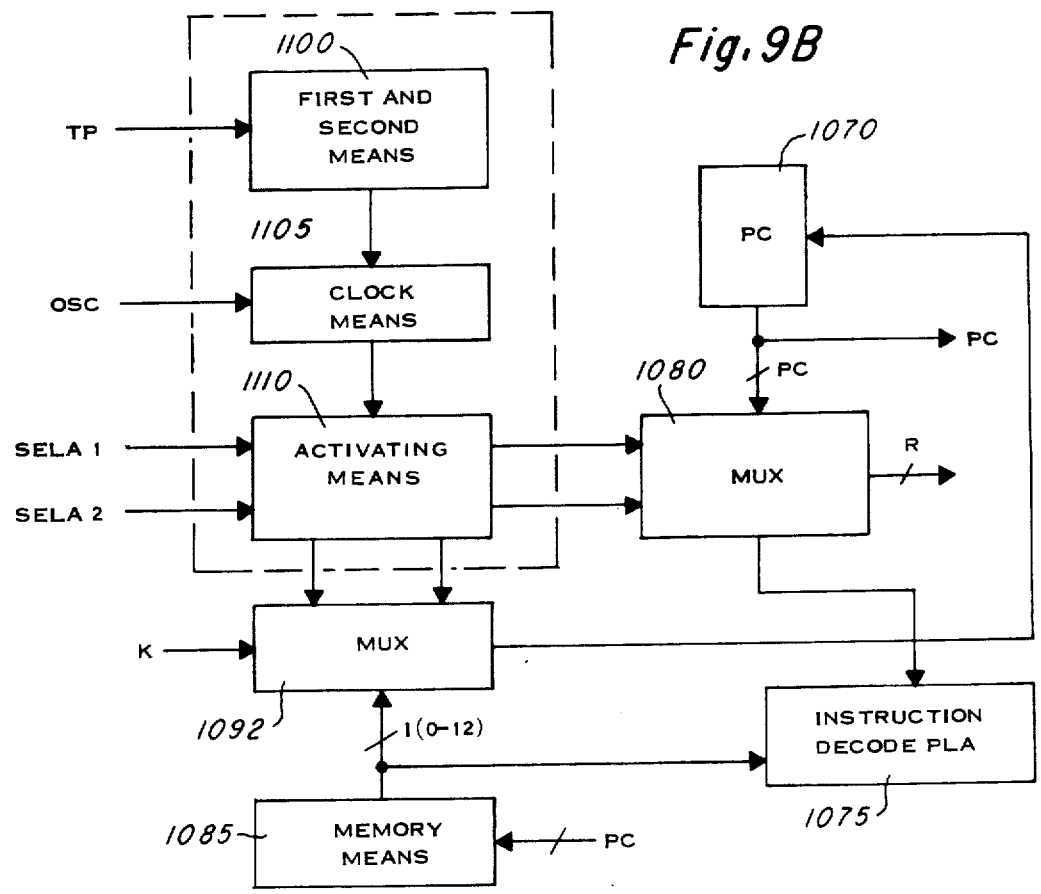
Figure 9C:
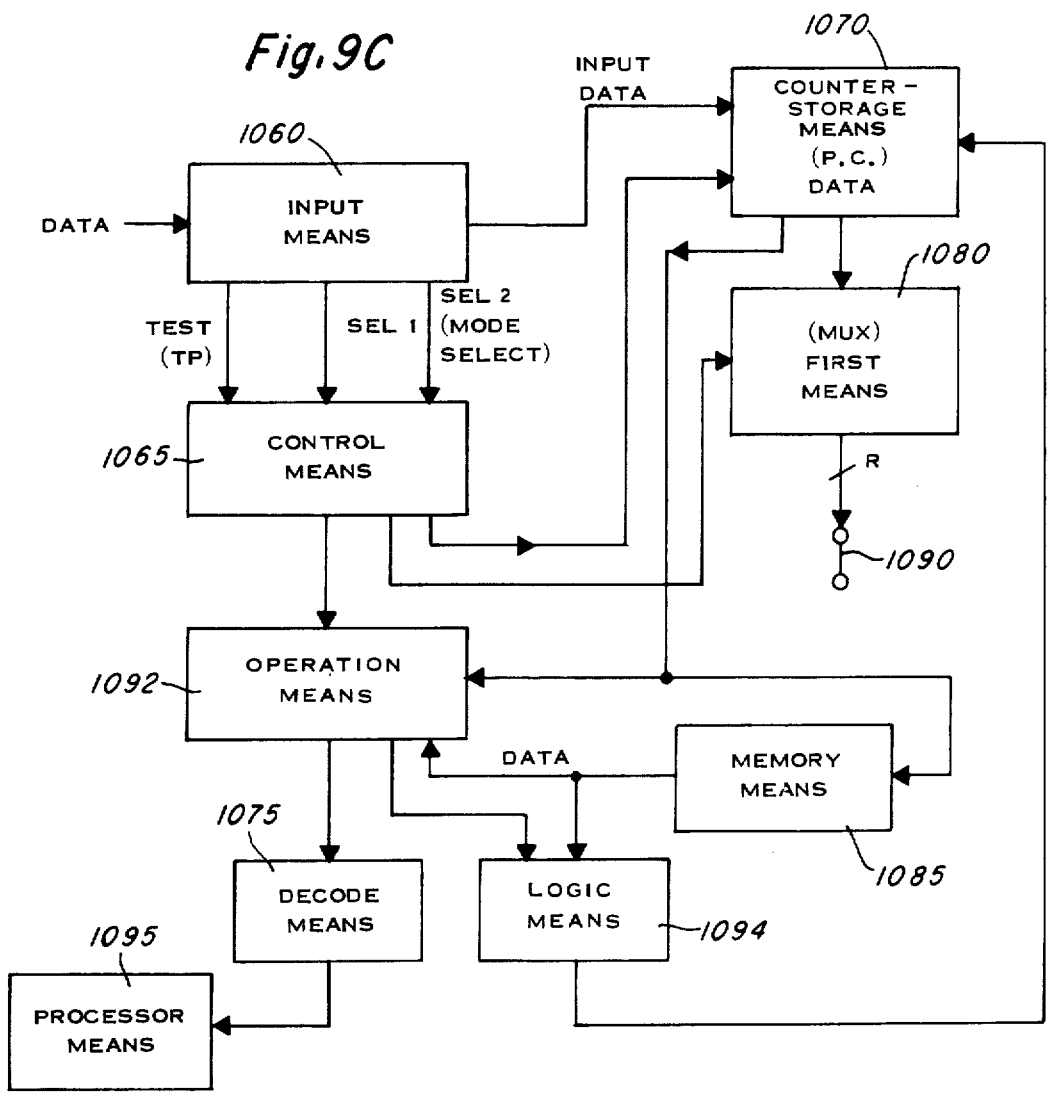

In accordance with the present invention, there is provided a data processing system, in discrete or integrated circuit form, (such as shown in FIGS. 9A-C), which is operable in a normal and in a test mode. The data processing system is comprised of an input means (1001), such as an input buffer coupled to an external power source or signal source, said input means providing a mode signal and a data signal. The system is further comprised of a control means (1005), such as logic pattern decode circuitry, for selectively outputting a control signal responsive to said mode signal. The data processing system is further comprised of a storage means (1010), such as a random access memory, a counter, or latches, for selectively storing and outputting said data signals responsive to said control signal. The system is further comprised of a memory means (1015), such as a read only or read/write random access memory, for selectively outputting stored data signals responsive to said control signal and said storage means output. Further, the data processing system is comprised of a first means (1020), such as a multiplexing or gating circuit means, for selectively coupling as a decode signal a selected one of said storage means (1010) output and said memory means (1015) output so as to generate said decode signal responsive to said control signal. The data processing system is further comprised of a decode means (1025), such as an instruction decode PLA, an instruction decode ROM, or other signal decode means, for selectively performing a data processing operation responsive to said decode signal.

In a preferred embodiment, the data processing system is further comprised of a second means (1030), such as control logic circuitry, for selectively causing said data signals output from said input means (1001) to be stored in said storage means (1010) responsive to said control signal. The data processing system in the preferred embodiment is further comprised of a third means (1035), such as logic gating circuitry or multiplexing circuitry, for selectively coupling said storage means output to an external coupling node (1050) responsive to said control signal. The third means (1035) provides a test mode wherein the contents of the program counter (storage means 1010) are selectively output to an external coupling node which may be monitored by the user testing said data processing system. In the preferred embodiment, the data processing system is further comprised of a fourth means (1045), such as logic circuitry or multiplexing means, for selectively coupling said memory means (1015) output to said external coupling node (1050). The fourth means (1045) provides a test mode wherein the data as output from the memory means (1015) responsive to the address signal as output from the storage means (1010) is coupled to the external coupling node (1050) to provide for selective test monitoring of the interaction of the storage means (1010) and memory means (1015), as well as providing a means for selectively reading the memory means data contents in a test mode.

In the preferred embodiment, the data processing system is further comprised of a fifth means (1040), such as a gating logic circuit or a multiplexer, for selectively coupling said input means (1001) output to said external coupling node (1050). The fifth means (1040) provides for a test mode wherein the data signals stored and output from the input means (1001) may be monitored in the test mode at the external coupling node (1050) so as to allow for selective testing of the proper functioning of the input means (1001).

In an alternate preferred embodiment, the data processing system is further comprised of a means for providing a test signal and a mode select signal responsive to said mode signal, and an enabling means for selectively outputting an enable signal responsive to said test signal being at an active signal level.

In the preferred embodiment and in the alternate preferred embodiment, the data processing system is further characterized in that the control means (1005) includes means for outputting at least one of a plurality of said control signals, said storage means (1010) is responseive only to a first of said control signals, said memory means (1015) is responsive only to a second of said control signals, and said first means (1020) is responsive only to a third of said control signals.

In the preferred embodiment of the data processing system, the data processing system is further characterized in that said second means (1030) is responsive only to a fourth of said control signals.

In the preferred embodiment having said third means (1035), the data processing system is further characterized in that said third means (1035) is responsive only to a fifth of said control signals.

In another embodiment of the present invention, as may be seen in more detail by reference to FIG. 9B, an electronic system is shown which is operable in a test or in a normal mode. The electronic system has an external input data signal (e.g., TP, SELA1, SELA2, OSC, K, of FIG. 9B), and is further comprised of a means (1100) for activating the electronic system to the test mode responsive to said data signal (TP), comprising: a clock means (1105) for providing a clock signal (EN) and a means (1110) for selectively outputting an enable signal responsive to receiving a predefined number of the clock signals and particular ones of said data signals whereby said system is activated to the test mode responsive to the enable signal. The means (1100) for activating the system to the test mode may be comprised of active or passive logic, for example, control logic or gating circuitry, with or without buffering. The clock means (1105) may be comprised of an externally activatable self-contained clock generator, or may be a circuit responsive to an external clock signal providing buffering and selective gating. The means (1110) may be comprised of gating circuitry, PLA, or simple buffers.

In a preferred embodiment of said another embodiment, the electronic system is further characterized in that said particular ones of said data signals is a logic signal pattern repetitively repeated for the predetermined number of clock signals. In this preferred embodiment, the predefined number of clock signals is four instruction cycles. Furthermore, in the preferred embodiment, the electronic system is further characterized in that said logic signal pattern is an all logic high signal pattern.

In yet another embodiment, as shown in FIG. 9C, a data processing system is provided for receiving a data signal and is comprised of a means (1065) for selectively providing an enable signal output responsive to said data signal. The system is further comprised of an input means (1060) for selectively outputting an input signal responsive to the data signal. The system is further comprised of a counter means (1070) for selectively storing and outputting said input signal responsive to the enable signal and the data signal. Further, the system is comprised of a decode means (1075) for selectively outputting an instruction signal responsive to an operation signal. The system is further comprised of a means (1060, 1065, and 1070) for selectively storing the input signal in the counter means responsive to the data signal. The system is further comprised of a means (1092) for selectively outputting as the operation signal one of the counter means output signals or the input signal in response to the enable signal. The means (1065) may be a control logic circuit, decoding, gating, or multiplexing circuitry, for responding to the input signal (TP, SEL1, SEL2), for selectively outputting said enable signal which is coupled to the storage-counter means 1070 and the operation means (1092). The input means (1060), responsive to said data signal, selectively outputs as said input signal either a test (TP) signal, a SEL1, SEL2 mode select signals, or directly couples said data signal to the storage means 1070. The storage means (1070) may be comprised of a counter register, or other incrementable memory or storage means. The counter means (1070) is responsive to the enable signal as output from the control means (1065) and the input data signal as output from the input means (1060). The decode means (1075) may be comprised of a decode matrix, such as a read only memory or diode matrix, a programmable logic array, or random logic circuitry. The means (1092) for selectively outputting the operation signal may be comprised of a gateable multiplexer or other logic circuitry for selectively coupling either one of two input sources to the decode means (1075).

In a preferred embodiment of said another embodiment of FIG. 9C, the system is further comprised of a memory means (1085) for selectively outputting memory signals, wherein said means (1092) for selectively outputting said operation signal is further characterized as selectively outputting as said operation signal one of said counter means output signal, said input signal, and said memory signal, responsive to said enable signal. The memory means 1085 may be comprised of read only or read write random access memory, serial memory, or other storage means.

Further, in the preferred embodiment of said another embodiment of FIG. 9C, the system is further comprised of a means (1094) for selectively storing said instruction signal in said counter means responsive to said enable signal. The means (1094) may be comprised of stand-alone logic circuitry, or may be incorporated as a part of the means (1092).

In an alternate embodiment of said another system of FIG. 9C, the system is further comprised of a means (1080) for selectively coupling said counter means (1070) output signal to an external node (1090) responsive to said enable signal.

In one embodiment of said another embodiment, the system is further comprised of a processor means (1095) for selectively performing a processing operation responsive to said instruction signal. The processor means (1095) may be of the type that performs arithmetic, boolean, logical and other data processing and manipulation functions.

The systems disclosed and described with references to FIGS. 9A to 9C may be understood in more detail by reference to FIGS. 10–16 and the accompanying discussion in the detailed description.

The present invention may be better understood by reference to FIGS. 9D–H. The invention enables the data processing system to repetitively execute a selected instruction signal pattern by selectively holding the program counter at a constant value. In the preferred embodiment, the invention comprises a hold program counter latch and an address counter. A special instruction signal (HPC) sets the hold program counter latch, which causes the program counter to be held at its present value for a predefined number of the subsequent instruction cycles. On each instruction cycle, the address counter is decremented, until the counter value is equal to zero (in the preferred embodiment) which causes the hold program counter latch to be reset. When the hold program counter latch is reset, the program counter advances in its normal sequence to the next address in proper sequence during the next instruction cycle, thereby completing the signal instruction loop. The address counter is loaded with a value comprising a part of the single instruction loop (HPC) instruction.

The data processing system illustrated in FIG. 9H is comprised of a memory means (1120), such as a read only or a read write random access memory or other types of data storage devices, for selectively outputting stored data signals responsive to an address signal. The data processing system is further comprised of cycling means (1130) for selectively outputting a first control signal and a second control signal responsive to any of a first set of said stored data signals. The cycling means (1130) may be comprised of a latch such as 1134, a counter such as 1136, and instruction decode circuitry such as 1132, or may be comprised of any other suitable means for selectively enabling and disabling said program counter (1125) from sequencing. Further, the data processing system is comprised of a counter means (1125) for selectively outputting said address signal, corresponding to a stored count, and means for incrementing said stored counter responsive to said first control signal, including means for selectively inhibiting the incrementing of said stored count for a fixed number of instruction cycles responsive to said second control signal. The counter means (1125) may be comprised of a gateable and selectively incrementable counter or latch circuit, and the means for incrementing and for selectively inhibiting the incrementing of the stored count in the program counter (1125) may comprise a part of the program counter 1125 or may comprise gating logic in addition to a general gateable counter.

In a preferred embodiment, the system is further characterized in that said cycling means (1130) includes means for selectively determining said fixed number of instruction cycles for which said control signal is output responsive to said output stored data signals. The means for selectively determining the fixed number of instruction cycles may be a counter or processor register, such as digit counter 1136 of FIG. 9H.

In the preferred embodiment, the system is further comprised of means within the cycling means (1130) for selectively incrementing said counter means (1125) prior to the output of said first control signal, responsive to said stored data signals. This means within said cycling means may be comprised of a means for outputting a third control signal wherein said program counter is selectively incremented responsive to said third control signal, or may alternately be comprised of said first control signal output preceding in time the output of said second control signal.

Figure 9D:
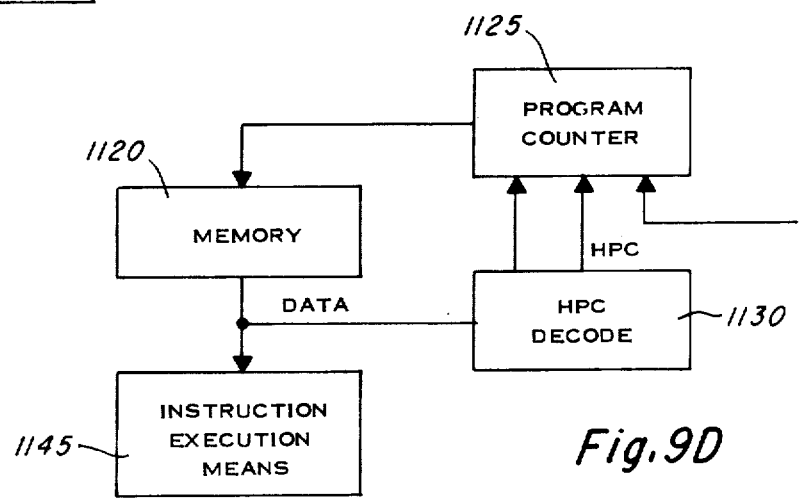
FIG. 9D is a block diagram of a data processing system including a means for causing a program counter to be held at its present value for a predefined number of subsequent instruction cycles.

In the embodiment shown in FIG. 9D, the system is further comprised of instruction execution means (1145) for selectively performing a data processing function responsive to particular ones of said stored data signals, wherein said cycling means (1130), said program counter means (1125), and said memory means (1120) interact so as to cause said instruction execution means (1145) to repeat a particular data processing function for said fixed number of instruction cycles in response to one of said particular ones of said stored data signals being stored in said memory means at a location subsequent to said one of said first set of said stored data signals. In the preferred embodiment, said one of said particular ones of said stored data signals includes an HPC data signal, and said instruction execution means repeats execution for said fixed number of instruction cycles as embedded within the HPC instruction, repeatedly executing the instruction sequentially following the HPC instruction, as shown in greater detail in FIGS. 9E–G.

In an alternate embodiment illustrated in FIG. 9H, the data processing system is comprised of a memory means (1120) for selectively outputting a data signal responsive to an address signal. The memory means may be comprised of read only or read write random access memory, or other data storage and retrieval means. This system is further comprised of counter means (1125) for outputting from a storage counter said address signal, including means for selectively incrementing said storage counter responsive to an inactive hold signal, and means for maintaining said storage counter at the value of said output address signal responsive to an active hold signal. The counter (1125) is, for example, a selectively gateable and incrementable register counter. A decode means (1132) selectively outputs a set signal and a digit signal responsive to the data signal. The instruction decode means (1132) is, for example, comprised of programmable logic array, read only memory, or other decode matrix. The decode means (1132) is coupled to the digit counter means (1136) and to a latch means (1134). The latch means (1134) selectively outputs said active hold signal responsive to said set signal, and includes means for selectively outputting said inactive hold signal responsive to a reset signal. The latch means 1134 is, for example, comprised of an R-S latch, a flip flop, or other settable-resettable memory means. The digit counter (1136) is coupled to receive a clock signal from a means, such as instruction cycle clock 1140, said means (1140) outputting a clock signal periodically repeating each instruction cycle. The digit counter means (1136) is comprised of a means for selectively storing the digit signal responsive to the set signal, and a means for selectively decrementing the stored digit signal responsive to the clock signal, and a means for selectively outputting the reset signal responsive to the stored digit signal being decremented to a predefined value. In the preferred embodiment, the predefined value is zero.

Further, in this preferred embodiment, the system is comprised of an input means for selectively providing an input signal responsive to an operator stimulus, such as a keyboard, or magnetic storage medium. The system is further comprised of a processor means, such as an arithmetic, logic, or other data processing central processing unit, for selectively performing a data processing function responsive to the data signal, including means for selectively providing an output signal responsive to the input signal and the data signal. Further, the system is comprised of an output means for selectively providing a humanly perceptible output indication responsive to the output signal. The output means may be comprised of a display, an audio sound source, or other indication perceivable by human sensory skills, or a data storage device such as a magnetic storage medium. In the preferred embodiment, the system comprises a portable electronic calculator.

Figure 9I:
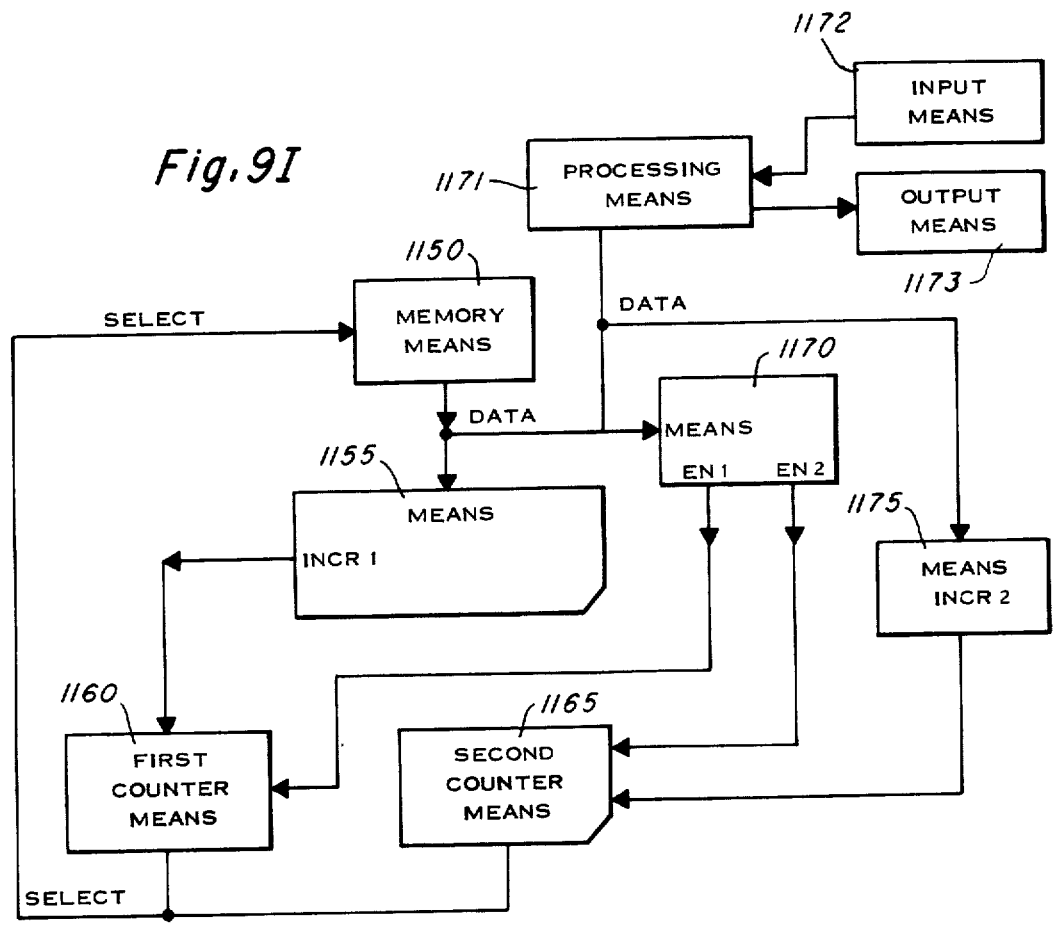
FIG. 9I is a detailed block diagram of a data processing system having multiple memories and an associated program counter with one of the memory outputs selectively controlling the incrementing of the program counter associated with the other memory.

In accordance with the present invention, there is provided a more direct technique of control interaction between the memory means output and the second counter means, thereby improving flexibility in data processing system architecture and improving performance of the data processing system as a whole. Referring to FIG. 9I, there is provided a data processing system comprised of a memory means (1150) for generating data signals responsive to a select signal, including means (1155) for generating an increment signal responsive to particular ones of said data signals; and a counter means (1165) for outputting said select signal corresponding to a stored count value, including means for incrementing said stored count value responsive to said increment signal. The memory means 1150 may be comprised of a read only or a read write random access or serial memory. The counter means may be of a serial shift, recirculate, or other digital logic configuration or may be implemented by an ALU register.

In an alternate embodiment, the data processing system is comprised of a memory means (1150) for generating data signals responsive to a select signal. This system is further comprised of means (1155) for generating an increment signal responsive to particular ones of said data signals. The means (1155) may be comprised of random or combinational logic or may be comprised of a decode matrix, such as a programmable logic array, ROM decode, or other decode circuit. The means (1155) may be an independent stand alone circuit, or may be a subpart of the memory means (1150) or may form a subpart of another functional block within the data processing system. The data processing system is further comprised of means (1170) for selectively generating in an alternative manner, first and second enable signals, responsive to other particular ones of the data signals. The means (1170) are comprised of decode logic, and may be in the form of random or combinational digital logic, programmable logic array, or other decode means. The data processing system is further comprised of a first counter means (1160) for selectively generating the select signal corresponding to a stored count value, responsive to the first enable signal. The first counter means (1160) may comprise a data processing register, a combinational connection of latches and logic, or other cyclic means for storing and outputting a count value. The data processing system is further comprised of a second counter means (1165) for selectively generating the select signal corresponding to a stored count value responsive to said second enable signal. The second counter means may be comprised of the same types of circuitry as the first counter means. The data processing system is further comprised of a second counter means (1165) for selectively generating the select signal corresponding to a stored count value responsive to the second enable signal. The second counter means may be comprised of similar circuitry or the functional equivalent as the first counter means. Additionally, the data processing system is further comprised of a means (1155 or 1175) for selectively incrementing the stored count value in one of the first or second of said counter means (1160 or 1165) responsive to the increment signal. Thus, in the alternate embodiment, multiple address pointers/counters are separately and selectively incrementable responsive to the data output of the memory means.

In a preferred embodiment, the data processing system is further comprised of means for incrementing the stored count value a predetermined number of times responsive to the data signals. Furthermore, in the preferred embodiment, the predetermined number is embedded within a portion of the data signals. Thus, the stored count value in the counter means (1160 or 1165) may selectively be incremented a predetermined number of times as determined from the predetermined number embedded within a portion of the data signal.

The data processing system further includes processing means (1171) for selectively performing operations responsive to the data signals. The processing means may be a data processing ALU, or any circuitry performing combinational, boolean, or other logic functions.

The data processing system is further comprised of an input means (1172), such as a keyboard, magnetic storage medium, or other means for selectively outputting input signals responsive to input stimuli. The input stimuli may be comprised of key depressions, keystroke movement, contact closure, or encoded electrical signals of any sort. The system is further comprised of output means (1173) for selectively providing an output representation signal. The output means may be comprised of a printer, video display monitor, annunciator, audio speech system, or any other means for providing an output representation. The system is characterized in that the processing means (1171) includes means for selectively outputting the output representation signal responsive to the input signal.

In the preferred embodiment, the data processing system comprises a calculator.

Figure 9J:
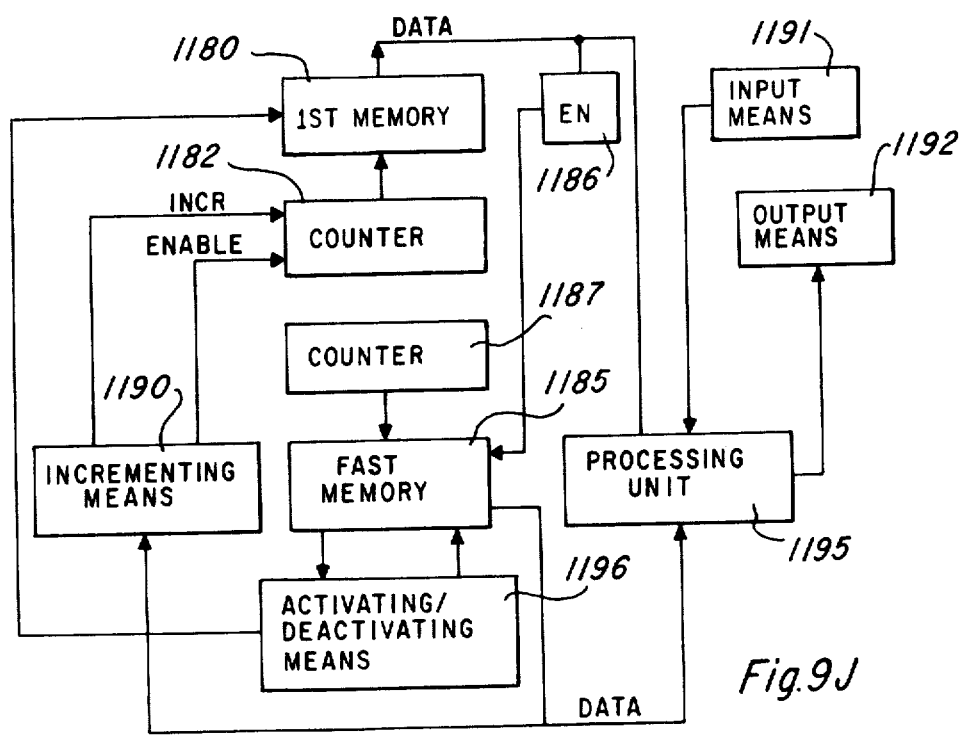
FIGS. 9J-K are block diagrams of alternate embodiments of a data processing system having interlinked slow and fast memory means and interlinked program counters in accord with one aspect of the present invention.
Figure 9K:
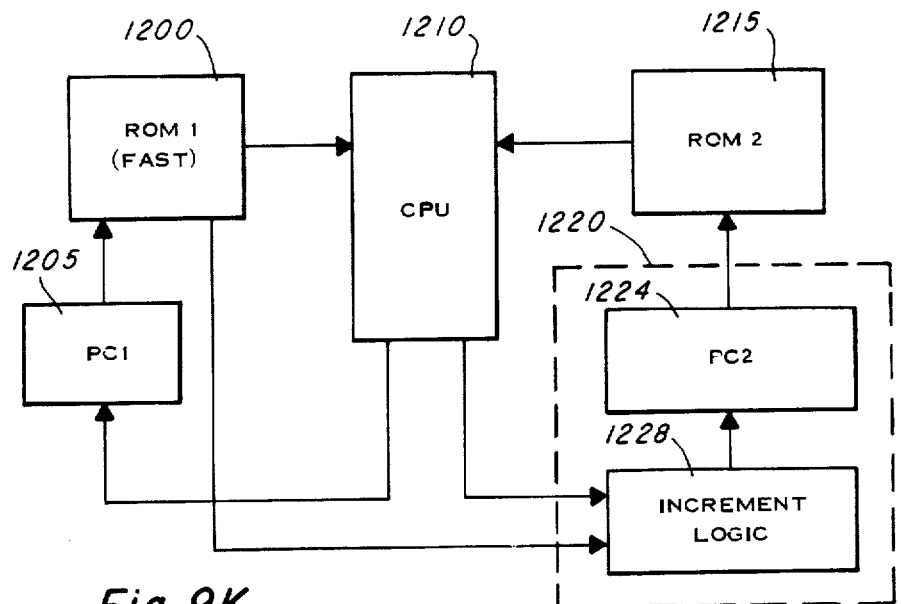

Other embodiments of the present invention may be better understood with reference to FIGS. 9J–K, and the accompanying description. In accordance with the present invention, there is provided a data processing system comprised of two independent read only memories, each read only memory having an individual associated program counter, wherein table lookup is accomplished by having an instruction signal pattern as an output from one read only memory conditionally advance the program counter of the other read only memory so that upon completion of the output from the one read only memory, control is transferred to the other read only memory, with said other read only memory containing a predetermined value equivalent to the table lookup value desired, or to a branch word pointing to a value or routine in said other read only memory. In the preferred embodiment, the execution of a particular data signal pattern (CALL) in a fast read only memory (said one ROM) causes the program counter for said other ROM (main program counter) to advance one step forward in the program count sequence. Thus, for example, if a number represents the table entry value and is decremented in the fast ROM, decrementing once during each execution of a CALL instruction signal pattern in said fast ROM, then upon return to the main ROM, the main program counter will point to the desired entry point in the main ROM. Thus, the data signal stored pattern (routine) stored in the fast ROM may be any routine which executes a variable number of CALL's and the main ROM entry point may contain values to be directly used or may contain data signal patterns representing the beginning of new program routines in the main ROM.

In the system illustrated in FIG. 9J, a data processing system is comprised of a first memory means (1180) for selectively outputting a data signal responsive to an address signal. The first memory means (1180) may be a read only memory or read write memory, and in the preferred embodiment is a read only memory, comprising the main memory of the data processing system. The data processing system is further comprised of a counter means (1182) for selectively outputting an output signal responsive to an enable signal. The counter means (1182) is associated with the first memory means (1180), and in the preferred embodiment comprises the main program counter. The data processing system is further comprised of a fast memory means (1185) for outputting data signals. The fast memory means (1185) may be a read only memory, or read write memory, and in the preferred embodiment is a read only memory which has an access time much faster than that of the first memory means (1180). The data processing system is further comprised of a means (1190) for selectively incrementing the counter means (1182) responsive to a particular one of said data signals as output from the fast memory means (1185). The means (1190) may comprise random digital logic, programmable logic array, or other decode structure. Finally, said one embodiments of the data processing system is comprised of a means (1190) for selectively outputting the enable signal responsive to a certain one of the data signals as output from the fast memory means 1185. The means for selectively outputting the enable signal may be combined with the means for selectively incrementing the counter means, or may be comprised of a separate circuit structure performing the data decode function.

A data processing system is illustrated in FIG. 9J which includes a means 1186 for selectively enabling and disabling a fast memory means 1185 responsive to a particular one of the data signals as output by the first memory means 1180. The means (1186) for selectively enabling and disabling the fast memory means 1185 may be comprised of decode logic circuitry, such as random logic, programmable logic, or other decode circuitry.

In another alternate embodiment of said one embodiment, the data processing system is further comprised of a fast counter means (1187) for providing fast memory address signal outputs, wherein the fast memory means outputs data signals from selected locations responsive to the fast memory address signal outputs.

The data processing system of FIG. 9J further includes an input means (1191) for selectively providing an output signal responsive to an input stimulus, such as a keyboard, magnetic tape or disc, or other input stimulus. The system is further comprised of a processing means (1195) for selectively performing operations (such as data processing, logic, boolean) and for selectively outputting a representation signal responsive to the data signals and the input signal. The system is further comprised of an output means (1192) for selectively providing an output representation (such as a visual display, audible display, or other output representation) responsive to the representation signal.

The data processing system of FIG. 9J includes a means (1196) for selectively activating the first memory means (1180), including means for selectively deactivating the second memory means (1185), responsive to particular ones of the second data signals. The means (1196) may be comprised of decode circuitry, or may be a separate circuit function or may be a subpart of a larger circuit function, such as incrementing means (1190). In the preferred embodiment, the system is further comprised of a means (1186) for selectively activating the second memory means (1185) responsive to particular ones of the first data signals.

In an alternate embodiment of the preferred embodiment, the data processing system is further comprised of a means for locating a particular one of the second data signal stored in a predefined format in the second memory means responsive to the first data signals and the increment signal. The means for locating a particular one of the second data signal allows for a multiple memory into linked table lookup as between a routine of data signal patterns stored in the second memory means and a routine of data signals stored in the first memory means.

In the preferred embodiment, the first memory means provides a faster select signal to data signal output response time than does the second memory means, thus allowing a high speed table lookup function to be performed responsive to a routine of data signals stored in the second memory means, and then switches control back to the first memory means, allowing for execution or table lookup from data signals stored in the first memory means.

The data processing system further includes a processor means (1195) for selectively performing data processing operations responsive to the first data signal and the second data signal. The processing means (1195) may be an arithmetic logic unit, random combinational logic, decode logic, or other data processing means.

In a preferred embodiment, as shown with reference to FIG. 9K, a data processing system is comprised of a first memory means (1200) for generating a first data signal responsive to a first select signal. The first memory means (1200) is the fast ROM in the preferred embodiment. The system is further comprised of a means (1228) for generating an increment signal responsive to particular ones of the first data signal. The means (1228) may be an independent logic circuit block, or may form a subpart of the second program counter (1220) associated with the second memory means (1215). The system is further comprised of a second memory means (1215) for selectively generating a second data signal responsive to a second select signal. In the preferred embodiment, the second memory means is the slow or main ROM. The system is further comprised of a first counter means (1205) for generating the first select signal corresponding to a stored count value responsive to a first control signal. In the preferred embodiment, the first counter means (1205) is of a storage/counter/shift register configuration, but may be comprised of any counter and storage mechanism. The system is further comprised of a second counter means (1224) for selectively generating the second select signal corresponding to a stored count value responsive to a second control signal. The second counter means may be of the same structure type as the first counter means, and may additionally include as a subpart the means (1228) for selectively generating an increment signal. The system is further comprised of a means (1228) of FIG. 9K for selectively incrementing the stored count value in the second counter means (1224) responsive to the increment signal. The means for incrementing the stored count value may form an independent logic block or may be combined with the increment logic block 1228 forming the means for generating the increment signal. The system is further comprised of a controller means (1210) for selectively generating the first and second control signals responsive to the first and second data signals. The controller means (1210) may be comprised of digital random logic, a central processing unit, or simple decode circuitry.

Figure 9L:
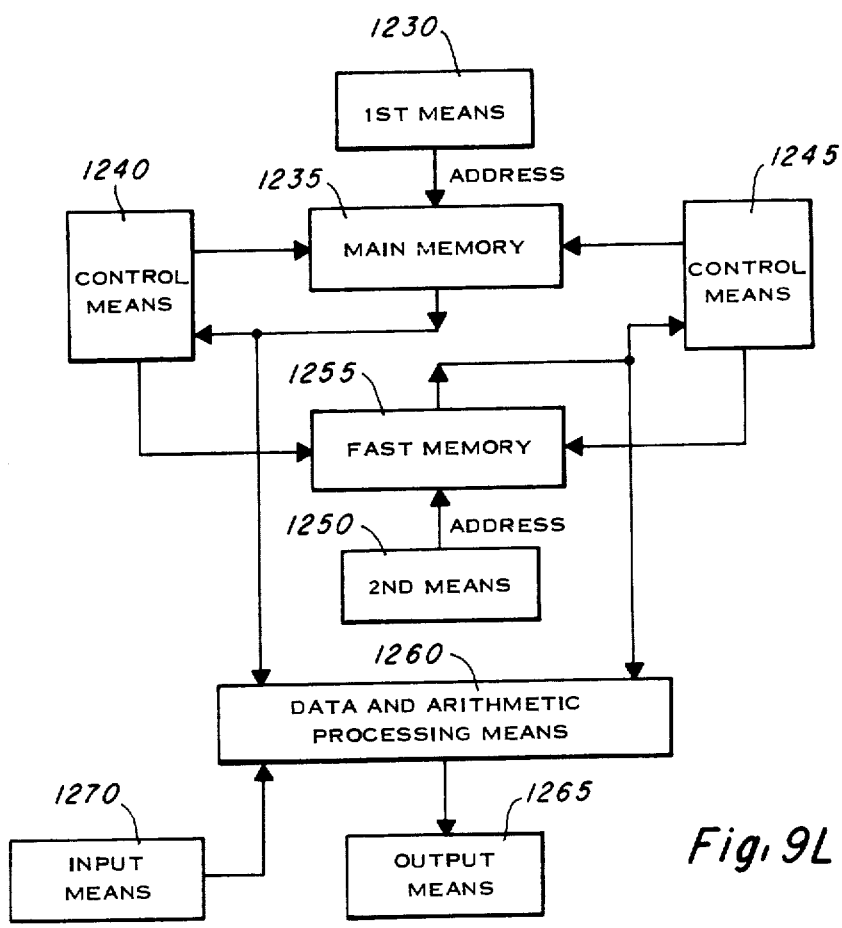
FIG. 9L is a block diagram of a data processing system having interlinked slow and fast memory means.

This invention may be better understood by reference to FIG. 9L. In a preferred embodiment, the data processing system is comprised of a means (1230 and 1250) for providing an address signal. The means for providing an address signal may be comprised of latch means, register means from a processor, counter means, or other storage or counting circuitry. The data processing system is further comprised of a memory means (1235 and 1255) for selectively outputting data signals responsive to the address signal, the memory means including a first memory (1235) and a second memory (1255) having a faster address to data response than the first memory. In the preferred embodiment, the first memory and second memory are read only memory device arrays. The data processing system is further comprised of a control means (1240 and 1245) for selectively enabling one and disabling the other of the first (1235) and second (1255) memory means responsive to the data signals.

In the preferred embodiment, the data processing system is further characterized in that the control means (1240 and 1245) is further comprised of a means (1240) for selectively enabling the first memory and for selectively disabling the second memory responsive to particular ones of the data signals, and a means (1245) for selectively disabling the first memory and for selectively enabling the second memory means responsive to certain ones of the data signals. In the preferred embodiment, the particular ones of the data signals represent the return instruction signal pattern, and the certain ones of the data signals represent the call instruction signal pattern.

In the preferred embodiment, the data processing system is further comprised of a processing means (1260) for performing operations responsive to the first memory means data signals and to the second data memory means data signals. A processing means (1260) may be of the data and/or arithmetic logic processing circuitry type, a decode array, random, or combinational logic circuitry. The system is further comprised of an input means (1270) for selectively outputting input signals responsive to input stimuli. The input means (1270) may be a keyboard, magnetic storage medium such as discs or tape, or other input medium type. The data processing system is further comprised of an output means (1265) for selectively providing an output signal representation responsive to an output representation signal, wherein the data processing means includes means for selectively outputting the output representation signal responsive to the input signal. The output means (1265) may be a video display, an audio output, digital or analog encoded data signal outputs, or other type of output representation.

In an alternate preferred embodiment, the data processing system is comprised of a first means (1230) for providing first address signals, such as a program counter or storage or shift register. This data processing system is further comprised of a main memory means (1235) selectively activatable for selectively outputting data signals responsive to the first address signals. The main memory means may be a read only memory device of the random access or serial access type, or may be a read/write memory device. The data processing system is further comprised of a second means (1250) for providing second address signals, such as a program counter, shift register, or storage latch. The data processing system is further comprised of a fast memory means (1255) selectively activatable for selectively outputting data signals responsive to the second address signals, said fast memory means (1255) providing a faster response output than the main memory means (1235). The fast memory means (1255) may be a read only memory of the random access or serial access type, or may be a read/write memory. The fast memory means (1255) has an address to data output response time faster than the address to data output response time of the main memory means (1235). Additionally, the fast memory means (1255), in the alternate preferred embodiment, is a much smaller capacity memory than the main memory means (1235). The data processing system is further comprised of a means (1240) for selectively deactivating the main memory means (1235) and for selectively activating the fast memory means (1255) responsive to particular ones of the data signals output from the main memory means. The means (1240) may be a decode structure, such as a programmable logic array, or random or combinational logic, and in the alternate preferred embodiment the particular ones of the data signals represents a call instruction signal pattern. The data processing system is further comprised of a means (1245) for selectively deactivating the fast memory means (1255) and for selectively activating the main memory means (1235) responsive to predefined ones of the data signals output from the fast memory means (1255). The means (1245) is a decode circuit, such as a programmable logic array or random or combinational circuitry, and the predefined ones of the data signals is the return instruction signal pattern in the alternate preferred embodiment.

In the alternate preferred embodiment, the data processing system is further comprised of a processing means (1260) for performing operations responsive to the main memory means (1235) data signals and to the fast memory means (1255) data signals. The processing means (1260) may be of the arithmetic, logic, or boolean type of central processing unit, or may be comprised of random or combinational logic circuitry.

In the alternate preferred embodiment, the data processing system is further comprised of an input means (1270) for selectively outputting input signals responsive to input stimuli. The input means (1270) may be a keyboard, magnetic storage medium, or other type of input device. The system is further comprised of an output means (1265) for selectively providing an output representation responsive to an output representation signal, wherein the data processing means (1260) includes means for selectively outputting the output representation signal responsive to the input signal. The output means (1265) may be a video display, audio output means, electronic signal output means, magnetic storage medium, or other type of output device.

Figure 10A:
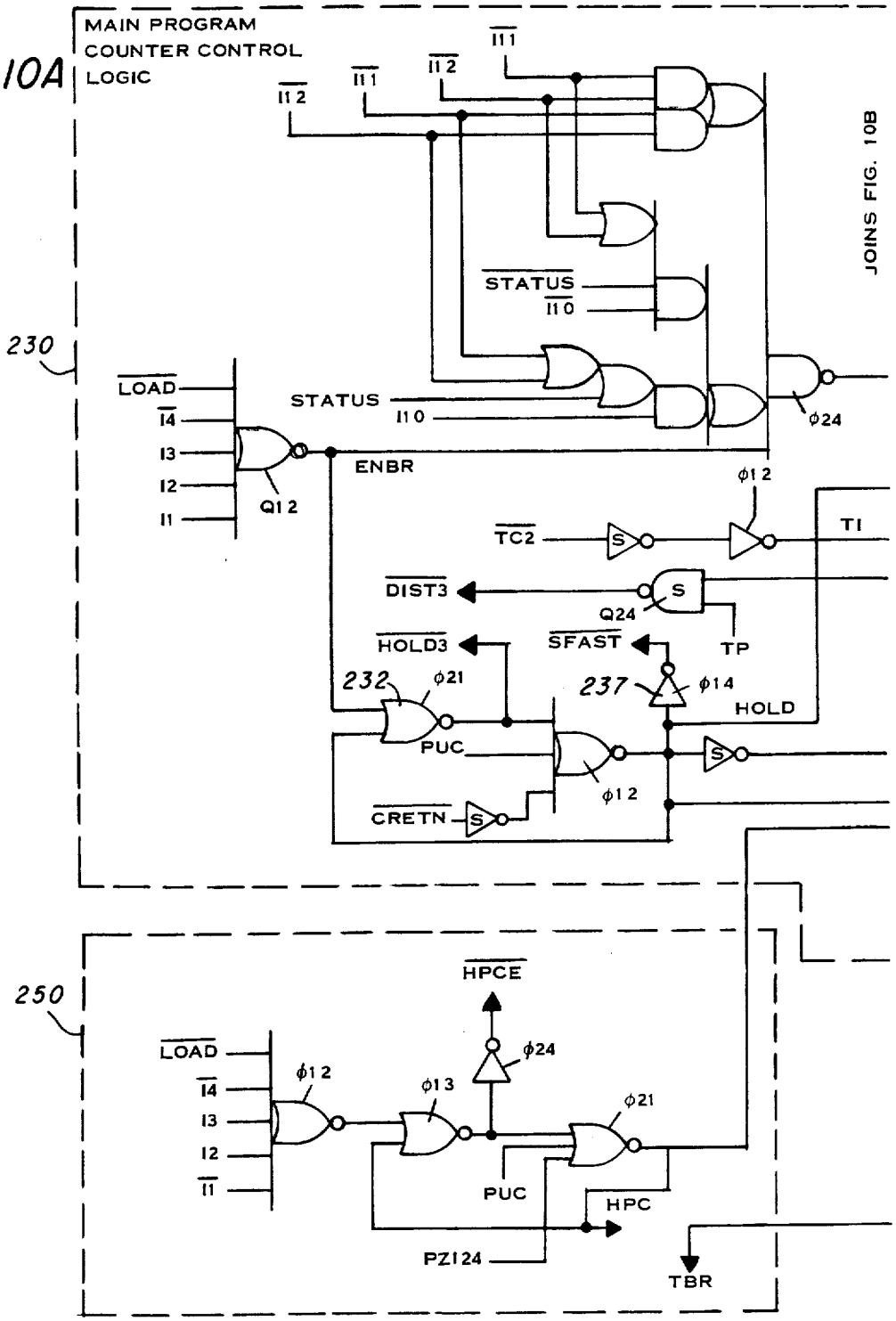
FIGS. 10A-G are detailed circuit schematics of a preferred embodiment of the program counter, subroutine stack, and page select logic 135 of FIG. 6.
Figure 10B:
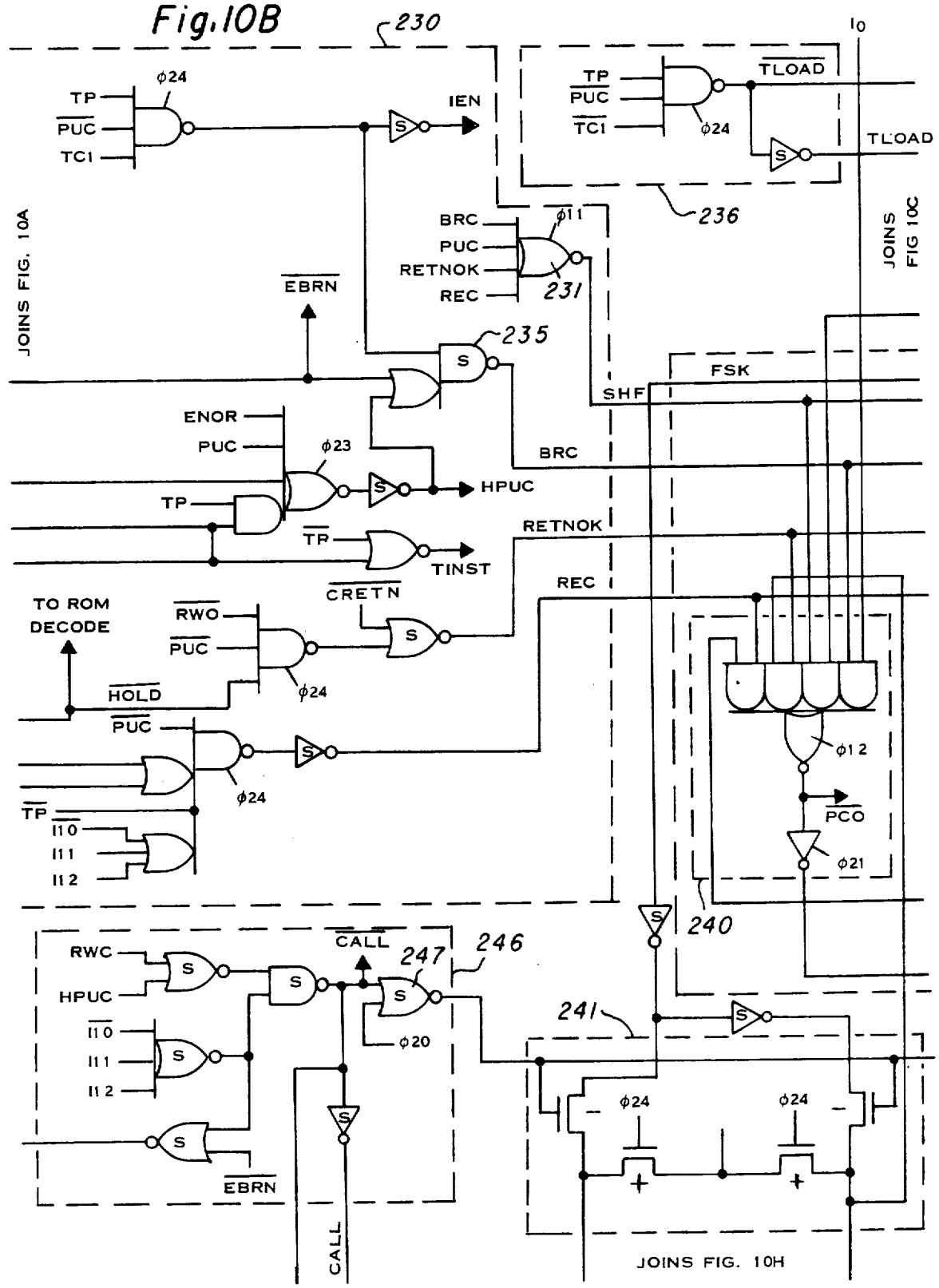

Referring to FIGS. 10A-10G, the detailed circuitry schematic of a preferred embodiment of the program counter, subroutine stack and page select logic 135 of FIG. 6 is shown. The ROM 146 of FIG. 6 is addressed by a main program counter 200 as shown in FIGS. 10B-D, and by the page select logic 201 as shown in FIG. 10E. The program counter 200 cycles in the count sequence as shown in Tables 1A-1B provided at the end of this specification, and advances in this sequence one step per instruction cycle except under the following conditions in response to input stimuli:

(1) Testing—During some phases of the automatic testing procedure as described below, external data is supplied to the program counter 200.

(2) Branching—In the event that a branch is to be executed, the program counter 200 is loaded with the ROM contents. Output I0 from the ROM is loaded to a corresponding bit position PC0 of the program counter 200, ROM output I1 to PC1, etc., up to ROM output I9 loading into program counter 200 input PC9.

(3) Subroutine Return—The most recently stored data in the subroutine stack 243 of FIGS. 10D-10F is transferred into the program counter 200 upon detection of the return instruction code.

(4) Fast ROM Operation—When program control is transferred to the fast ROM, as described below, the main program counter 200 is held at the address following that which contained the instruction to transfer control to the fast ROM 209. In the preferred embodiment, six levels of subroutine nesting are provided by the subroutine stack 243. During fast ROM operations, the main program counter 200 is effectively a seventh subrofast ROM 209 outputs and the slow ROM outputs are coupled through the same output buffer from which the outputs eminate to form the I lines I0-I11. The I line inputs to the main program counter 200 are primarily utilized in conjunction with a branch instruction. A branch instruction may be embedded in the code within the algorithm stored in the ROM.

Referring now to FIGS. 10A-C, a detailed circuit schematic diagram of the main program counter 200 and associated control logic, the fast program counter 204 and associated control logic, the subroutine stack pointer 238 and associated control logic, the subroutine stack 243, and other logic and decode are shown as implemented in a preferred embodiment of the controller 30 of FIG. 4.

The program counter 200 is comprised of ten counter stages 240, each with an associated buffer driver 241. The outputs of the counter stages 240 are coupled to the main read-only memory 146, outputs PC0 to PC9 of the main program counter 200 providing for selection of one out of 1023 locations within a page of memory (pages 147 of the ROM 146 of FIG. 6). Additionally, each counter stage 240 and associated buffer is coupled to a respective input of the subroutine stack 243. The program counter 200 is additionally comprised of feedback logic 215 (which prevents the counter from entering a lock up state), and of multiplexers 211, 212 and 213, which provide for parallel four bit data load multiplex and shift operation when the system is in the test mode. The main counter 200 is supplemented by the page select logic 201 (FIGS. 10E, 10F), which selects one of the three 1K word pages, 147, in the main ROM,146, by providing the outputs RP0 and RP1 from the page select latch/counter stages 206 and 207, respectively, (corresponding to the page select logic 135 of FIG. 6). A dummy bit stage 214 provides a thirteenth output PCTR8 as an extension of the program counter 200 for use in the test mode.

The program counter 200 is controlled by a main control counter control logic circuit group 230 (FIGS. 10A, 10B), which decodes instruction microcode signals to selectively actuate the main program counter 200 to operate in the proper mode. The program counter 200 has four different operational modes or stages in the preferred embodiment. The program counter control logic 230 decodes the ROM output I-lines and instruction decode outputs from other logic within the controller circuitry and provides four outputs, SHF, BRC, RETNOK, and REC, which are coupled to the counter stages 240 of the counter 200. The shift state of the program counter 200 is activated responsive to the SHF output of gate 231 (FIG. 10B) of the program counter control logic 230. The SHF output is a signal which enables the program counter to shift when the counter 200 is not otherwise in a defined state. The BRC, RETNOK, and REC outputs of the program counter control logic 230 are coupled to three inputs of NOR gate 231. The PUC output of NOR gate 232, which provides a decode of the power up clear state of the calculator system, is coupled to the fourth input of the NOR gate 231. When the SHF output is active, the program counter 200 is caused to count and shift in accordance with the sequence as set forth in Tables 1A-1B below.

When the BRC output is active, signifying a branch instruction decode, the SHF output is forced inactive by gate 231, and the program counter 200 ceases shifting, and the ROM output word I lines are loaded into the program counter 200 in order to permit addressing the location to which the branch is desired to be made.

A return from subroutine instruction decode forces the RETNOK output from the program counter control logic 230 to become active, causing the program counter 200 to load into the counter stages 240, the return address data as previously stored and presently output from the subroutine stack 243. Additionally, the RETNOK output of the program counter control logic 230 is coupled to the inputs of the subroutine stack pointer 238, to the inputs of each counter stage 244 within the stack pointer 239, and to the input of the stack pointer control logic 245. The subroutine stack pointer 239 responsive to the subroutine control logic 245 and to the RETNOK output from control logic 230, enables the subroutine stack 243 to output the previously stored return address to the program counter 200. The program counter 200 may also recirculate and hold the present program counter value in response to receiving the REC output at an active level from the control logic 230. This feature is particularly beneficial and allows the use of the hold program counter instruction (HPC), which forces the program counter 200 to maintain a given value until an external counter has counted a fixed value as specified in the HPC instruction, at which time the HPC instruction and the REC output of the control logic 230 are ended (forced inactive). The main program counter control logic 230 distinguishes between the above discussed four states.

There are two distinct types of branches which generate the BRC instruction. The complex gate structure 234 decodes a branch on set instruction (status equal to one), a branch on reset instruction (status equal 0), or a recall instruction. The branch control is also used upon decode of a subroutine call instruction. The only difference between the branch instruction and the subroutine call instruction, as relates to the program counter 200 and subroutine stack 243, is that the subroutine call instruction not only causes the program counter to be loaded with the branch or call location, but additionally requires the value of the program counter location following that from which the branch or subroutine call is made to be stored in the subroutine stack 243.

The program counter 200 may also be utilized to effectuate pseudo-branch from ROM to program counter responsive to the BRC output from gate 235 which is actuated by test condition inputs. In response to a test branch state, the main program counter 200 receives and stores the I line outputs from the ROM instruction word output into the respective counter stages 220. Additionally, the test branch forces the page select latches to selectively load the ROM output word lines I10 and I11 through the circuitry 200 and 201, respectively, and to output I10 and I11 from the page select latches 206 and 207 to form the most significant bits of the test instruction word. After executing the test branch, the ROM word stored in the program counter 200 and page select latches 206, 207, 214 can be read at test outputs TCOUT 3, 7, 11 and 12. Loading the program counter as described in the next paragraph can be accomplished at the same time as the ROM word stored in the program counter by the pseudo-branch is read at test outputs TCOUT 3, 7, 11, 12. Since a load and read of program counter are simultaneous events, test time for ROM dumps are minimized.

In the test load mode, the program counter 200 loads and shifts four sets of three bit test inputs comprised of input TCIN0, as coupled to multiplexer 211, input TCIN4 as coupled to multiplexer 212, input TCIN8 as coupled to multiplexer 213 and input TCIN12 as coupled to dummy bit 214. The parallel load of the test bit TCIN0, TCIN4, TCIN8 and TCIN12 are performed in the load and shift sequence as described above. Thus, TCIN0 is multiplexed via the multiplexer 211 and loaded and shifted into the program counter stages 240 so as to fill program counter bit positions PC0, PC1, PC2 and PC3. TCIN4 is multiplexed via multiplexer 212 and loaded and shifted into the counter stages 220 so as to fill program counter bit positions PC4, PC5, PC6 and PC7. TCIN8 is input via multiplexer 213 and selectively loaded and shifted into counter stages 240 so as to fill program counter bit positions PC8 and PC9. The TLOAD output from logic 236 enables the page select latches 206 and 207 to store the ROM word outputs I10 and I11 and outputs RD(10) and RS(11) during the test mode. In the test mode, page select latches 206 and 207, and their respective outputs RP0 and RP1 are coupled to the main program counter 200 so as to form an extension of the program counter, and shift in conjunction with the program counter 200.

Each TCIN (0, 4, 8, 12) is coupled to the input of an AND-NOR gate 211, 212, 213 and 215. Each AND-NOR gate forms a multiplexer which in the test mode multiplexes its TCIN input between the test condition input mode or the recirculate mode from the previous bit. Under non-test mode conditions, the program counter shifts PC0 to PC1. PC1 is shifted to PC2, and so on incrementally so that bit positions are shifted within the program counter 200. In the test mode, the program counter is broken at selected locations to provide for parallel loading of test inputs. For example, in the preferred embodiment, one selected location where the program counter 200 is broken is between PC3 and PC4 counter stages 240. Thus, in the test mode, PC3 is not shifted to PC4, but instead, TCIN4 is loaded into PC4 position of the counter 200. Additionally, in the preferred embodiment, positions PC0 and PC8 of the counter 200 are selected locations for insertion of the test inputs. The dummy bit 214 is used only for testing in the test mode, and simply loads input TCIN12 or ROM output I12, responsive to control inputs responsive to the TLOAD output from logic 236, and the test branch TBR output from the program counter control logic 230. The TBR output from the logic 230 as coupled to the gate 214 enables the AND NOR gate 214 to input the ROM output word bit I12. The TLOAD output from the logic 236 is input to the AND NOR gate 214 enabling the loading of the input TCIN12. Thus, in the preferred embodiment, there are four loads of TCIN bits required to complete a 12 bit test load. At the very first load, TCIN0 will load into position PC0 of the counter 200. Next, the program counter 200 executes a shift cycle wherein PC0 is transferred to PC1, PC1 to PC2 and PC2 to PC3. Then, the next TCIN0 input is loaded into the shifted by the program counter 200. Next, the program counter shifts as described above. Then, a third TCIN0 is loaded and shifted by the program counter 200 and a fourth TCIN0 is loaded and shifted by the program counter 200. A similar process occurs with respect to TCIN4 and TCIN8 as to the respective program counter locations PC4, PC5, PC6, and PC7, for TCIN4 and positions PC8 and PC9 are input TCIN8. Finally, during the test load, input TCIN12 is loaded into the AND NOR logic 214 of the dummy bit position to provide this tenth output bit in conjunction with the program counter and page logic.

The program counter 200 has internal feedback loops, comprised in part of the AND NOR multiplexers 211, 212, 213 and an exclusive NOR feedback circuit 215 to prevent sequencing lock-up from occurring in the program counter 200. The program counter sequence is pseudo-random, comprising 210-1 states as detailed in Tables 1A-1B. (All 1's in the program counter 200 is an invalid state which could cause lock-up in circuit operation). The feedback circuit 215 executes an exclusive NOR function between bits PC6 and PC9. The feedback logic 215 position PC0 of the program counter 200 is dependent upon the outputs PC6 and PC9 which in turn are dependent upon the inputs which are shifted into positions PC6 and PC9 of the counter 200. The feedback logic 215 prevents lock-up states, while yielding a pseudo-random sequence of program counter shifting through almost all possible states. This provides a simple way of achieving the desired number of program counter states, similar to a Johnson counter, and much simpler than a binary counter.

The controller of the present invention has an on-board capability to test all major logic blocks from an external tester. The controller under test can shift data in or out, in four consecutive instruction cycles representing the page and program counter address, and can take a word from ROM addressed by the page and program counter and dump that word into the page and program counter. The controller can also take the page and program counter address and execute it as an instruction. The controller under test divides down an external oscillator input through the clock generator circuitry and multiplexes the resultant clock into the I/O clock generator circuitry so as to test the display control logic. The test inputs, outputs, and controls are explained briefly below.

TPENABLE is a dedicated output that is coupled to and selectively enables an external oscillator and the on-chip TP input.

An external oscillator provides an OSC signal as an input to the controller. When said TPENABLE output is at a high logic level, the OSC signal is multiplexed into the internal clock generator.

A TP input is enabled (high) when the TPNABLE output is at a high level. With said received TP input at a high logic level, and with the TPENABLE output at a high logic level, the controller is activated into the test mode. When the TPENABLE output is low, the TP input is forced low, thereby deactivating the test mode.

TCIN0, TCIN4, TCIN8 and TCIN12 are test inputs which are multiplexed into the program counter during the common times when TP is high. Four bits in parallel can be loaded into the main program counter as shown in TABLE 1, or can be loaded into the FAST program counter as shown in TABLE 2 provided at the end of this specification.

TCOUT 3, TCOUT 7, TCOUT11, and TCOUT12 are program counter outputs multiplexed onto external outputs KB, KC, KD and KE when TP is high. These four bits are output in parallel from the main program counter, the TC inputs are test control condition input signals received when TP is high. TC1 is sampled during 021 and TC 2 during 023. TC1 high enables the controller testing word in the ROM addressed by the page and program counter address to be loaded into the page and program counter (pseudo-branch). TC2 high multiplexes the page and program counter onto the I lines, and the controller than executes them as an instruction.

TC3 is a test condition input which is valid when TP is high. When TC3 and TP are high, the state of the controller will be forced to off (MO=0, DM+0) as described in greater detail in U.S. Pat. No. 4,317,181 entitled Four Mode Power Controller.

In a preferred embodiment, the testing procedure is as follows:

INITIALIZING PROCESSOR

Apply power to the chip, hold TPENABLE high, TP high, TC1 and TC2 low, TC3 high. The controller is now in the off state (MO=0), DM=0). Hold TC3 low, KA high and inject an external 1.6 MHz oscillator onto OSC pin. The controller is now in the process only mode (MO=1, DM=0), and the clock generator is in its slow mode.

SYNCHING TO EXTERNAL TESTER

After initialization, with TPENABLE high, TP high, TC1 low, TC2 low; TC3 low, and a 1.6 MHz signal injected on OSC, force TCIN (0,4,8,12) signals low for 96 external oscillator cycles. After this period, the program counter outputs TCOUT (3,7,11,12) should go to a low logic level for 3 oscillator cycles and then to a high logic level for 21 oscillator cycles. The tester is then in sync with the leading edge of the internal clock signal 012.

EXECUTION OF PSEUDO-BRANCH

After synching to the external tester, with TPENABLE high, TP high, and injecting a 1.6 MHz oscillator onto the OSC pin, a pseudo-branch of the word addressed by the page and program counter is executed by subsequently inputting data on consecutive instruction cycles, as shown in TABLES 3A and 3B.

EXECUTING EXTERNALLY JAMMED INSTRUCTION

After synching to the external tester, with TPENABLE high, TP high, and injecting a 1.6 MHZ oscillator an instruction can be externally jammed into the program counter and executed by inputting the data, as shown in TABLE 4, on consecutive instruction cycles.

Referring again to FIGS. 10A-G, the page select logic 201 performs an important function in the non-test modes by providing ROM page selection between the pages in ROM. Inputs I0 and I1 from the ROM output bus are coupled to the page buffers 203A and 203B, where the inputs I0 and I1 are latched in response to receiving an enabling input load page buffer (LPB) signal output from the load page buffer latch 205. The load page select latch output, LDP, is output from the page select control logic 209 and is coupled to the page select latches 206 and 207 so as to selectively activate the latches 206 and 207 to be loaded with the outputs from the page buffers 203A and 203B, respectively. The load page buffer latch 205 provides an LPB signal output in response to decoding a load page buffer instruction via NAND gate 208.

The page select latches 206 and 207, in addition to multiplexing via the self-contained AND-NOR gates are also operative in a page hold mode, as responsive to receiving a page hold signal output from the five input NOR gate 219. The page hold output from gate 219 is essentially a default condition. If any of the inputs to gate 219 are true, active high, the page hold signal is forced to a low logic level, thereby disabling the page hold mode for the page select logic 206 and 207. The instruction decode outputs provided as inputs to NOR gate 219 are test branch (TBR), the test load instruction (TLOAD), the load page instruction (LDP), the return OK instruction (RETNOK), and the power up clear state decode output (PUC) which signifies a power up to page 0.

The decode logic 250 provides a control output hold program counter HPC, causes inter alia, the program counter 200 to be forced to the hold (recirculate) state. The HPC output signal from the logic 250 is also coupled to the input of inverter 253 of the fast program counter control logic 252. Thus, during a power up clear, the fast program counter 204 is also forced to the hold (recirculate) state.

Referring to FIG. 10E, the page select and dummy bit logic 201 perform five functions in the preferred embodiment. There are five control inputs to NOR gate 219 (FIG. 10F) which are coupled to signals which control the five functions that the page bits and dummy bit logic 201 can perform. The branch input, TBR, is output from the instruction decode during a branch instruction. When either a regular branch or a test branch instruction has been decoded, TBR goes active true, and causes the slow program counter 200 to load and store ROM output word I lines I0–I9. ROM output word bits I10 and I11 are loaded into the page buffer and page latches 203A and 203B and 206 and 207, respectively, and ROM output word bit I12 is loaded into the dummy bit 214. The TBR input is coupled to NOR gate 219 and is also coupled directly to the dummy storage bit 214, the page select latches 206 and 207, and enables the select logic within the page latches 206 and 207 and the dummy bit 214 to select the I lines for loading. Thus, the TBR output causes the loading of all I lines, I0-I12, into the 13 bits which form the overall program counter, and cause the loaded contents to be executed as an instruction. The TLOAD and TLOAD outputs from the decode logic 236 are coupled, inter alia, to the input of NOR gate 219 and to the input of the NAND gate 219 of control logic 309. The test load, TLOAD, output is only active in the test mode. The two page bits, RP0 and RP1 are output from page latches 206 and 207, respectively, and do not circulate with the program counter 200. In the test mode, all 13 bits of the ROM output instruction word are loaded into the program counter as extended by the page bits and dummy bits and executed as an instruction. The decoded TLOAD input signal forces all the I line output bits to be loaded into the program counter 200, page bits and dummy bits 201.

The TBR output forces the program counter 200, page buffers 203A and 203B and associated page latches 206 and 207, and dummy bit 214 to load all of the ROM output word I lines. The page bits 206 and 207 remain separate from the program counter 200. This is why there is a separate test branch TBR input into the two bit positions of the page select latches, page latch 206, and page latch 207. The page select stages 206 and 207 provide outputs RP0 and RP1. The TBR (test branch) input enables the page bit counters 206 and 207 to be loaded. The TBR input is coupled to the inputs of the AND gates of the page select latches 206 and 207, respectively. The other inputs to each of these AND gates are coupled to ROM output word bits I10 and I11, respectively. When the TBR input goes to a logic 1 level, ROM output word bits I10 and I11 and I12 are loaded into the bits of the page bit counter, 206 and 207 and 214, in place of loading the outputs of the branch page buffers 203A and 203B, respectively. In other words, a pseudo branch is executed in the test mode, jamming (loading) ROM output word lines I0-I12 into the program counter 200 and page select latches 206 and 207 and 214.

A third input signal to the NOR gate 219 (FIG. 10E) is the LDP (load page) output from the control logic 309. The LDP output is active for either a branch or test load instruction decode. When the information in the page buffers 203A and 203B (as previously loaded with a separate instruction) has been changed, the load page buffer latch, comprised of logic 205 and 309, is set to so indicate. When a branch is executed, the load page LDP signal output is activated. The new page information is loaded into the bit latches 206 and 207. When branching within the same page of ROM, there is no need to change the information in the page bits. If the information in the page buffers 203A and 203B is not changed, the load buffer latch 205 is reset, and the information in the page buffers 203A and 203B is not loaded into the page select latch bits 206 and 207. When the page buffers 203A and 203B are loaded with a new page address, the page buffer latch 205 is set, and activates the control logic 309. When the page buffers 203A and 203B are loaded into the page select latch bits 206 and 207, the latch 205 is reset.

The BRC output is derived from the decode logic 230 (FIG. 10A). The LOAD is derived from the microcode and instruction decode logic 290 as shown in FIGS. 11A-B.

The return output signal RTN is derived from the instruction decode logic 290 responsive to the instruction microcode signals. RTN is active on completion of a subroutine branch to another page in the ROM memory. The contents of the two page latches 206 and 207 are stored in the subroutine stack 301 upon a subroutine branch occurring, and are recalled, reloaded, into page latches 206 and 207 in response to the return RETN output so as to restore the memory to the page from which the previous call was executed and to continue program execution therefrom. This allows flexible programming, for return of program execution may be made to a different page in ROM than that to which the call was initially made.

The power up clear (PUC) output disables all inputs to the page latches 206 and 207, which causes the page latches 206 and 207 to power-up precharge to output select signals page 0. Power up clear (PUC) is enabled true only when the integrated circuit (system) is initially powered up.

Figure 10G:
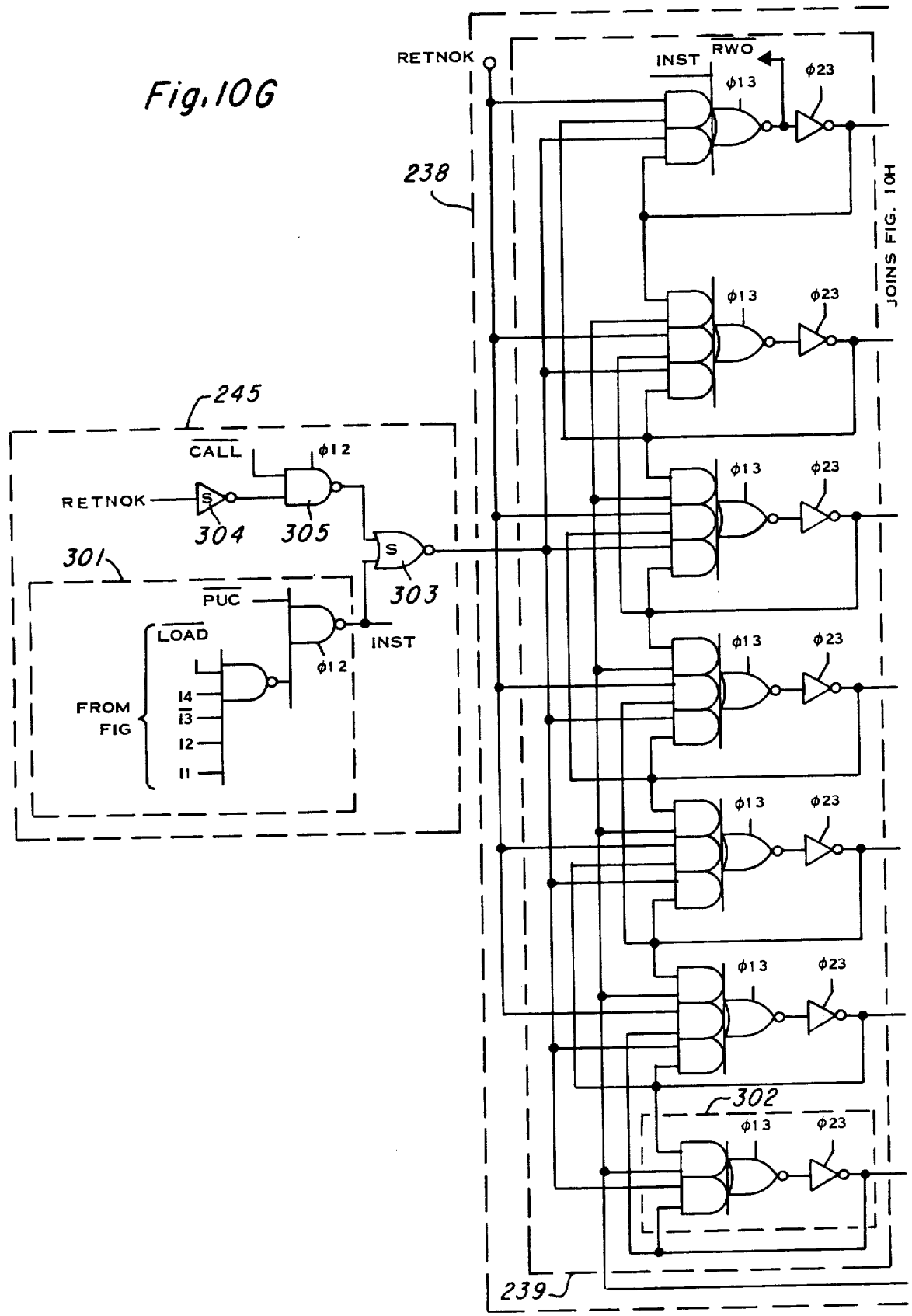
Figure 10K:
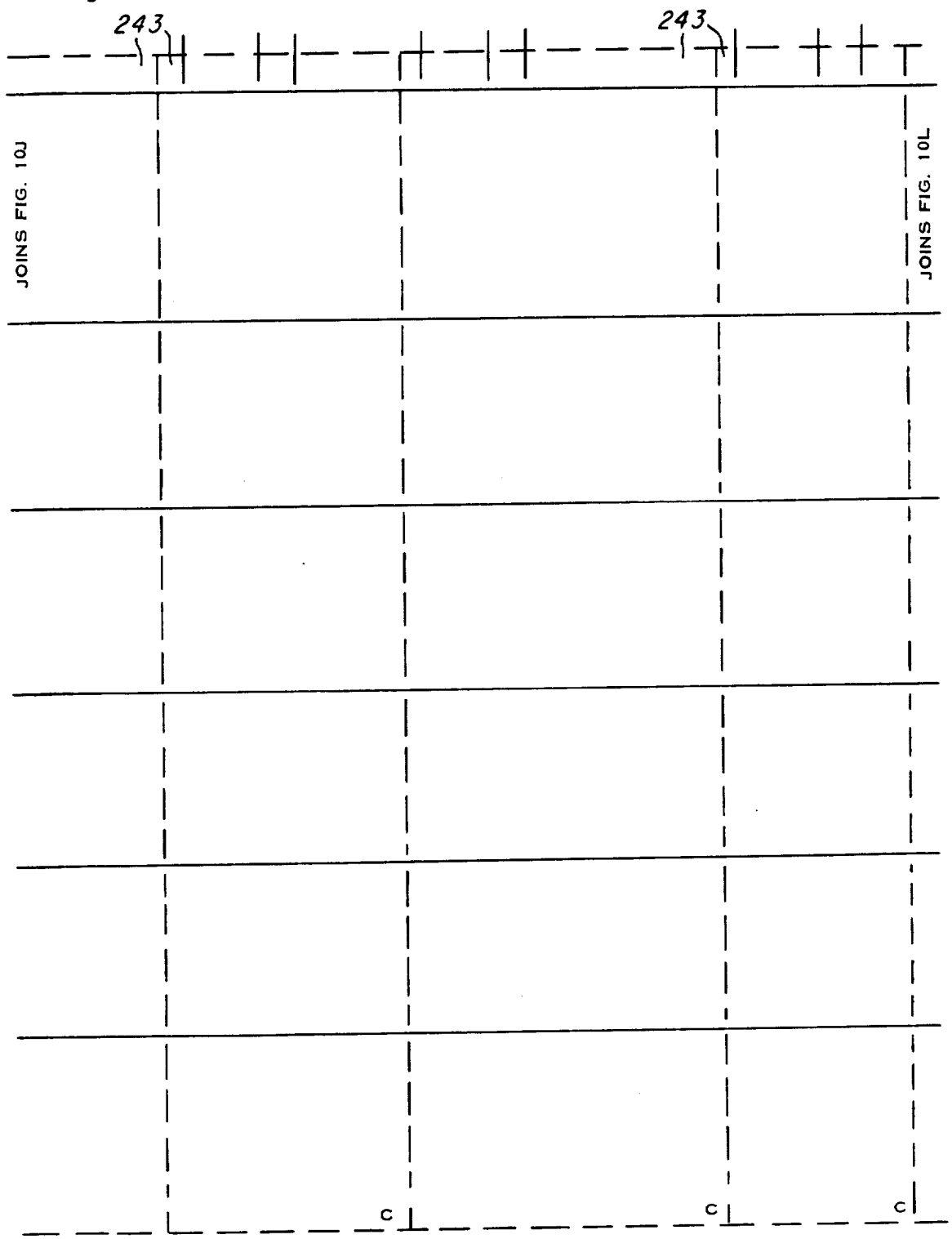
Figure 10L:
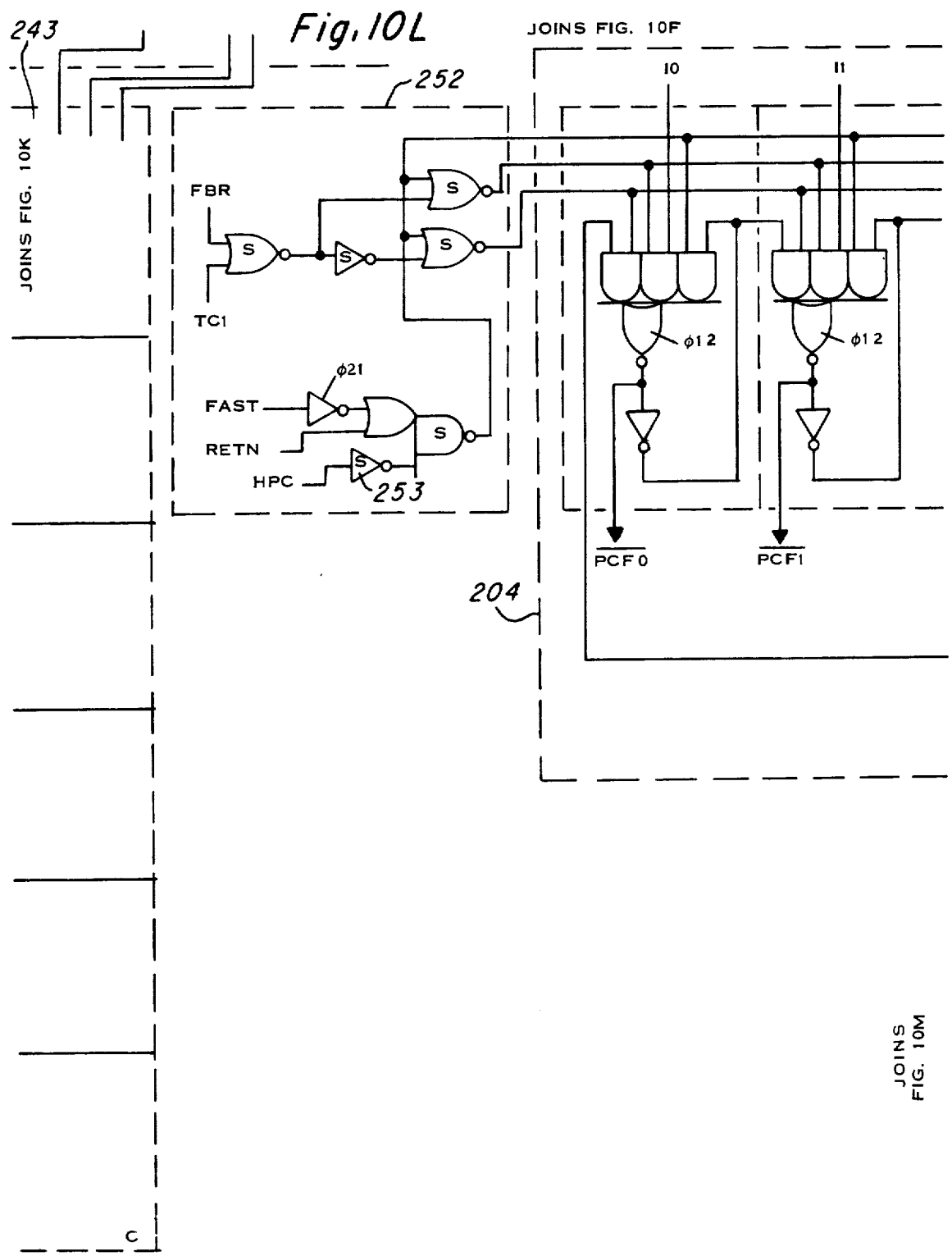
Figure 12A:
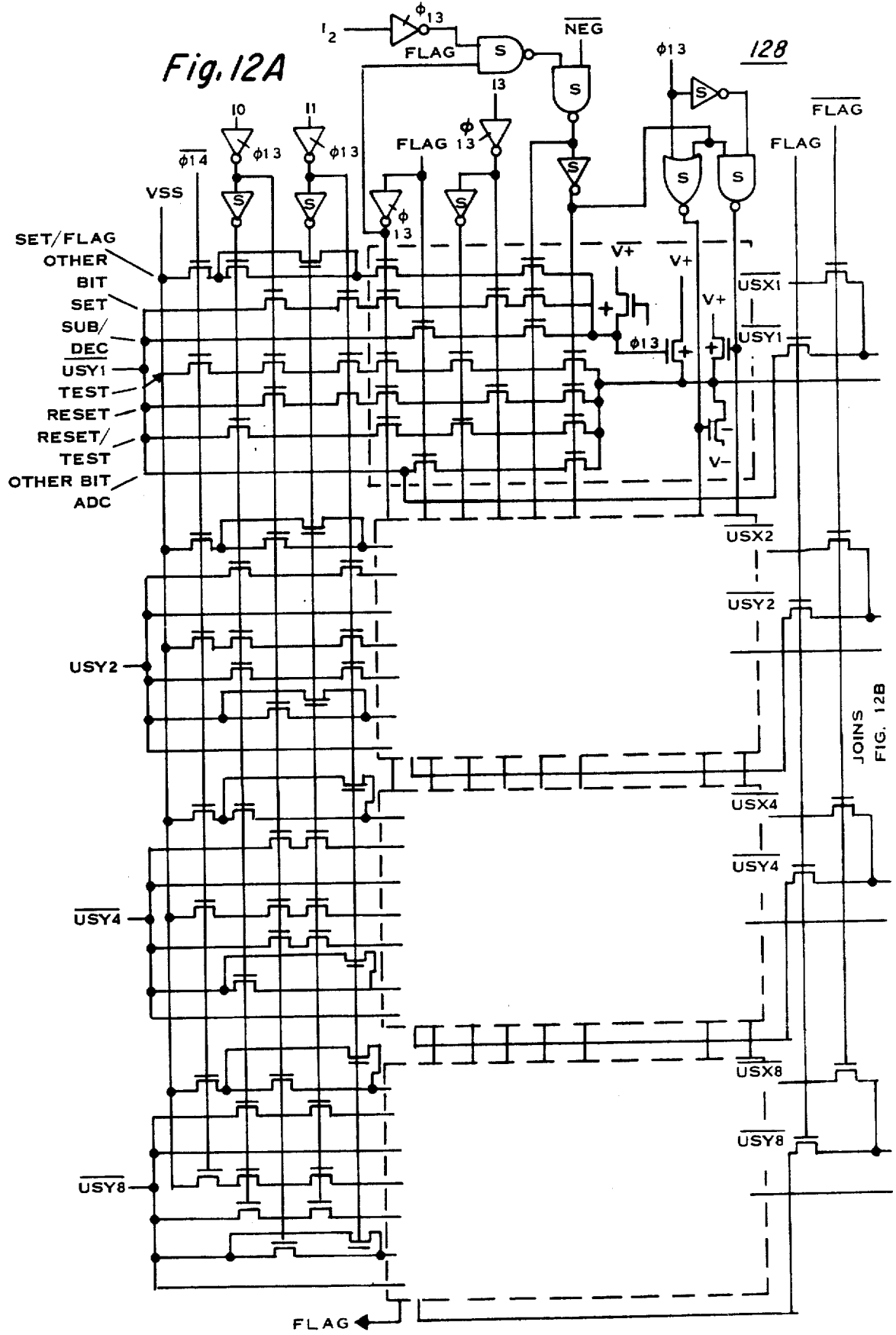
Figure 12B:
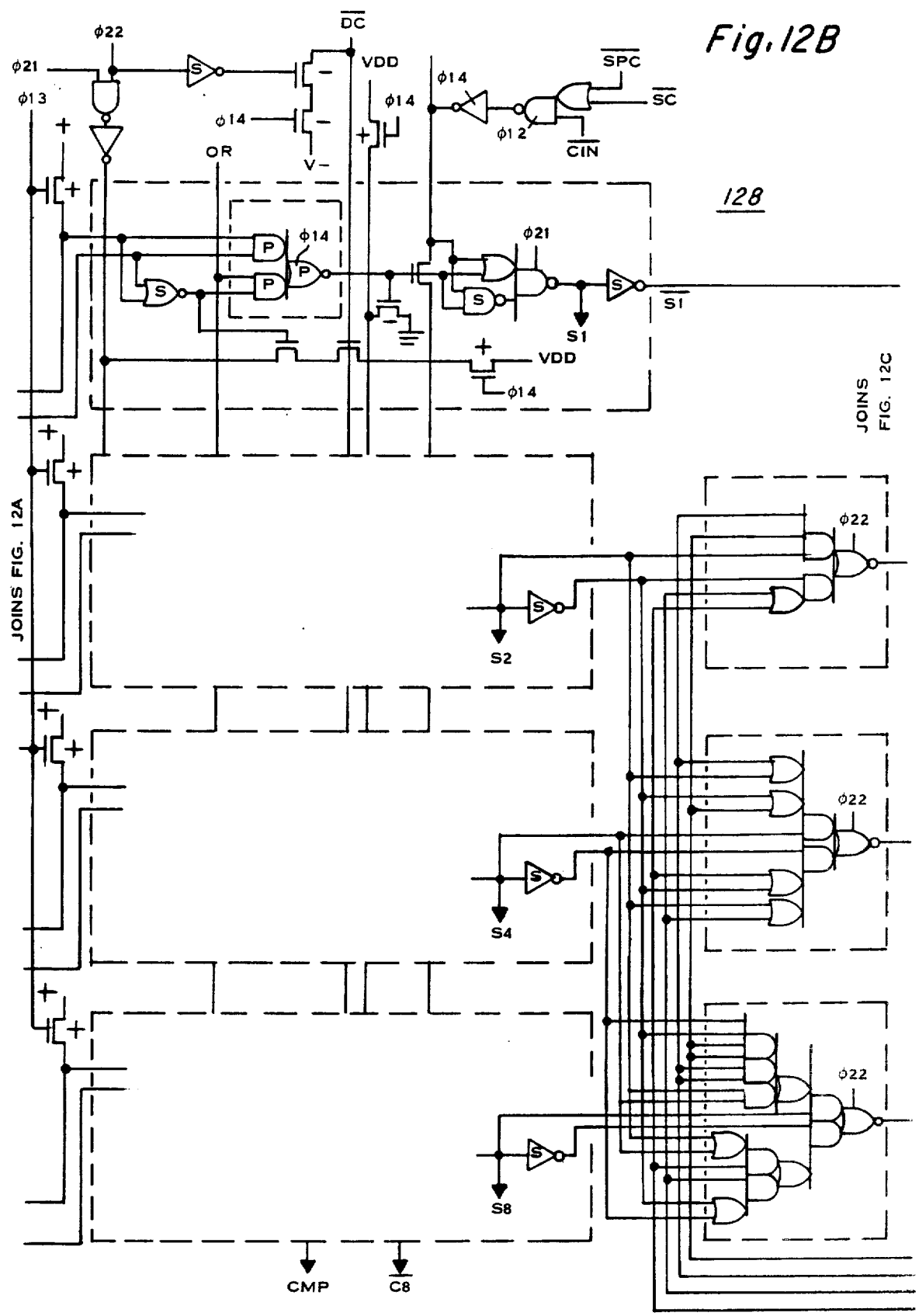
Figure 12C:
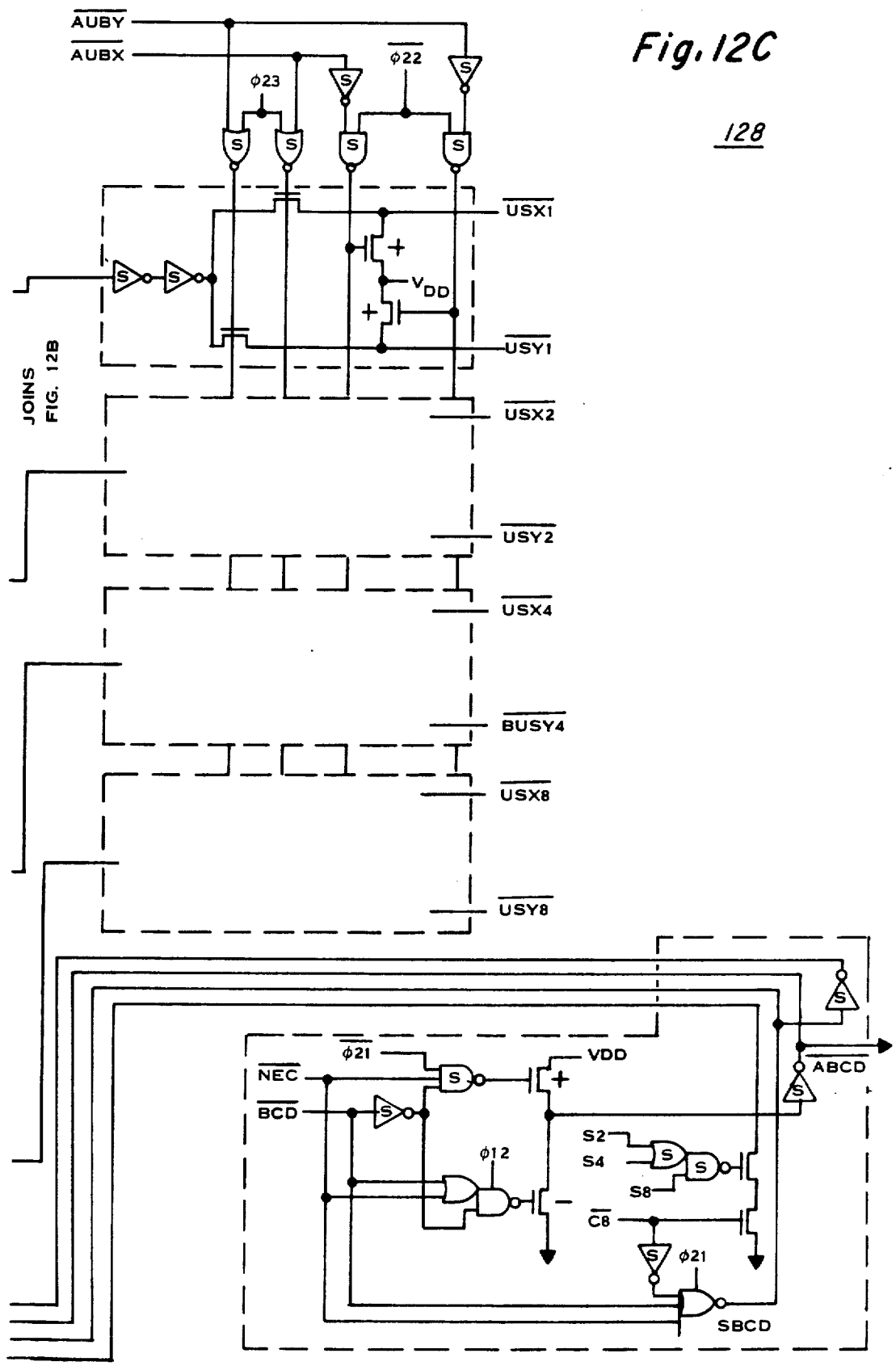
Figure 14B:
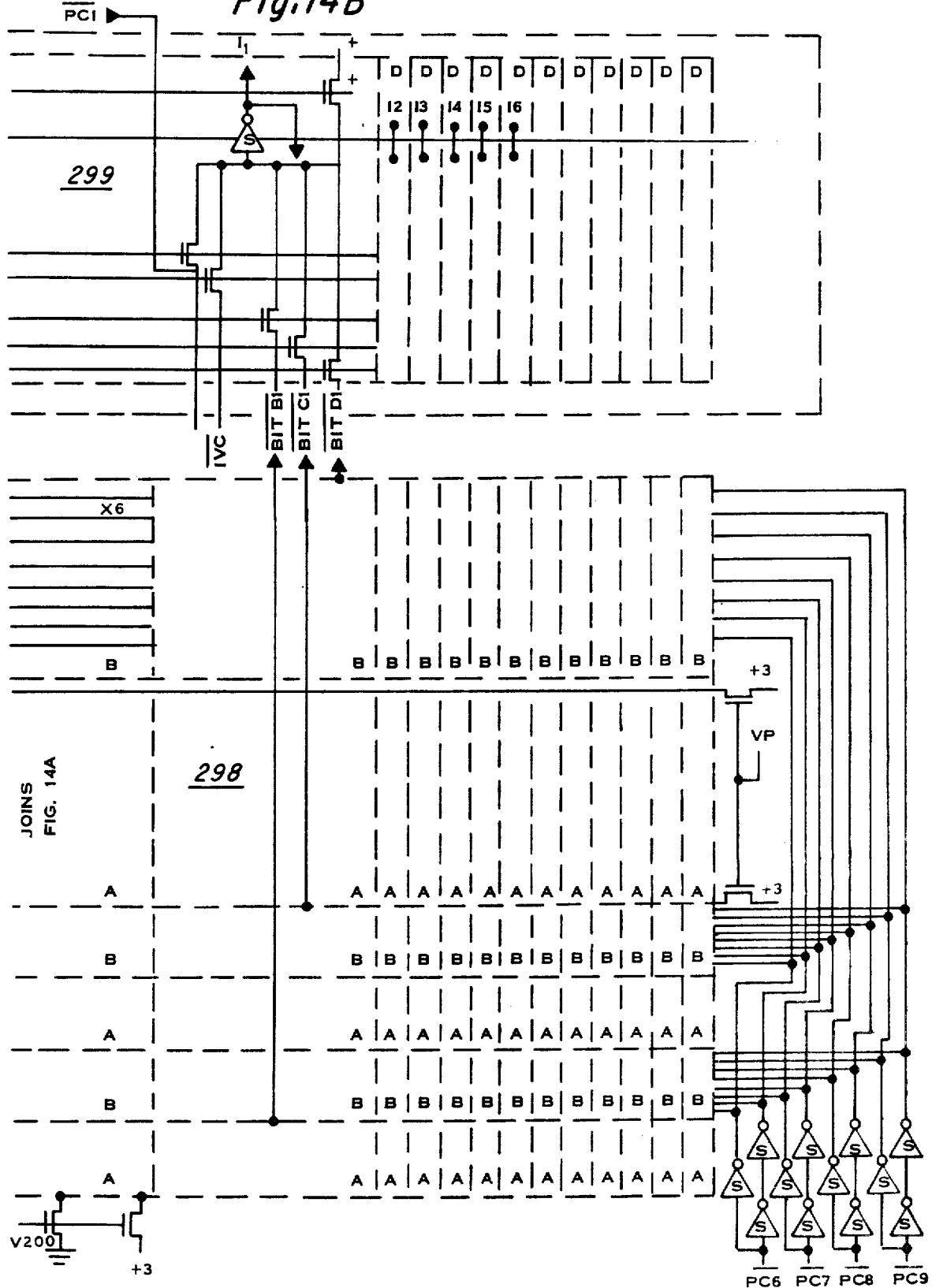
Figure 16A:
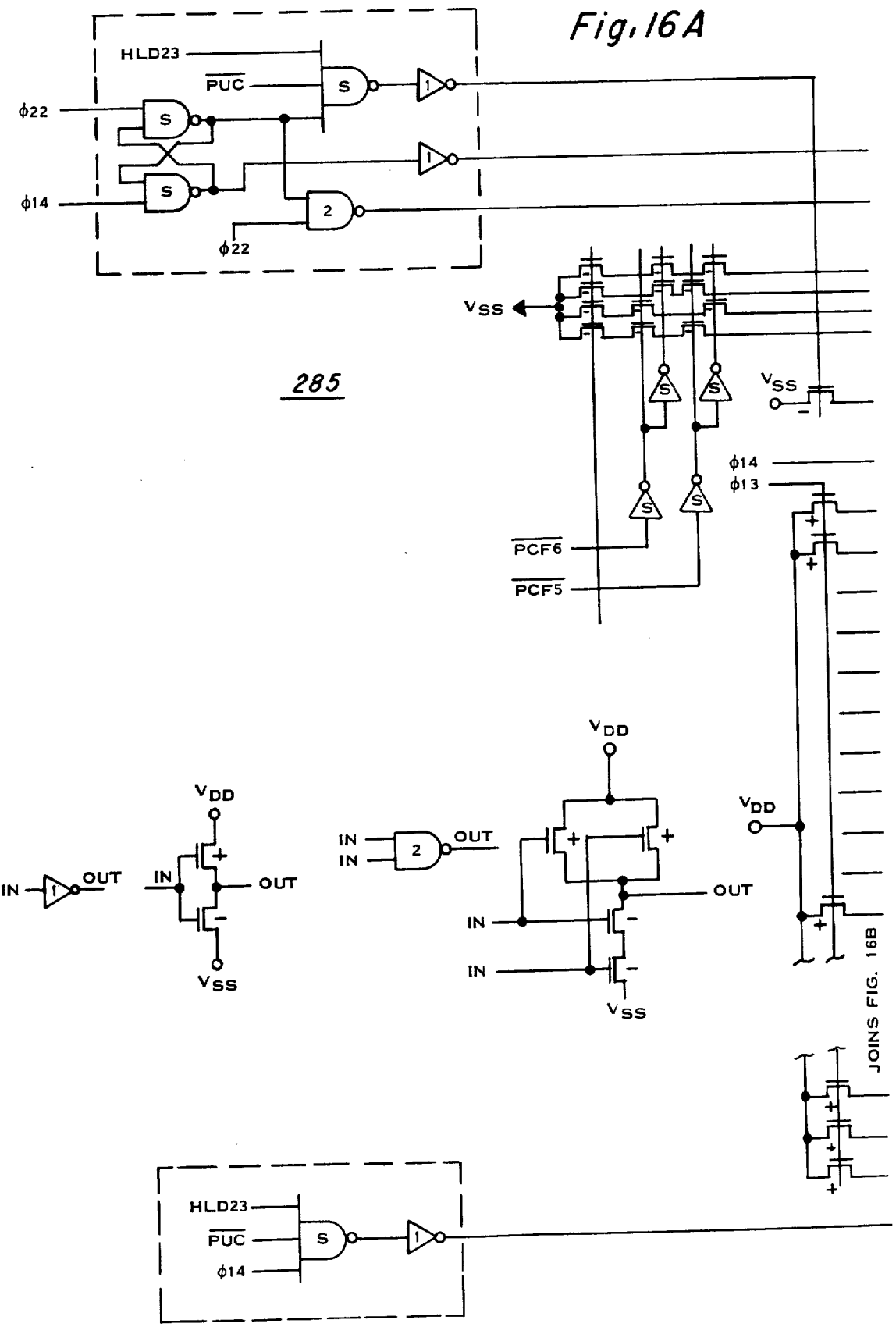
Figure 16B:
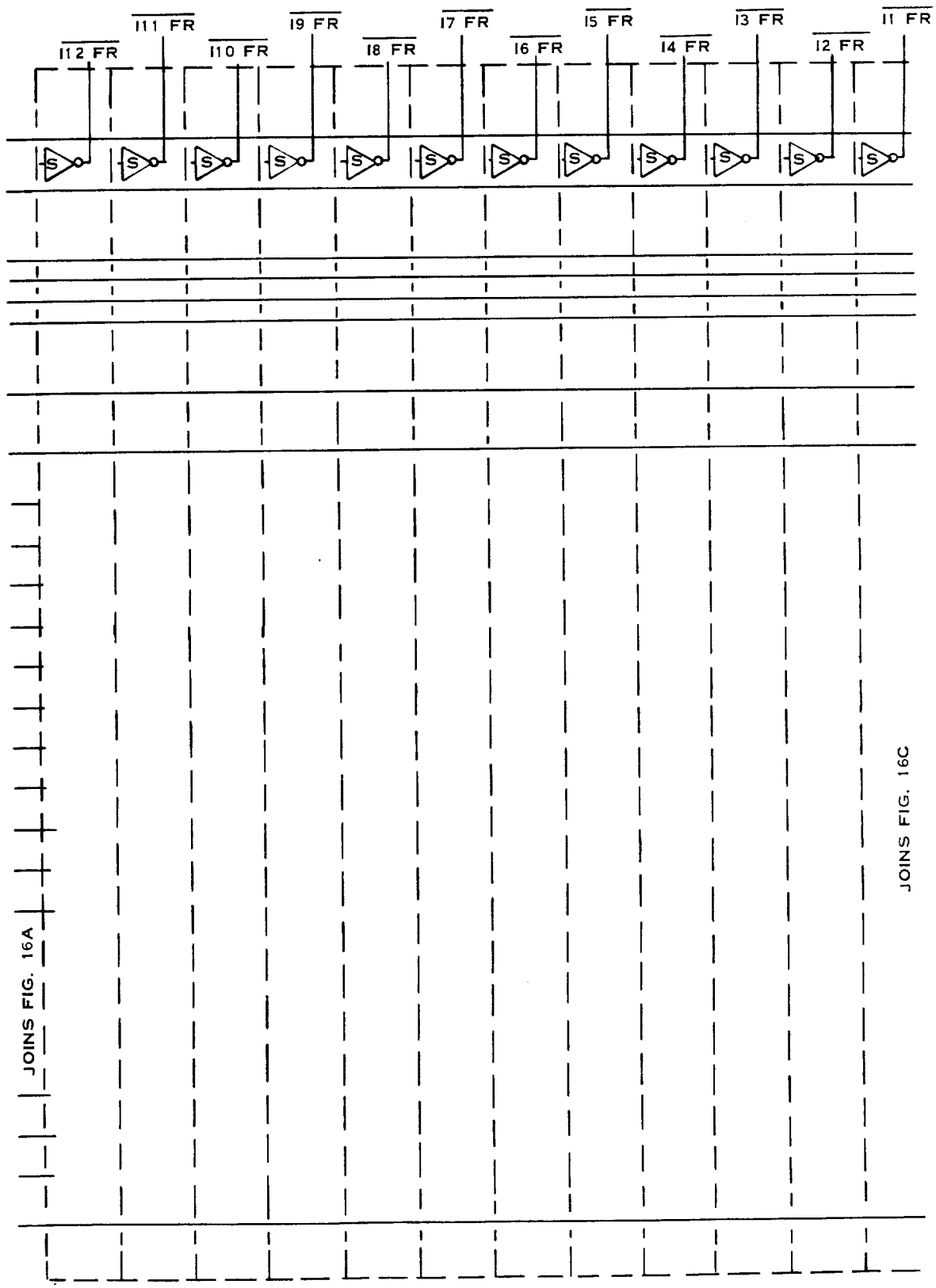

The main ROM as shown in FIG. 14A is sequenced responsive to the main program counter 200. The main ROM 298 and 299 of FIG. 14A is a dense but slow series device. To increase execution speed of iterative routines, such as arithmetic register additions, a 127 word fast ROM 285 as shown in FIGS. 16A-C, with high speed access time is employed. Critical loops of these iterative routines may be placed in the fast ROM. Execution from the fast ROM 285 allows instruction cycle times ⅓ of that attainable from the main ROM 298 and 299 as shown in FIGS. 14A-J. The fast ROM has an associated 7 bit program counter 288 and associated feedback logic 253 and control logic 252 as shown in FIG. 10G. Additionally, the fast latch control logic 254 provides a FAST output signal which is coupled, inter alia, to the control logic 252. The count sequence for the fast program counter system 204 has branch capability, but no call capability, since the fast program counter 204 is not coupled to the subroutine stack pointer memory 243 to provide for subroutine return address storage. Branches in the fast ROM 285 are identical to those in the main ROM 200, except that only the most significant seven bits of the branch address, I lines I0-I6 as output from the ROM output buffer, are transferred to the fast program counter 288. If a call instruction is executed in the fast ROM 285, the main program counter 200 is caused to increment, providing the capability of doing an interlinked fast ROM/slow ROM computed go to instruction execution. The fast program counter 204 counts whenever the integrated circuit of which it is a part is running in the active mode. If the system is not using the information from the fast ROM 285, the contents of the fast program counter 204 (288) will be pseudo random, as the counter 204 is continuously cycling so that at any point in time it will contain a random count within the sequence as shown in Table 2. Therefore, before accessing the fast ROM 285 of FIGS. 16A-C, the fast program counter 204 (288) must be initialized to the desired starting address. This is accomplished in response to an FBR input (fast branch) into the control logic 252. The FBR inputs causes the ROM output word bits I0-I6 to be loaded into the fast program counter 204 as a part of the fast branch instruction. The FBR input is coupled to one input of NOR gate 256 of the logic 252. A test condition input TC1 is coupled to the other input of NOR gate 256 of logic 252. TC1 specifies a test condition decode, and is only active in the test mode.

FAST, RETN, and HPC are decoded control outputs which are coupled to the inputs of the fast program counter control logic 252. The FAST output signal with the FBR signal enables the fast program counter 288 to execute a branch instruction load. The FAST output indicates the system is in a fast ROM mode. There is a fast latch 254 which decodes and provides a latched output indicative that the system is in a fast ROM mode. When the fast latch 254 is set, the system is in the fast ROM mode, and a branch instruction execution will cause the fast program counter to be loaded responsive to the control outputs from the control logic 252. The RETN output is the same return output signal as is used in the slow program counter 200 and associated control logic. The return RETN signal holds (stops the count sequence of) the fast program counter 204 (288) while the system clocks slow, until the slow program counter is loaded with the return address as output from the subroutine stack memory 243 so as to cause resumption of program execution where it left off prior to the subroutine call. As there is no subroutine stack provided for the fast program counter 204 (288) (and therefore for the fast ROM 285), a subroutine cannot be executed within the fast ROM. A subroutine call to a program in the fast ROM as a subroutine may be made, but subroutines cannot be called and done within the fast ROM itself. Normally, the return signal RETN causes the main program counter to recall the information that has been stored in the subroutine stack memory 243 (the address following the one from which a branch was executed) so that upon receipt of the return (RETN) signal, that stored address is reloaded back into the main program counter 200 and program execution resumes from the location in the program from which the branch was made. The HPC output, which stands for hold program counter, is coupled to the input of inverter 253 of the control logic 252. The HPC output is a signal for a special HOLD (HPC) instruction. The Z pointer 400, as shown in FIG. 13, points to a specific word in a register of RAM, and is in the preferred embodiment a 4 bit counter/latch. Execution and decode of an HPC instruction causes either the fast or slow program counter 204, or 200, respectively, dependent upon whether in a normal or in a fast mode, to increment by one and then pause and stay at that count. Then, the instruction immediately following the HPC instruction will start to execute, and will continue executing until the Z counter/fast pointer 400 (FIG. 13) has counted down to 0. One utilization of the present invention is to allow for a whole register of RAM (16 4 bit words) to be transferred and counted down automatically so as to allow for moving the whole register of RAM to another logic block such as the I/O, or elsewhere, without having to execute a plurality of instructions to increment the register address, and then execute a move instruction, decrement a counter, and test and loop. Instead, the instruction desired is coupled with the HPC instruction, which will count down a part or the entire register and only requires two instructions. The RETN and FAST decoded output signals are coupled to the inputs of logic 255 which provides an output CRETN, said output being coupled to other parts of the integrated circuit.

In the preferred embodiment, a subroutine stack pointer is comprised of two stages, similar to the page select logic 201. First, a latch array 238 (comprised of latches 239 and buffers 300) is coupled to control logic 245 and to decode logic 246 (FIG. 10A). The outputs from the latch 239 are coupled to the inputs of the buffers 300. Second, the outputs SP(0), SP(1), SP(2), SP(3), SP(4), and SP(5) from the buffers 300 are coupled to individual and separate stages of the subroutine stack memory 243. In the preferred embodiment, the latches 239 are comprised of seven latches 302 which store and shift information, the outputs from the latches 302 of the latch register 239 being selectively enabled to provide outputs to respective individual stages of the buffers 300, and therefrom to the stack memory 243, in response to receiving a predefined combination of control signals. In the preferred embodiment, a RETNOK signal is output from control logic 230, the shift enable signal SFT is output from NOR gate 303 of the control logic 245, and internal feedback within the latch register 239 effectuate a shift responsive to a predefined combination of control signals. The instruction decode logic 246 distinguishes the call instruction CALL signal from the branch instruction, and provides a call output to control inputs of the buffers 300, to selectively gate the parallel bit position or the next most significant bit position of the subroutine stack pointer latches 239 to an individual output of the buffers. The latches 239 transfer the stored information into the buffers 300 when the control logic decodes the subroutine state and outputs signals accordingly. In the preferred embodiment, the latch 239, in position 6, outputs RW6, which is a stack overflow indication output, where output RW6 is forced to an active state when the subroutine stack is filled to its limit. This inhibits a CALL and indicates an overflow condition in the subroutine stack. Latch output RW6 is coupled into the decode logic 246 for the CALL instruction signal. The control output from NOR gate 247 of the instruction decode logic 246 is coupled to the control gate of the buffer/inverters 221 associated with the main program counter 200. The latches 240 count down by one, decrementally, after completion of a load cycle into the subroutine stack memory 243. For example, during the first load of the output signals from the main program counter 200 into the subroutine stack 243 memory locations 306, the stack pointer 238 provides an address output SP(0). Upon the next call instruction, the stack pointer 238 counts down by 1, and provides an address output SP(2). This mode of operation repeats until all six levels of subroutine stack memory 243 are filled, at which point the subroutine stack pointer 238 provides an output RW6 so as to indicate a stack overflow condition and so as to inhibit execution of further CALL instruction signals. The combinational results of the control logic 245, the subroutine stack pointer 238 and the subroutine stack memory 231 is to provide a last-in first-out type of subroutine stack. In the preferred embodiment, the subroutine stack memory 243 is comprised of random access read-write memory cells 306.

Upon return from a subroutine call, the information stored in the subroutine stack memory 243 must be transferred from the current top of the subroutine stack as indicated by the subroutine stack pointer 238, and the information transferred into the main program counter 200 to provide for return to the proper address location to resume program operation. The stack pointer latches 239 will then count up by one (increment). The counter latches 239 are operational so as to count in either direction, either up (increment) or down (decrement). A RETNOK output signal from the main program counter control logic 230 forces the latch counters 239 to count up, thereby in effect, clearing the register of the subroutine stack memory 243 where the transferred data was stored, so as to provide an additional subroutine nesting level in the stack in accordance with the present operational state of the system. The outputs SP(0)–SP(5) of the subroutine stack buffers 300 are structured so that only one of these outputs is activated at any given time. Thus, only one register or address of the subroutine stack memory 243 is enabled to provide outputs at any given time. This is compatible with providing for having the outputs and inputs for the subroutine stack memory 243 coupled together in common for comparable bit position significance. This is permissible since only one word within the subroutine stack 301 may be enabled at any given time. The SP(0) to SP(5) outputs act as stack pointers, pointing to and enabling one 13 bit word in the subroutine stack memory 243 to be input or output. In the preferred embodiment, there are six words in the subroutine stack 243. The control logic 245 controls the subroutine stack pointer 238. The combinational OR-NAND gate logic 301 decodes an instruction and responsive thereto initializes the stack by providing an output signal INST (which stands for initialize stack). This instruction and the corresponding decode occur during the power up clear (PUC) state of the calculator system and also occurs during a CLC instruction. The PUC output signal generated during power up clear is coupled to an input of the NAND gate of the logic 301. The combinational logic 301 decodes the CLC instruction directly from the instruction microcode signal lines I1, I2, I3 and I4 and from the LOAD output signal which are coupled to the inputs of the OR gate of the logic 301. The main instruction decode generates the LOAD micro instruction. The INST output of the logic 301 is coupled to an input of the NOR gate 303 of the control circuit 245. The shift enable output SFT of the NOR gate 303 initializes the stack pointer 239 to start at location 0. The RETNOK output signal from the program counter control logic 230 is coupled to the input of inverter 304 of the control logic 245 and from the output of the inverter 304 to one input of NAND gate 305. The other input of the NAND gate 305 is coupled to the CALL output signal from the instruction decode logic 246, which is a required condition for execution of a return. A subroutine call to the fast ROM is permissible, and is desirable to execute a high speed subroutine. However, a subroutine call may not be made from the fast ROM, because in the preferred embodiment, the subroutine stack memory 243 is loaded by the main program counter 200, but not by the fast program counter 204 (288). Therefore, there is no return address stored in the subroutine stack to which the program can return from a call in the fast ROM. The CALL output signal is a micro-instruction which when executed from slow ROM causes the prior main program counter location to be stored in the subroutine stack memory 243. The page select bits outputs RP0 and RP1 are loaded in response to instruction decode when it is desired to branch instruction execution to a different page in the ROM. The page select latches 206 and 207 are not incremented with the main program counter 200 during the normal operation. As a part of the load page instruction, the desired values of RP0 and RP1 are specified. In order to effect a load page instruction execution and change ROM pages, a two step process is required. First, an instruction is executed that loads the page buffers 203A and 203B with the page select address for the desired branch location. The ROM word outputs I0 and I1 are coupled to the inputs of the page buffers 203A and 203B, respectively, with outputs I0 and I1 being stored in page buffers 203A and 203B, respectively, in response to the load page buffer instruction decode output LDP. Next, the execution of the branch instruction loads the I lines I0-I9 into the program counter 200 and additionally enables the data that was stored in the page buffers 203A and 203B to be loaded into the page select latches 206 and 207. Additionally, if a call is executed, the information which was stored in the program counter 200 and the page select latches 206 and 207 are stored in the subroutine stack 243. Thus, a separate instruction loads the page buffers 203A and 203B and the page latches 206 and 207. Thus, in the preferred embodiment, two instructions are required to branch to a different page; first, load the page buffer and second, execute a branch instruction.

The fast latch 254 distinguishes whether or not the fast ROM is selected. The fast latch 254 is set by the signal output SFAST as coupled to the input of NAND gate 256 of the fast latch 254. NAND gate 256 is cross coupled with NAND gate 257 to form a set-reset latch. The PUC output is coupled to a second input of NAND gate 257 to reset the fast latch 254 to the inactive reset state so as to select the main ROM following the power up clear. The $\overline{\text{RETN}}$ output is coupled to a third input of NAND gate 257 via buffer 258 and synchronizing buffer 259. This enables a return condition to reset the fast latch to return control to the main ROM and main ROM program counter 200. The SFAST output is provided by the main program counter control logic 230 as output from decode logic inverter 237, and is derived from the hold main program counter decode logic of the main program counter control logic 230. This results in the main program counter 200 being placed in a recirculate or hold mode when the fast ROM 285 and fast program counter 204 (288) is selected. There is an instruction which is decoded in the instruction decode as shown in FIGS. 11A-B, called SFR, which means "set the fast ROM latch". When this instruction is decoded, the hold latch is set. The hold latch 250 is used to control much of the remaining circuitry in the main program counter 200 and associated control logic 230. Once the hold latch 250 is set, the main program counter is forced to a hold state, and the hold latch 250 and associated logic 230 generate the SFAST output which sets the fast latch 254. The output FAST of the FAST latch 254 is coupled to the clock generator which causes the clocks to speed up. The fast latch 254 is utilized to compensate for timing differences within the system by providing a static output for the dynamic clock generator. The fast output from the fast latch 254 is coupled to one input of NOR gate 259 of the return logic 255. The RETN output is coupled to the other input of inverter 259. If either input to the NOR gate 259 goes active low, the CRETN output from the logic 255 goes active low. The CRETN output decodes a return from fast ROM in response to a return instruction. CRETN stands for clock return, and is a timing compensation logic circuit to provide retiming of the return signal. The RETN signal is output from the decode PLA as shown in FIGS. 11A-B, in response to receiving and decoding a return instruction in synchronization with a given clock of the system's timing cycle. However, since the microcode decode RETN is improperly timed for the desired function, timing compensation and adjustment is performed by the logic 255. This provides for synchronization of return from the fast ROM. The HPC and HPCE outputs from the logic 250 are coupled to the main program counter 200 as described above, and are coupled to the fast ROM program counter 204 (288), and to the Z counter 400 as shown in FIG. 13. The logic 250 decodes the HPCE instruction, and sets a latch and output of the HPCE signal to the Z counter 400 and starts the Z counter counting. When the Z counter 400 has decremented all the way down to one, the latch is reset by the feedback signals output signal PZ1, 2, 4, 8 which reset the latch. In actuality, the feedback signals reset the latch, but the Z counter continues to decrement one additional time down to 0 before the latch has a chance to stop the Z counter from decrementing. The HPC output also provides an output to force the main program counter 200 to enter a recirculate or hold mode while the HPC function is being performed, thus, the HPC instruction causes the main program counters to hold and repeats execution of the single instruction following the HPC instruction signal until countdown of the Z counter to 0, at which point control of the program counter is released and normal program execution sequencing resumes.

Referring to FIG. 13, the memory pointers comprised of the X register 401, Y register 402, and Z counter/register 400, accumulator 370, communication bus 350, bus splitting means 340, and ROM input gating means 403 and 404 are shown, as described in greater detail in copending application Ser. No. 196,808 filed Oct. 14, 1980 for: A Data Processing System Having Multiple Memory Pointers, by Hunter et al.

Referring to FIGS. 14A-B, the page decode 299 and main (slow ROM) array and program counter address decode 298 is shown, as described earlier herein.

Figure 15A:
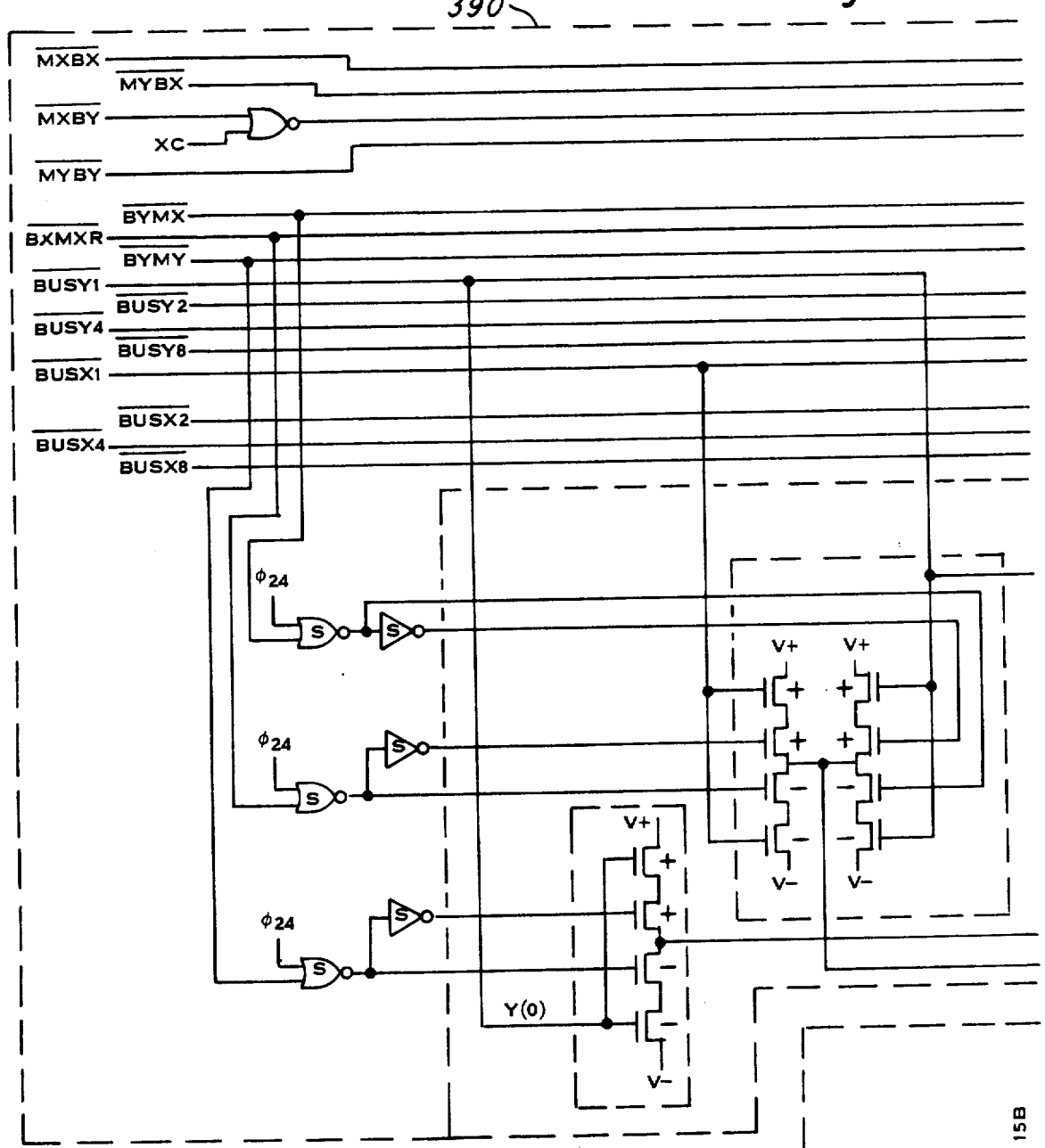
FIGS. 15A-D are detailed schematic circuit drawings of a preferred embodiment of the read/write memory (RAM) bus control circuit 390, read/write memory cell array 500, bus-counter interface 510, word decode logic 520, decode and sense circuitry 570, and bus interface logic 560, 530, 540, and 550.
Figure 15B:
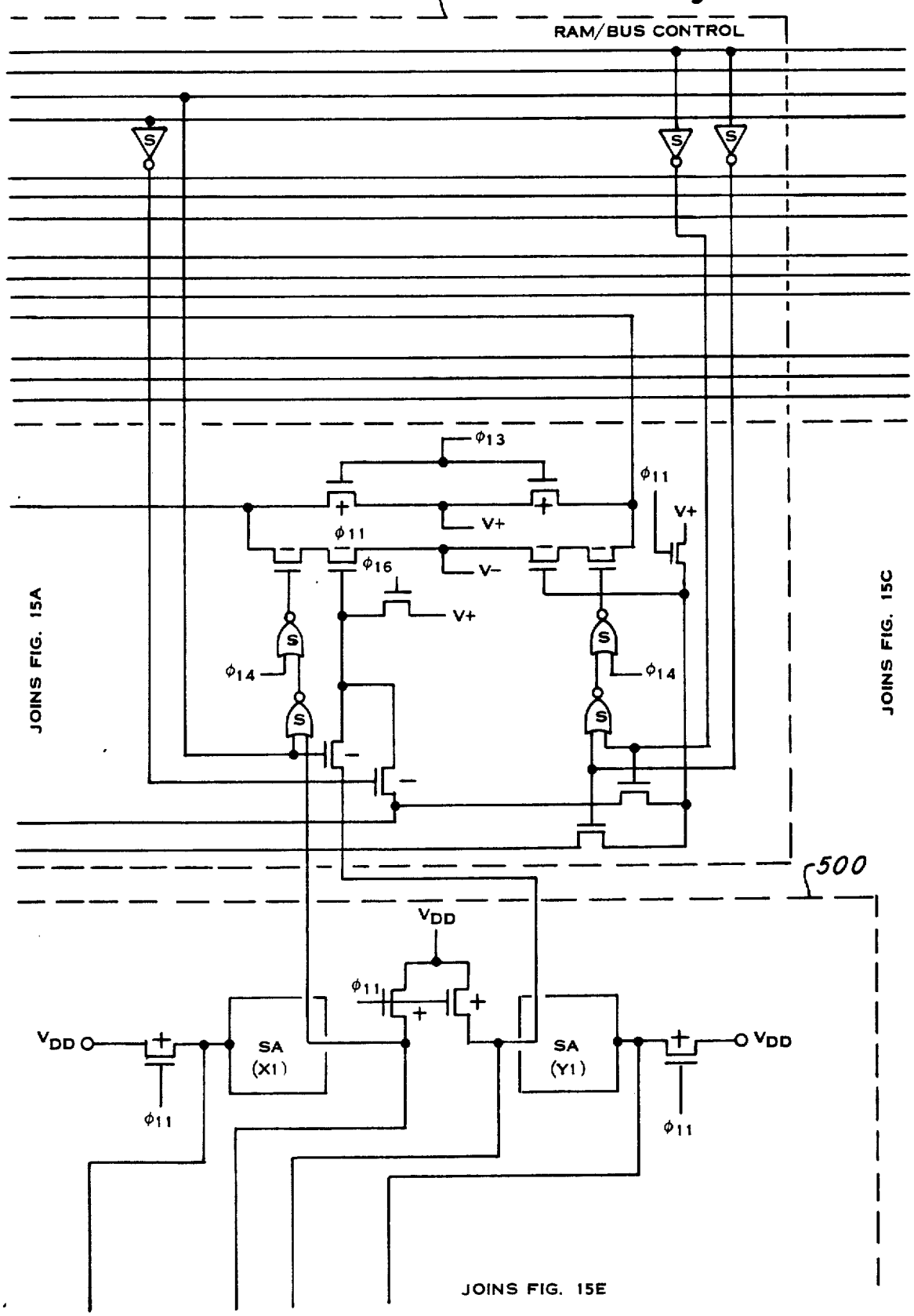
Figure 15C:
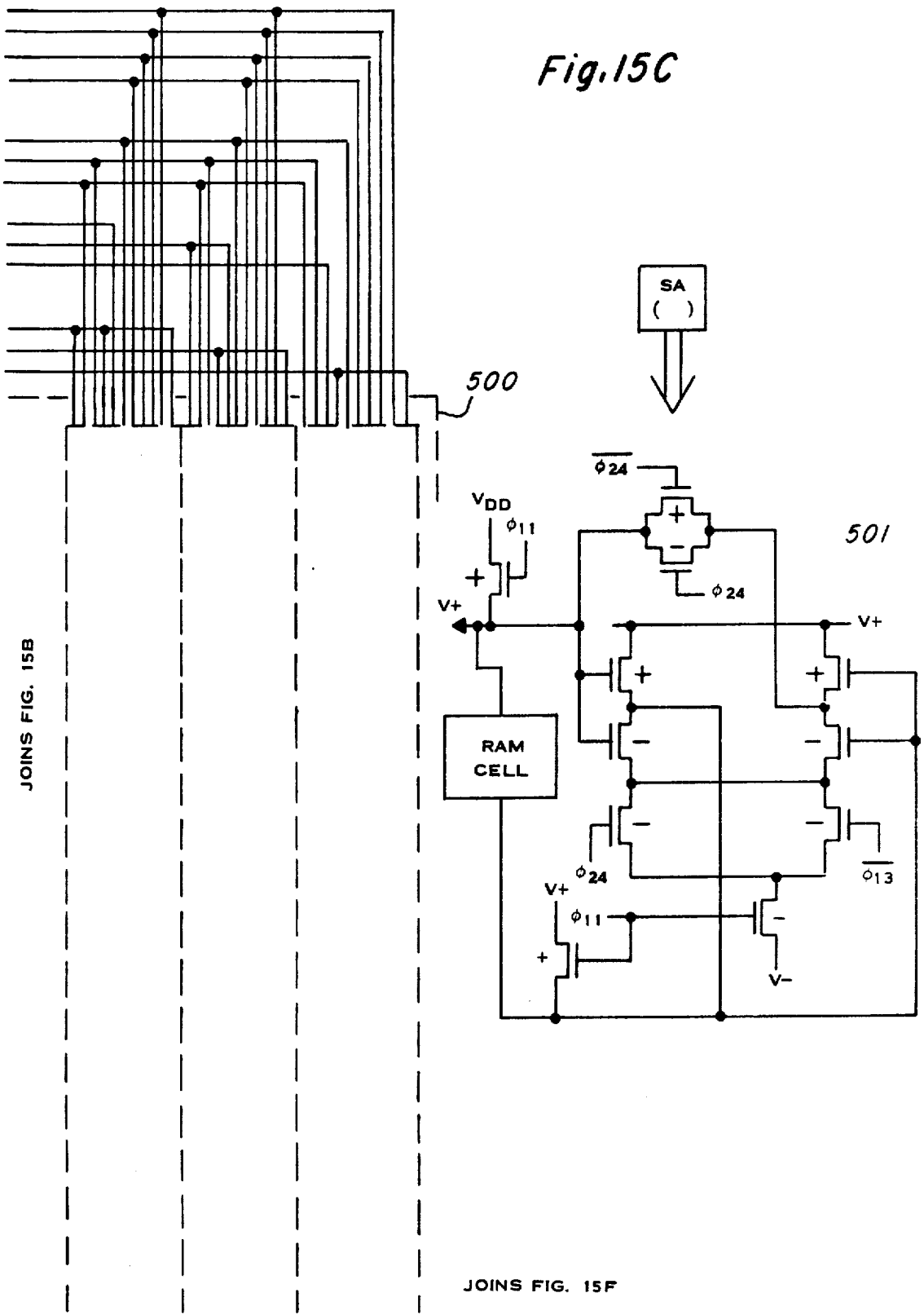
Figure 15D:
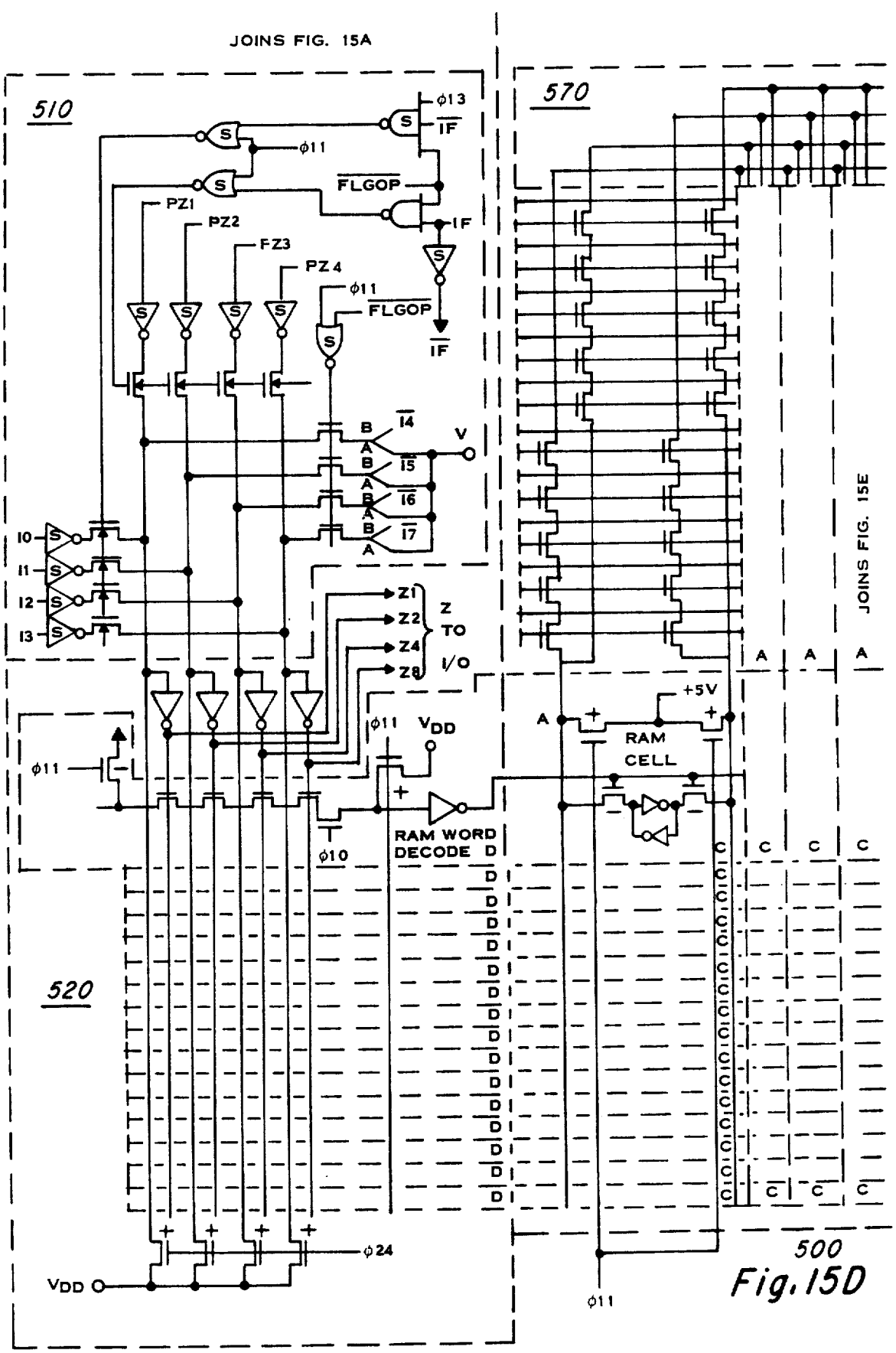
Figure 15F:
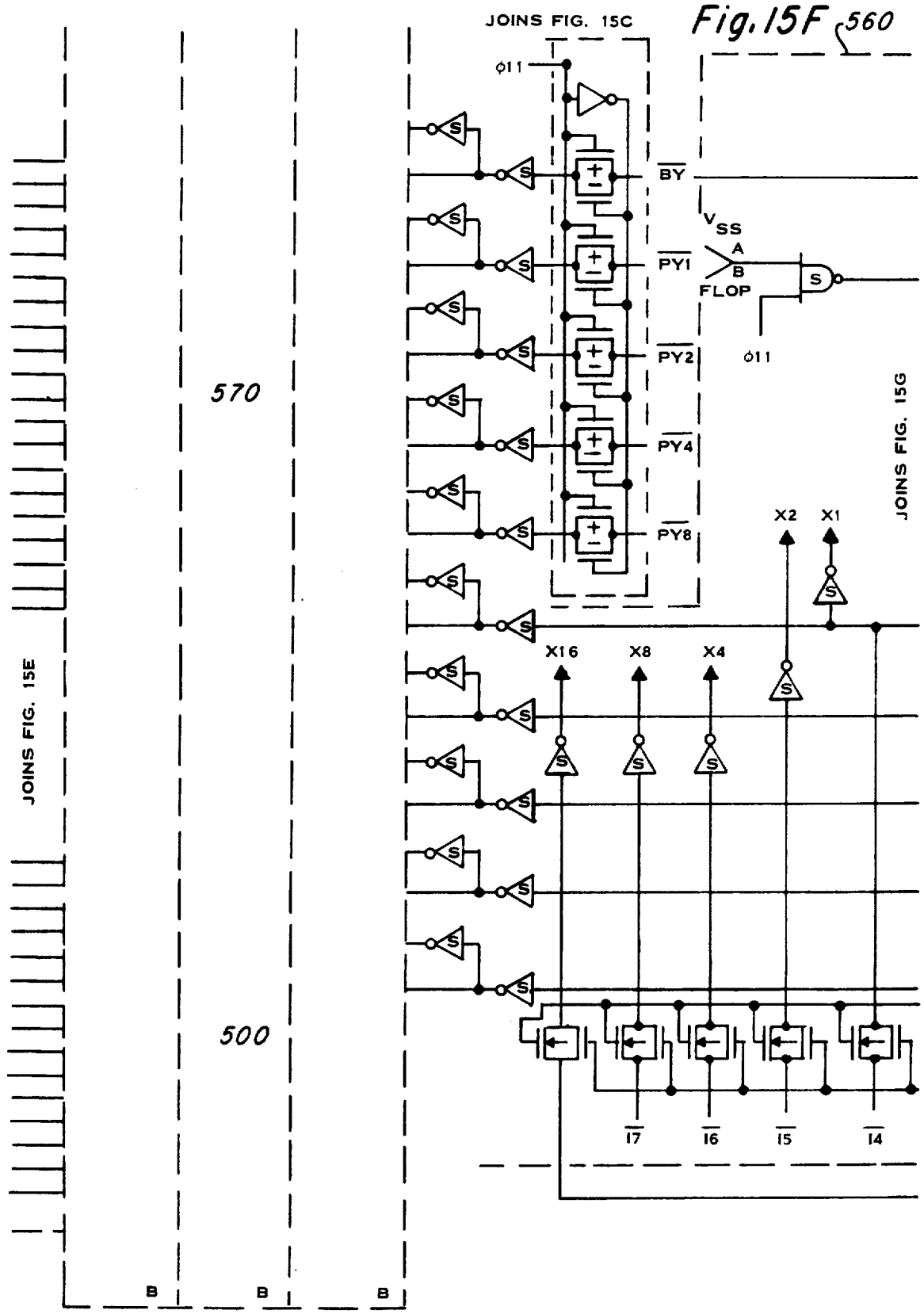
Figure 15G:
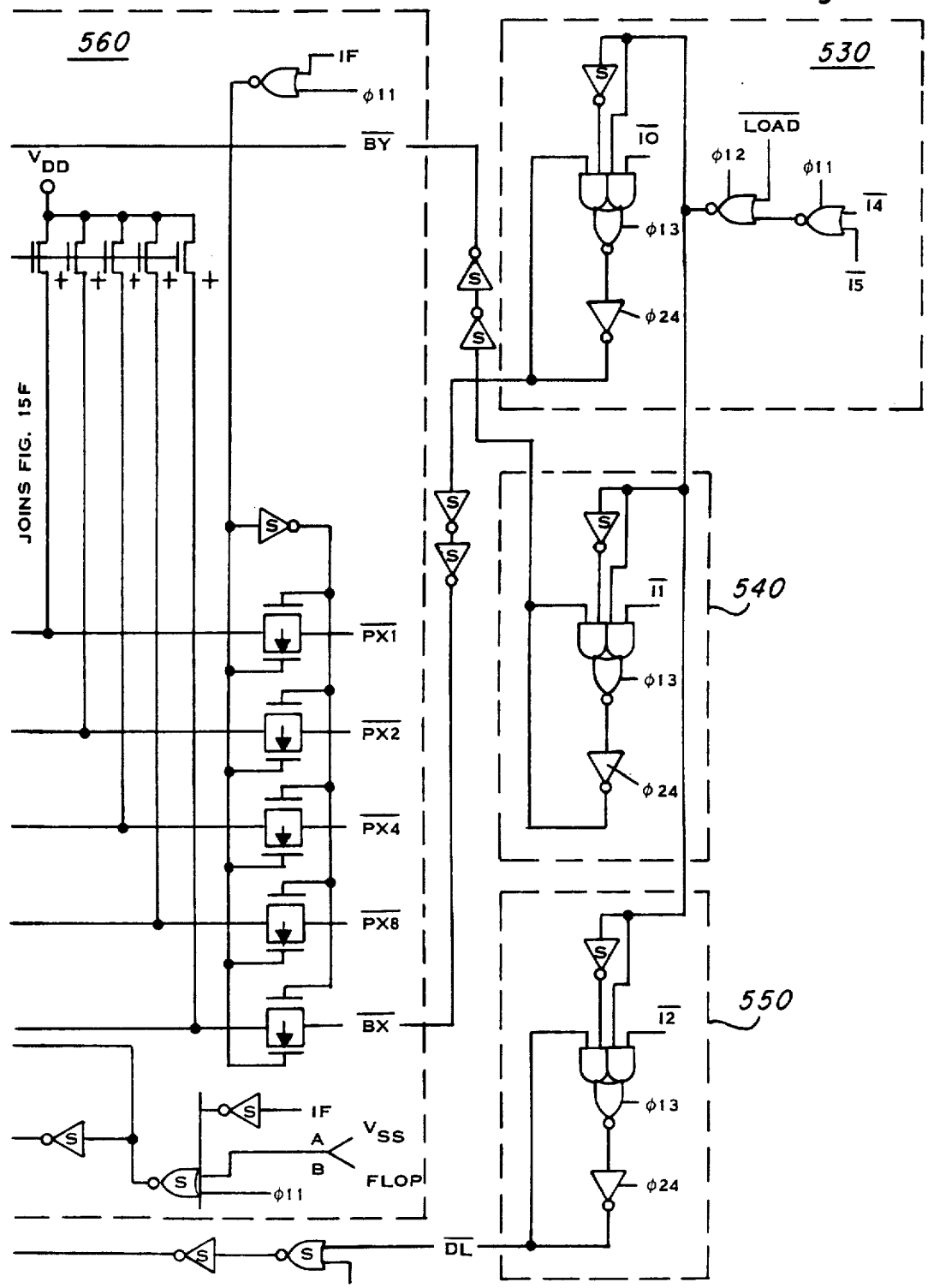

Referring to FIGS. 15A-D, the read/write memory (RAM) bus control 390, and read/write memory cell array 500 are shown, the RAM cell 501 being detailed in FIG. 15B. The bus-counter interface 510, word decode logic 520, and decode and sense circuitry 570 are shown in FIG. 15C. The RAM X bus and Y bus interface logic 560, and bus interface logic 530, 540, and 550 are shown in FIG. 15D.

Referring to FIGS. 16A-C, the fast ROM 285 with associated address decode and precharge, discharge, sensing, and synchronization logic are shown.

While the present invention has been disclosed with respect to particular embodiments, it is understood by those skilled in the art that the present invention may be utilized in other embodiments, systems, circuits, and technologies, within the spirit of the present invention as set forth in the appended claims.

TABLE IA

MAIN PROGRAM COUNT SEQUENCE

| 0 | 1 | 3 | 7 | 15 | 31 | 63 | 127 | 254 | 508 | 1016 | 1009 | 995 | 967 | 911 | 798 |
|---|---|---|---|---|---|---|---|---|---|---|---|---|---|---|---|
| 572 | 120 | 240 | 480 | 960 | 897 | 770 | 516 | 8 | 17 | 35 | 71 | 142 | 285 | 571 | 118 |
| 234 | 472 | 944 | 864 | 705 | 387 | 775 | 526 | 28 | 57 | 115 | 230 | 460 | 920 | 816 | 608 |
| 193 | 386 | 773 | 522 | 20 | 41 | 83 | 166 | 333 | 666 | 308 | 617 | 211 | 422 | 845 | 667 |
| 310 | 621 | 219 | 438 | 877 | 731 | 439 | 879 | 735 | 447 | 895 | 767 | 511 | 1022 | 1021 | 1019 |
| 1015 | 1007 | 991 | 959 | 894 | 765 | 507 | 1014 | 1005 | 987 | 951 | 878 | 733 | 443 | 887 | 751 |
| 479 | 958 | 892 | 761 | 499 | 998 | 973 | 923 | 822 | 620 | 217 | 434 | 869 | 715 | 407 | 815 |
| 606 | 189 | 379 | 758 | 493 | 986 | 949 | 874 | 725 | 427 | 855 | 687 | 350 | 700 | 376 | 752 |
| 481 | 962 | 901 | 778 | 532 | 40 | 81 | 162 | 325 | 650 | 276 | 553 | 82 | 164 | 329 | 658 |
| 292 | 585 | 147 | 295 | 591 | 159 | 319 | 639 | 255 | 510 | 1020 | 1017 | 1011 | 999 | 975 | 927 |
| 830 | 636 | 249 | 498 | 996 | 969 | 915 | 806 | 588 | 153 | 307 | 615 | 207 | 414 | 829 | 634 |
| 245 | 490 | 980 | 937 | 850 | 677 | 330 | 660 | 296 | 593 | 163 | 327 | 654 | 284 | 569 | 114 |
| 228 | 456 | 912 | 800 | 576 | 129 | 259 | 519 | 14 | 29 | 59 | 119 | 238 | 476 | 952 | 880 |
| 737 | 451 | 902 | 780 | 536 | 48 | 97 | 194 | 388 | 777 | 530 | 36 | 73 | 146 | 293 | 587 |
| 151 | 303 | 607 | 191 | 383 | 766 | 509 | 1018 | 1013 | 1003 | 983 | 943 | 862 | 701 | 378 | 756 |
| 489 | 978 | 933 | 842 | 661 | 298 | 597 | 171 | 343 | 686 | 348 | 696 | 368 | 736 | 449 | 898 |
| 772 | 520 | 16 | 33 | 67 | 134 | 269 | 539 | 54 | 109 | 218 | 436 | 873 | 723 | 423 | 847 |
| 671 | 318 | 637 | 251 | 502 | 1004 | 985 | 947 | 870 | 717 | 411 | 823 | 622 | 221 | 442 | 885 |
| 747 | 471 | 942 | 860 | 697 | 370 | 740 | 457 | 914 | 804 | 584 | 145 | 291 | 583 | 143 | 287 |
| 575 | 126 | 252 | 504 | 1008 | 993 | 963 | 903 | 782 | 540 | 56 | 113 | 226 | 452 | 904 | 784 |
| 544 | 64 | 128 | 257 | 515 | 6 | 13 | 27 | 55 | 111 | 222 | 444 | 889 | 755 | 487 | 974 |
| 925 | 826 | 628 | 233 | 466 | 932 | 840 | 657 | 290 | 581 | 139 | 279 | 559 | 94 | 188 | 377 |

TABLE IB

MAIN PC SEQUENCE

| 754 | 485 | 970 | 917 | 810 | 596 | 169 | 339 | 678 | 332 | 664 | 304 | 609 | 195 | 390 | 761 |
|---|---|---|---|---|---|---|---|---|---|---|---|---|---|---|---|
| 538 | 52 | 105 | 210 | 420 | 841 | 659 | 294 | 589 | 155 | 311 | 623 | 223 | 446 | 893 | 763 |
| 503 | 1006 | 989 | 955 | 886 | 749 | 475 | 950 | 876 | 729 | 435 | 871 | 719 | 415 | 831 | 638 |
| 253 | 506 | 1012 | 1001 | 979 | 935 | 846 | 669 | 314 | 629 | 235 | 470 | 940 | 856 | 689 | 354 |
| 708 | 393 | 787 | 550 | 76 | 152 | 305 | 611 | 199 | 398 | 797 | 570 | 116 | 232 | 464 | 928 |
| 832 | 641 | 258 | 517 | 10 | 21 | 43 | 87 | 174 | 349 | 698 | 372 | 744 | 465 | 930 | 836 |
| 649 | 274 | 549 | 74 | 148 | 297 | 595 | 167 | 335 | 670 | 316 | 633 | 243 | 486 | 972 | 921 |
| 818 | 612 | 201 | 402 | 805 | 586 | 149 | 299 | 599 | 175 | 351 | 702 | 380 | 760 | 497 | 994 |
| 965 | 907 | 790 | 556 | 88 | 176 | 353 | 706 | 389 | 779 | 534 | 44 | 89 | 178 | 357 | 714 |
| 405 | 811 | 598 | 173 | 347 | 694 | 364 | 728 | 433 | 867 | 711 | 399 | 799 | 574 | 124 | 248 |
| 496 | 992 | 961 | 899 | 774 | 524 | 24 | 49 | 99 | 198 | 396 | 793 | 562 | 100 | 200 | 400 |
| 801 | 578 | 133 | 267 | 535 | 46 | 93 | 186 | 373 | 746 | 469 | 938 | 852 | 681 | 338 | 676 |
| 328 | 656 | 288 | 577 | 131 | 263 | 527 | 30 | 61 | 123 | 246 | 492 | 984 | 945 | 866 | 709 |
| 395 | 791 | 558 | 92 | 184 | 369 | 738 | 453 | 906 | 788 | 552 | 80 | 160 | 321 | 642 | 260 |
| 521 | 18 | 37 | 75 | 150 | 301 | 603 | 183 | 367 | 734 | 445 | 891 | 759 | 495 | 990 | 957 |
| 890 | 757 | 491 | 982 | 941 | 858 | 693 | 362 | 724 | 425 | 851 | 679 | 334 | 668 | 312 | 625 |
| 227 | 454 | 908 | 792 | 560 | 96 | 192 | 384 | 769 | 514 | 4 | 9 | 19 | 39 | 79 | 158 |
| 317 | 635 | 247 | 494 | 988 | 953 | 882 | 741 | 459 | 918 | 812 | 600 | 177 | 355 | 710 | 397 |
| 795 | 366 | 108 | 216 | 432 | 865 | 707 | 391 | 783 | 542 | 60 | 121 | 242 | 484 | 968 | 913 |
| 802 | 580 | 137 | 275 | 551 | 73 | 156 | 313 | 627 | 231 | 462 | 924 | 824 | 624 | 225 | 450 |
| 900 | 776 | 528 | 32 | 65 | 130 | 261 | 523 | 22 | 45 | 91 | 182 | 365 | 730 | 437 | 875 |
| 727 | 431 | 863 | 703 | 382 | 764 | 505 | 1010 | 997 | 971 | 919 | 814 | 604 | 185 | 371 | 742 |
| 461 | 922 | 820 | 616 | 209 | 418 | 837 | 651 | 278 | 557 | 90 | 180 | 361 | 722 | 421 | 843 |
| 663 | 302 | 605 | 187 | 375 | 750 | 477 | 954 | 884 | 745 | 467 | 934 | 844 | 665 | 306 | 615 |
| 203 | 406 | 813 | 602 | 181 | 363 | 726 | 429 | 859 | 695 | 366 | 732 | 441 | 883 | 743 | 463 |

TABLE IB-continued

MAIN PC SEQUENCE

| 926 | 828 | 632 | 241 | 482 | 964 | 905 | 786 | 548 | 72  | 144 | 289 | 579 | 135 | 271 | 543 |
|-----|-----|-----|-----|-----|-----|-----|-----|-----|-----|-----|-----|-----|-----|-----|-----|
| 62  | 125 | 250 | 500 | 1000| 977 | 931 | 838 | 653 | 282 | 565 | 106 | 212 | 424 | 849 | 675 |
| 326 | 652 | 280 | 561 | 98  | 196 | 392 | 785 | 546 | 68  | 136 | 273 | 547 | 70  | 140 | 281 |
| 563 | 102 | 204 | 408 | 817 | 610 | 197 | 394 | 789 | 554 | 84  | 168 | 337 | 674 | 324 | 648 |
| 272 | 545 | 66  | 132 | 265 | 531 | 38  | 77  | 154 | 309 | 619 | 215 | 430 | 861 | 699 | 374 |
| 748 | 473 | 946 | 868 | 713 | 403 | 807 | 590 | 157 | 315 | 631 | 239 | 478 | 956 | 888 | 753 |
| 483 | 966 | 909 | 794 | 564 | 104 | 208 | 416 | 833 | 643 | 262 | 525 | 26  | 53  | 107 | 214 |
| 428 | 857 | 691 | 358 | 716 | 409 | 819 | 614 | 205 | 410 | 821 | 618 | 213 | 426 | 853 | 683 |
| 342 | 684 | 344 | 688 | 352 | 704 | 385 | 771 | 518 | 12  | 25  | 51  | 103 | 206 | 412 | 825 |
| 626 | 229 | 458 | 916 | 808 | 592 | 161 | 323 | 646 | 268 | 537 | 50  | 101 | 202 | 404 | 809 |
| 594 | 165 | 331 | 662 | 300 | 601 | 179 | 359 | 718 | 413 | 827 | 630 | 237 | 474 | 948 | 872 |
| 721 | 419 | 839 | 655 | 286 | 573 | 122 | 244 | 488 | 976 | 929 | 834 | 645 | 266 | 533 | 42  |
| 85  | 170 | 341 | 682 | 340 | 680 | 336 | 672 | 320 | 640 | 256 | 513 | 2   | 5   | 11  | 23  |
| 47  | 95  | 190 | 381 | 762 | 501 | 1002| 981 | 939 | 854 | 685 | 346 | 692 | 360 | 720 | 417 |
| 835 | 647 | 270 | 541 | 58  | 117 | 234 | 468 | 936 | 848 | 673 | 322 | 644 | 264 | 529 | 34  |
| 69  | 138 | 277 | 555 | 86  | 172 | 345 | 690 | 356 | 712 | 401 | 803 | 582 | 141 | 283 | 567 |
| 110 | 220 | 440 | 881 | 739 | 455 | 910 | 796 | 568 | 112 | 224 | 448 | 896 | 768 | 512 | 0   |

TABLE II

FAST PROGRAM COUNT SEQUENCE

| 0   | 1   | 3   | 7   | 15  | 31  | 63  | 126 | 125 | 123 | 119 | 111 | 95  | 62  | 124 | 121 |
|-----|-----|-----|-----|-----|-----|-----|-----|-----|-----|-----|-----|-----|-----|-----|-----|
| 115 | 103 | 79  | 30  | 61  | 122 | 117 | 107 | 87  | 46  | 92  | 56  | 112 | 97  | 67  | 6   |
| 13  | 27  | 55  | 110 | 93  | 58  | 116 | 105 | 83  | 38  | 76  | 24  | 49  | 98  | 69  | 10  |
| 21  | 43  | 86  | 44  | 88  | 48  | 96  | 65  | 2   | 5   | 11  | 23  | 47  | 94  | 60  | 120 |
| 113 | 99  | 71  | 14  | 29  | 59  | 118 | 109 | 91  | 54  | 108 | 89  | 50  | 100 | 73  | 18  |
| 37  | 74  | 20  | 41  | 82  | 36  | 72  | 16  | 33  | 66  | 4   | 9   | 19  | 39  | 78  | 28  |
| 57  | 114 | 101 | 75  | 22  | 45  | 90  | 52  | 104 | 81  | 34  | 68  | 8   | 17  | 35  | 70  |
| 12  | 25  | 51  | 102 | 77  | 26  | 53  | 106 | 85  | 42  | 84  | 40  | 80  | 32  | 64  | 0   |

The counts are in decimal and should be read from left to right. Note the 127 and 1023 distinct states for fast and main pc's.

TABLE IIIA

(SLOW ROM)

| INSTR. CYCLE | TP | TCIN | TCIN0 | TCIN4 | TCIN8 | TCIN12 |
|---|---|---|---|---|---|---|
| 1. 021 | 1 | 0 | $\overline{PC\ 3}$ | $\overline{PC\ 7}$ | $\overline{RP\ 1}$ | DON'T CARE |
| 2. 021 | 1 | 0 | $\overline{PC\ 2}$ | $\overline{PC\ 6}$ | $\overline{RP\ 0}$ | |
| 3. 021 | 1 | 0 | $\overline{PC\ 1}$ | $\overline{PC\ 5}$ | $\overline{PC\ 9}$ | |
| 4. 021 | 1 | 1 | $\overline{PC\ 0}$ | $\overline{PC\ 4}$ | $\overline{PC\ 8}$ | |
| 023 | 1 | 0 | | | | |

TABLE IIIB

(FAST ROM)

| INSTR. CYCLE | TP | TCIN | TCIN0 | TCIN4 | TCIN8 | TCIN12 |
|---|---|---|---|---|---|---|
| 1. 021 | 1 | 0 | $F\ \overline{PC\ 3}$ | 1 | 0 | 0 |
| 2. 021 | 1 | 0 | $F\ \overline{PC\ 2}$ | $F\ \overline{PC\ 6}$ | 0 | 0 |
| 3. 021 | 1 | 0 | $F\ \overline{PC\ 1}$ | $F\ \overline{PC\ 5}$ | 1 | 0 |
| 023 | 1 | 1 | | | | |
| 4. 021 | 1 | 1 | $F\ \overline{PC\ 0}$ | $F\ \overline{PC\ 4}$ | 1 | 0 |
| 5. 021 | 1 | 1 | | | | |
| 023 | 1 | 0 | | | | |

TABLE IV

| INSTR. CYCLE | TP | TCIN | TCIN0 | TCIN4 | TCIN8 | TCIN12 |
|---|---|---|---|---|---|---|
| 1. 021 | 1 | 0 | $\overline{I3}$ | $\overline{I7}$ | $\overline{I11}$ | 0 |
| 2. 021 | 1 | 0 | $\overline{I2}$ | $\overline{I6}$ | $\overline{I10}$ | 0 |
| 3. 021 | 1 | 0 | $\overline{I1}$ | $\overline{I5}$ | $\overline{I9}$ | 0 |
| 023 | 1 | 1 | | | | |
| 4. 021 | 1 | 0 | $\overline{I0}$ | $\overline{I4}$ | $\overline{I8}$ | $\overline{I12}$ |

What is claimed is:

1. A data processing system comprising:
  first counter means for generating first address signals,
  first memory means coupled to said first counter means, said first memory means selectively producing first data signals in response to said first address signals,
  second counter means for generating second address signals,
  second memory means coupled to said second counter means, said second memory means selectively producing second data signals in response to said second address signals, said first memory means or said second memory means being alternately enabled,
  incrementing means coupled to said first memory means and said second program counter for incrementing a stored count in said second counter means in response to a first particular one of said first data signals from said first memory means while said second memory means is disabled and processor means coupled to said first and second data signals for selectively enabling said first memory means in response to a particular one of said second data signals from said second memory means or for selectively enabling said second memory means in response to a second particular one of said first data signals.

2. A data processing system according to claim 1 wherein said processor means performs data processing operations responsive to said first and second data signals.

3. A data processing system according to claim 2 further including input means coupled to said processor means for providing an input signal to said processor means in response to an input stimulii, said processor means producing a representation signal in response thereto and an output means coupled to said processor means for producing an output representation in response to said representation signal.

4. A data processing system according to claim 1 wherein said first memory means has a faster access time than said second memory means.

* * * * *